United States Patent
Taylor et al.

(10) Patent No.: US 10,177,514 B2
(45) Date of Patent: *Jan. 8, 2019

(54) MANAGED ELECTRICAL CONNECTIVITY SYSTEMS

(71) Applicant: CommScope Technologies LLC, Hickory, NC (US)

(72) Inventors: Christopher Charles Taylor, Cheltenham Glos (GB); Gordon John White, Gloucestershire (GB); Alastair Hoath, Cheltenham (GB); Joseph C. Coffey, Burnsville, MN (US); Loren J. Mattson, Richfield, MN (US); Duane R. Sand, Annandale, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,832

(22) Filed: Mar. 10, 2017

(65) Prior Publication Data

US 2017/0302040 A1      Oct. 19, 2017

Related U.S. Application Data

(63) Continuation of application No. 14/733,063, filed on Jun. 8, 2015, now Pat. No. 9,595,797, which is a
(Continued)

(51) Int. Cl.
*H01R 27/02* (2006.01)
*H01R 24/00* (2011.01)
(Continued)

(52) U.S. Cl.
CPC ........... *H01R 27/02* (2013.01); *H01R 12/721* (2013.01); *H01R 13/436* (2013.01);
(Continued)

(58) Field of Classification Search
CPC ...... H01R 27/02; H01R 12/721; H01R 13/58; H01R 13/665; H01R 13/62933;
(Continued)

(56) References Cited

U.S. PATENT DOCUMENTS 3,243,761 A    3/1966  Piorunneck
4,127,317 A    11/1978 Tyree
(Continued)

FOREIGN PATENT DOCUMENTS

CA    2499803        4/2004
CN    1521902 A      8/2004
(Continued)

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.
(Continued)

*Primary Examiner* — Harshad C Patel
(74) *Attorney, Agent, or Firm* — Merchant & Gould P.C.

(57) ABSTRACT

A connector arrangement includes a plug nose body; a printed circuit board positioned within a cavity of the plug nose body; and a plug cover that mounts to the plug nose body to enclose the printed circuit board within the cavity. The printed circuit board includes a storage device configured to store information pertaining to the electrical segment of communications media. The plug cover defines a plurality of slotted openings through which the second contacts are exposed. A connector assembly includes a jack module and a media reading interface configured to receive the plug. A patch panel includes multiple jack modules and multiple media reading interfaces.

22 Claims, 74 Drawing Sheets

Related U.S. Application Data continuation of application No. 12/907,724, filed on Oct. 19, 2010, now Pat. No. 9,054,440.

(60) Provisional application No. 61/252,964, filed on Oct. 19, 2009, provisional application No. 61/253,208, filed on Oct. 20, 2009.

(51) Int. Cl.

| | | |
|---|---|---|
| *H01R 13/436* | (2006.01) | |
| *H01R 13/514* | (2006.01) | |
| *H01R 13/703* | (2006.01) | |
| *H04Q 1/14* | (2006.01) | |
| *H04Q 1/02* | (2006.01) | |
| *H01R 12/72* | (2011.01) | |
| *H01R 24/64* | (2011.01) | |
| *H01R 13/629* | (2006.01) | |
| *H01R 13/66* | (2006.01) | |
| *H01R 43/20* | (2006.01) | |
| *H01R 43/24* | (2006.01) | |
| *H01R 13/58* | (2006.01) | |
| *H01R 4/2416* | (2018.01) | |
| *H01R 107/00* | (2006.01) | |

(52) U.S. Cl.
CPC ........... *H01R 13/514* (2013.01); *H01R 13/58* (2013.01); *H01R 13/629* (2013.01); *H01R 13/62933* (2013.01); *H01R 13/665* (2013.01); *H01R 13/7031* (2013.01); *H01R 13/7032* (2013.01); *H01R 24/00* (2013.01); *H01R 24/64* (2013.01); *H01R 43/205* (2013.01); *H01R 43/24* (2013.01); *H04Q 1/03* (2013.01); *H04Q 1/136* (2013.01); *H04Q 1/144* (2013.01); *H04Q 1/149* (2013.01); *H01R 4/2416* (2013.01); *H01R 2107/00* (2013.01); *H01R 2201/04* (2013.01); *H04Q 2213/13349* (2013.01); *Y10T 29/4922* (2015.01); *Y10T 29/49146* (2015.01); *Y10T 29/49208* (2015.01)

(58) Field of Classification Search
CPC .. H01R 13/7031; H01R 24/64; H01R 43/205; H01R 43/24; H01R 2107/00; H01R 2201/04; H04Q 2213/13349
USPC .... 439/676, 607.38, 607.43, 607.54, 620.11, 439/620.12, 620.17, 607.18, 607.21, 679, 439/344.668
See application file for complete search history.

(56) References Cited

U.S. PATENT DOCUMENTS

| | | |
|---|---|---|
| 4,679,879 A | 7/1987 | Triner et al. |
| 4,684,245 A | 8/1987 | Goldring |
| 4,953,194 A | 8/1990 | Hansen et al. |
| 4,968,929 A | 11/1990 | Hauck et al. |
| 4,978,310 A | 12/1990 | Shichida |
| 5,052,940 A | 10/1991 | Bengal |
| 5,091,826 A | 2/1992 | Arnett et al. |
| 5,107,532 A | 4/1992 | Hansen et al. |
| 5,161,988 A | 11/1992 | Krupka |
| 5,166,970 A | 11/1992 | Ward |
| 5,222,164 A | 6/1993 | Bass, Sr. et al. |
| 5,265,187 A | 11/1993 | Morin et al. |
| 5,305,405 A | 4/1994 | Emmons et al. |
| 5,353,367 A | 10/1994 | Czosnowski et al. |
| 5,393,249 A | 2/1995 | Morgenstern et al. |
| 5,394,503 A | 2/1995 | Dietz, Jr. et al. |
| 5,413,494 A | 5/1995 | Dewey et al. |
| 5,415,570 A | 5/1995 | Sarkissian |
| 5,418,334 A | 5/1995 | Williams |
| 5,419,717 A | 5/1995 | Abendschein et al. |
| 5,448,675 A | 9/1995 | Leone et al. |
| 5,467,062 A | 11/1995 | Burroughs et al. |
| 5,470,251 A | 11/1995 | Sano |
| 5,473,715 A | 12/1995 | Schofield et al. |
| 5,483,467 A | 1/1996 | Krupka et al. |
| 5,660,567 A | 8/1997 | Nierlich et al. |
| 5,674,085 A | 10/1997 | Davis et al. |
| 5,685,741 A | 11/1997 | Dewey et al. |
| 5,712,942 A | 1/1998 | Jennings et al. |
| 5,764,043 A | 6/1998 | Czosnowski et al. |
| 5,800,192 A | 9/1998 | David et al. |
| 5,821,510 A | 10/1998 | Cahen et al. |
| 5,854,824 A | 12/1998 | Bengal et al. |
| 5,871,368 A | 2/1999 | Erdner et al. |
| 5,910,776 A | 6/1999 | Black |
| 5,947,772 A | 9/1999 | Arnett et al. |
| 6,002,331 A | 12/1999 | Laor |
| 6,079,996 A * | 6/2000 | Arnett ................ H01R 13/6466 200/51.06 |
| 6,095,837 A | 8/2000 | David et al. |
| 6,095,851 A | 8/2000 | Laity et al. |
| 6,116,961 A | 9/2000 | Henneberger et al. |
| 6,176,742 B1 * | 1/2001 | Arnett ................ H01R 13/6466 439/620.23 |
| 6,222,908 B1 | 4/2001 | Bartolutti et al. |
| 6,222,975 B1 | 4/2001 | Gilbert et al. |
| 6,227,911 B1 | 5/2001 | Boutros et al. |
| 6,234,830 B1 | 5/2001 | Ensz et al. |
| 6,238,235 B1 | 5/2001 | Shavit et al. |
| 6,280,231 B1 | 8/2001 | Nicholls |
| 6,285,293 B1 | 9/2001 | German et al. |
| 6,300,877 B1 | 10/2001 | Schannach et al. |
| 6,305,950 B1 | 10/2001 | Doorhy |
| 6,330,148 B1 | 12/2001 | Won et al. |
| 6,330,307 B1 | 12/2001 | Bloch et al. |
| 6,350,148 B1 | 2/2002 | Bartolutti et al. |
| 6,350,158 B1 | 2/2002 | Arnett et al. |
| 6,364,694 B1 | 4/2002 | Lien |
| 6,381,283 B1 | 4/2002 | Bhardwaj et al. |
| 6,421,322 B1 | 7/2002 | Koziy et al. |
| 6,422,895 B1 | 7/2002 | Lien |
| 6,424,710 B1 | 7/2002 | Bartolutti et al. |
| 6,456,768 B1 | 9/2002 | Boncek et al. |
| D466,479 S | 12/2002 | Pein et al. |
| 6,499,861 B1 * | 12/2002 | German ................ H01R 13/717 362/234 |
| 6,511,231 B2 | 1/2003 | Lampert et al. |
| 6,522,737 B1 | 2/2003 | Bartolutti et al. |
| 6,524,139 B1 | 2/2003 | Chang |
| 6,554,484 B2 | 4/2003 | Lampert |
| 6,574,586 B1 | 6/2003 | David et al. |
| 6,612,856 B1 | 9/2003 | McCormack |
| 6,626,697 B1 | 9/2003 | Martin et al. |
| 6,636,152 B2 | 10/2003 | Schannach et al. |
| 6,684,179 B1 | 1/2004 | David |
| 6,725,177 B2 | 4/2004 | David et al. |
| 6,743,044 B2 | 6/2004 | Musolf et al. |
| 6,793,408 B2 | 9/2004 | Levy et al. |
| 6,802,735 B2 | 10/2004 | Pepe et al. |
| 6,808,116 B1 | 10/2004 | Eslambolchi et al. |
| 6,811,446 B1 | 11/2004 | Chang |
| 6,814,624 B2 | 11/2004 | Clark et al. |
| 6,847,856 B1 | 1/2005 | Bohannon |
| 6,850,685 B2 | 2/2005 | Tinucci et al. |
| 6,890,197 B2 | 5/2005 | Liebenow |
| 6,898,368 B2 | 5/2005 | Colombo et al. |
| 6,905,363 B2 | 6/2005 | Musolf et al. |
| 6,932,517 B2 | 8/2005 | Swayze et al. |
| D510,068 S | 9/2005 | Haggay et al. |
| 6,939,168 B2 | 9/2005 | Oleynick et al. |
| 6,961,675 B2 | 11/2005 | David |
| 6,968,994 B1 | 11/2005 | Ashwood Smith |
| 6,971,895 B2 | 12/2005 | Sago et al. |
| 6,976,867 B2 | 12/2005 | Navarro et al. |
| 7,077,710 B2 | 7/2006 | Haggay et al. |
| 7,081,808 B2 | 7/2006 | Colombo et al. |
| 7,112,090 B2 | 9/2006 | Caveney et al. |
| 7,123,810 B2 | 10/2006 | Parrish |

(56) References Cited

U.S. PATENT DOCUMENTS

| | | | |
|---|---|---|---|
| 7,153,142 B2 | 12/2006 | Shifris et al. |
| 7,165,728 B2 | 1/2007 | Durrant et al. |
| 7,193,422 B2 | 3/2007 | Velleca et al. |
| 7,207,819 B2 | 4/2007 | Chen |
| 7,210,858 B2 | 5/2007 | Sago et al. |
| 7,226,217 B1 | 6/2007 | Benton et al. |
| 7,234,944 B2 | 6/2007 | Nordin et al. |
| 7,241,157 B2 | 7/2007 | Zhuang et al. |
| 7,297,018 B2 | 11/2007 | Caveney et al. |
| 7,312,715 B2 | 12/2007 | Shalts et al. |
| D559,186 S | 1/2008 | Kelmer |
| 7,315,224 B2 | 1/2008 | Gurovich et al. |
| 7,352,285 B2 | 4/2008 | Sakama et al. |
| 7,352,289 B1 | 4/2008 | Harris |
| 7,370,106 B2 | 5/2008 | Caveney |
| 7,374,101 B2 | 5/2008 | Kaneko |
| 7,384,300 B1 | 6/2008 | Salgado et al. |
| 7,396,245 B2 | 7/2008 | Huang et al. |
| 7,479,032 B2 | 1/2009 | Hoath et al. |
| 7,481,681 B2 | 1/2009 | Caveney et al. |
| 7,497,709 B1 | 3/2009 | Zhang |
| 7,519,000 B2 | 4/2009 | Caveney et al. |
| 7,534,137 B2 | 5/2009 | Caveney et al. |
| 7,552,872 B2 | 6/2009 | Tokita et al. |
| 7,559,805 B1 | 7/2009 | Yi et al. |
| 7,563,116 B2 | 7/2009 | Wang |
| 7,570,861 B2 | 8/2009 | Smrha et al. |
| 7,575,454 B1 | 8/2009 | Aoki et al. |
| 7,588,470 B2 | 9/2009 | Li et al. |
| 7,591,667 B2 | 9/2009 | Gatnau Navarro et al. |
| 7,605,707 B2 | 10/2009 | German et al. |
| 7,607,926 B2 | 10/2009 | Wang |
| 7,635,280 B1 | 12/2009 | Crumlin et al. |
| 7,648,377 B2 | 1/2010 | Naito et al. |
| 7,682,174 B2 | 3/2010 | Chen |
| 7,684,197 B2 | 3/2010 | Zhu et al. |
| 7,722,370 B2 | 5/2010 | Chin |
| 7,727,026 B2 | 6/2010 | Qin et al. |
| 7,753,717 B2 | 7/2010 | Belopolsky et al. |
| 7,785,154 B2 | 8/2010 | Peng |
| 7,794,286 B2 | 9/2010 | AbuGhazaleh et al. |
| 7,798,832 B2 | 9/2010 | Qin et al. |
| 7,811,119 B2 | 10/2010 | Caveney et al. |
| 7,814,240 B2 | 10/2010 | Salgado et al. |
| 7,867,017 B1 | 1/2011 | Chen |
| 7,869,426 B2 | 1/2011 | Hough et al. |
| 7,872,738 B2 | 1/2011 | Abbott |
| 7,880,475 B2 | 2/2011 | Crumlin et al. |
| 8,157,582 B2 | 4/2012 | Frey et al. |
| 8,272,892 B2 | 9/2012 | McNeely et al. |
| 8,282,425 B2 | 10/2012 | Bopp et al. |
| 8,287,316 B2 | 10/2012 | Pepe et al. |
| 8,449,318 B2 | 5/2013 | Beller et al. |
| 8,992,260 B2 | 3/2015 | Coffey et al. |
| 9,054,440 B2 | 6/2015 | Taylor et al. |
| 9,595,797 B2 | 3/2017 | Taylor et al. |
| 2002/0008613 A1 | 1/2002 | Nathan et al. |
| 2004/0052498 A1 | 3/2004 | Colombo et al. |
| 2004/0240807 A1 | 12/2004 | Frohlich et al. |
| 2006/0148279 A1 | 7/2006 | German et al. |
| 2006/0160395 A1 | 7/2006 | Macauley et al. |
| 2007/0237470 A1 | 10/2007 | Aronson et al. |
| 2007/0254529 A1 | 11/2007 | Pepe et al. |
| 2007/0270042 A1* | 11/2007 | Belopolsky .......... H01R 13/502 439/668 |
| 2008/0090454 A1 | 4/2008 | Hoath et al. |
| 2008/0100467 A1 | 5/2008 | Downie et al. |
| 2009/0097846 A1 | 4/2009 | Kozischek et al. |
| 2009/0098763 A1 | 4/2009 | Below et al. |
| 2009/0166404 A1 | 7/2009 | German et al. |
| 2009/0215310 A1 | 8/2009 | Hoath et al. |
| 2009/0232455 A1 | 9/2009 | Nhep |
| 2010/0048064 A1 | 2/2010 | Peng |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2011/0092100 A1 | 4/2011 | Coffey et al. |
| 2012/0003877 A1 | 1/2012 | Bareel et al. |
| 2012/0021636 A1 | 1/2012 | Debenedictis et al. |
| 2015/0188245 A1 | 7/2015 | Coffey et al. |

FOREIGN PATENT DOCUMENTS

| | | |
|---|---|---|
| CN | 101233436 A | 7/2008 |
| CN | 201230052 Y | 4/2009 |
| DE | 102 44 304 | 3/2004 |
| DE | 10 2004 033 9 | 2/2006 |
| GB | 2 236 398 A | 4/1991 |
| WO | WO 00/65696 | 11/2000 |
| WO | WO 02/47215 A1 | 6/2002 |
| WO | WO 2010/001400 A1 | 1/2010 |
| WO | WO 2010/081186 A1 | 7/2010 |
| WO | WO 2010/121639 A1 | 10/2010 |

OTHER PUBLICATIONS

*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

*Intelligent patching systems carving out a 'large' niche*, Cabling Installation & Maintenance, vol. 12, Issue 7, Jul. 2004 (5 pages).

*intelliMAC: The intelligent way to make Moves, Adds or Changes!* NORDX/CDT © 2003 (6 pages).

International Search Report and Written Opinion for PCT/US2010/052872 dated Jan. 12, 2011.

Invitation to Pay Additional Fees with Partial International Search for PCT/US2010/053228 dated Feb. 14, 2011.

International Search Report and Written Opinion for PCT/US2010/053228 dated Mar. 28, 2011.

iTRACS Physical Layer Manager FAQ, obtained on Jun. 11, 2008 from http://www.itracs.com/products/physical-layer-manager-faqs.html (6 pages).

Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.

Ohtsuki, F. et al., "Design of Optical Connectors with ID Modules," *Electronics and Communications in Japan*, Part 1, vol. 77, No. 2, pp. 94-105 (Feb. 1994).

*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.

TrueNet; TFP Series Rack Mount Fiber Panels, Spec Sheet; May 2008; 8 pages.

* cited by examiner

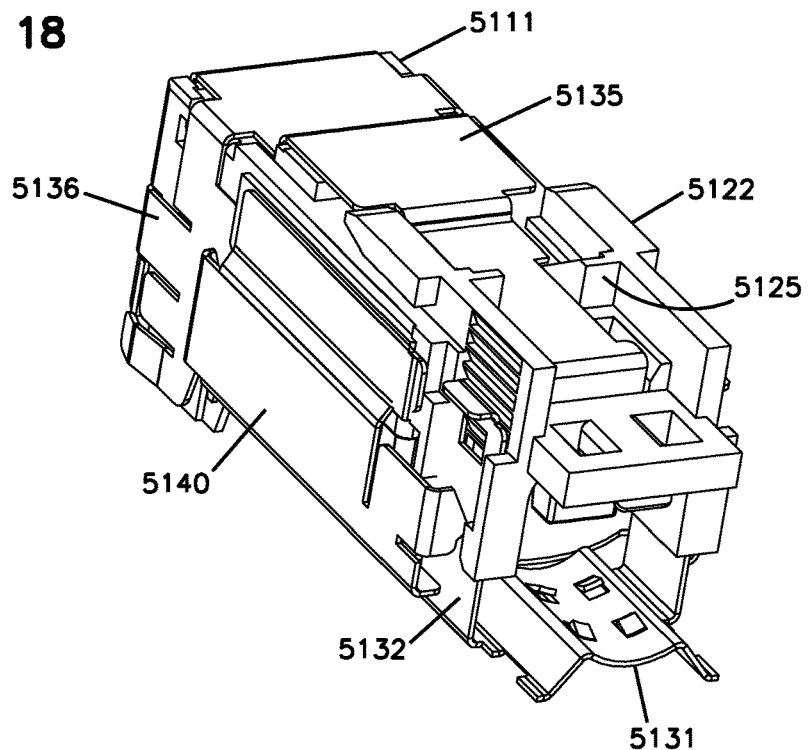
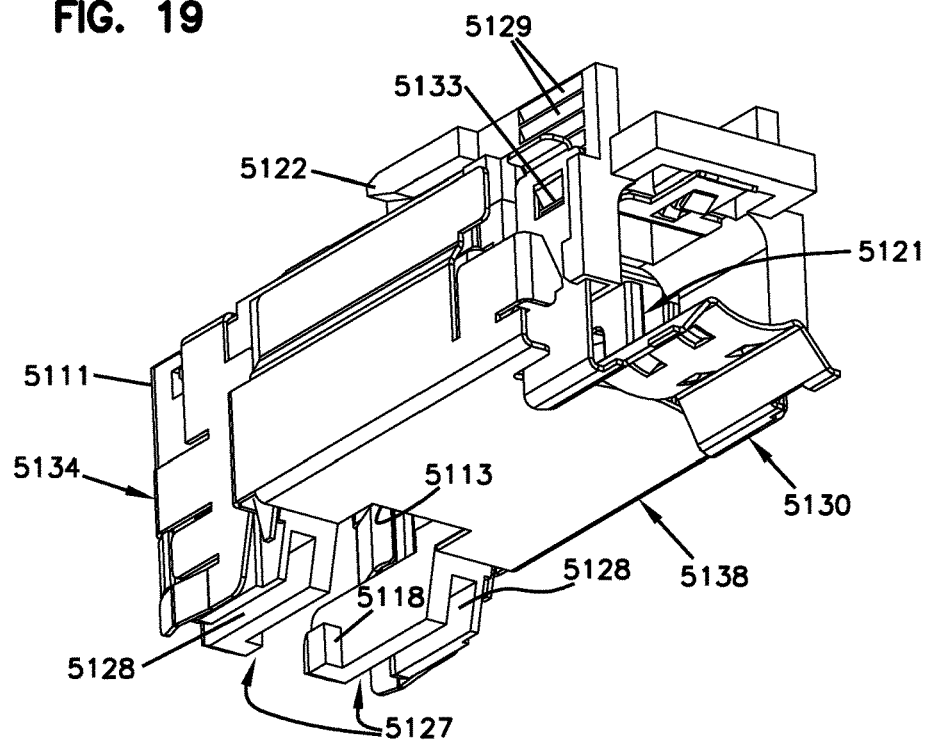

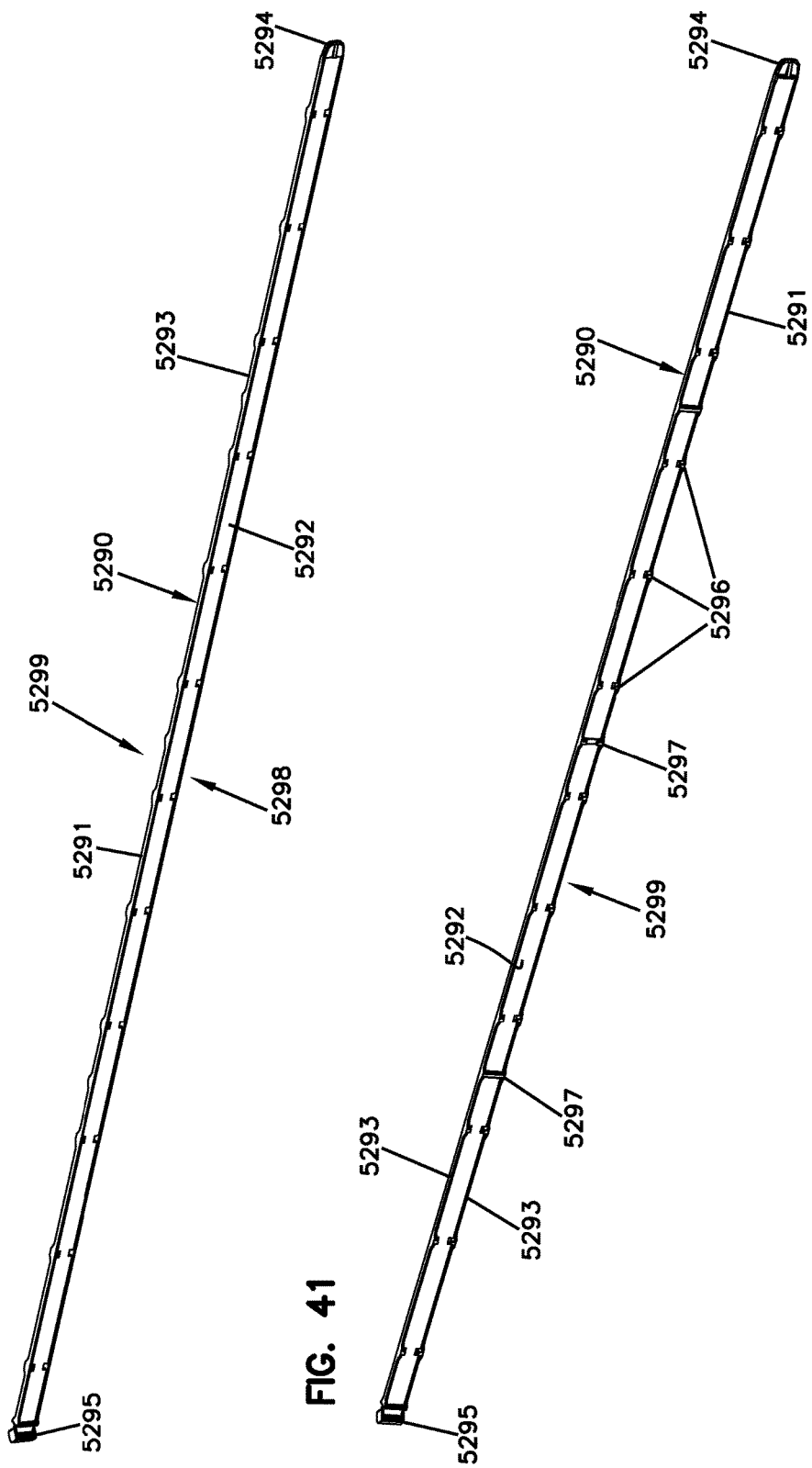

MANAGED ELECTRICAL CONNECTIVITY SYSTEMS

CROSS-REFERENCE TO RELATED APPLICATIONS

This application is a continuation of application Ser. No. 14/733,063, filed Jun. 8, 2015, now U.S. Pat. No. 9,595,797, which is a continuation of application Ser. No. 12/907,724, filed Oct. 19, 2010, now U.S. Pat. No. 9,054,440, which application claims priority from U.S. Provisional Application Ser. No. 61/252,964, filed Oct. 19, 2009, and titled "Electrical Plug for Managed Connectivity Systems;" and U.S. Provisional Application Ser. No. 61/253,208, filed Oct. 20, 2009, and titled "Electrical Plug for Managed Connectivity Systems," which applications are incorporated herein by reference in their entirety.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in limited space available for equipment.

Communications devices can be organized into communications networks, which typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

Network management systems (NMS) are typically aware of logical communication links that exist in a communications network, but typically do not have information about the specific physical layer media (e.g., the communications devices, cables, couplers, etc.) that are used to implement the logical communication links. Indeed, NMS systems typically do not have the ability to display or otherwise provide information about how logical communication links are implemented at the physical layer level.

SUMMARY

The present disclosure relates to communications connector assemblies and arrangements that provide physical layer management (PLM) capabilities. In accordance with certain aspects, the disclosure relates to connector arrangements having primary contact arrangements for communication signal transmission and secondary contact arrangements for management signal transmission.

BRIEF DESCRIPTION OF THE FIGURES

The accompanying drawings, which are incorporated in and constitute a part of the description, illustrate several aspects of the present disclosure. A brief description of the drawings is as follows:

FIGS. 16-23 show an example connector assembly in the form of a jack module configured to receive the plug of FIGS. 4-14;

FIG. 33-51 show a first example patch panel holding one or more jack modules and media reading interfaces in a single row in accordance with aspects of the present disclosure;

DETAILED DESCRIPTION

Figure 1:
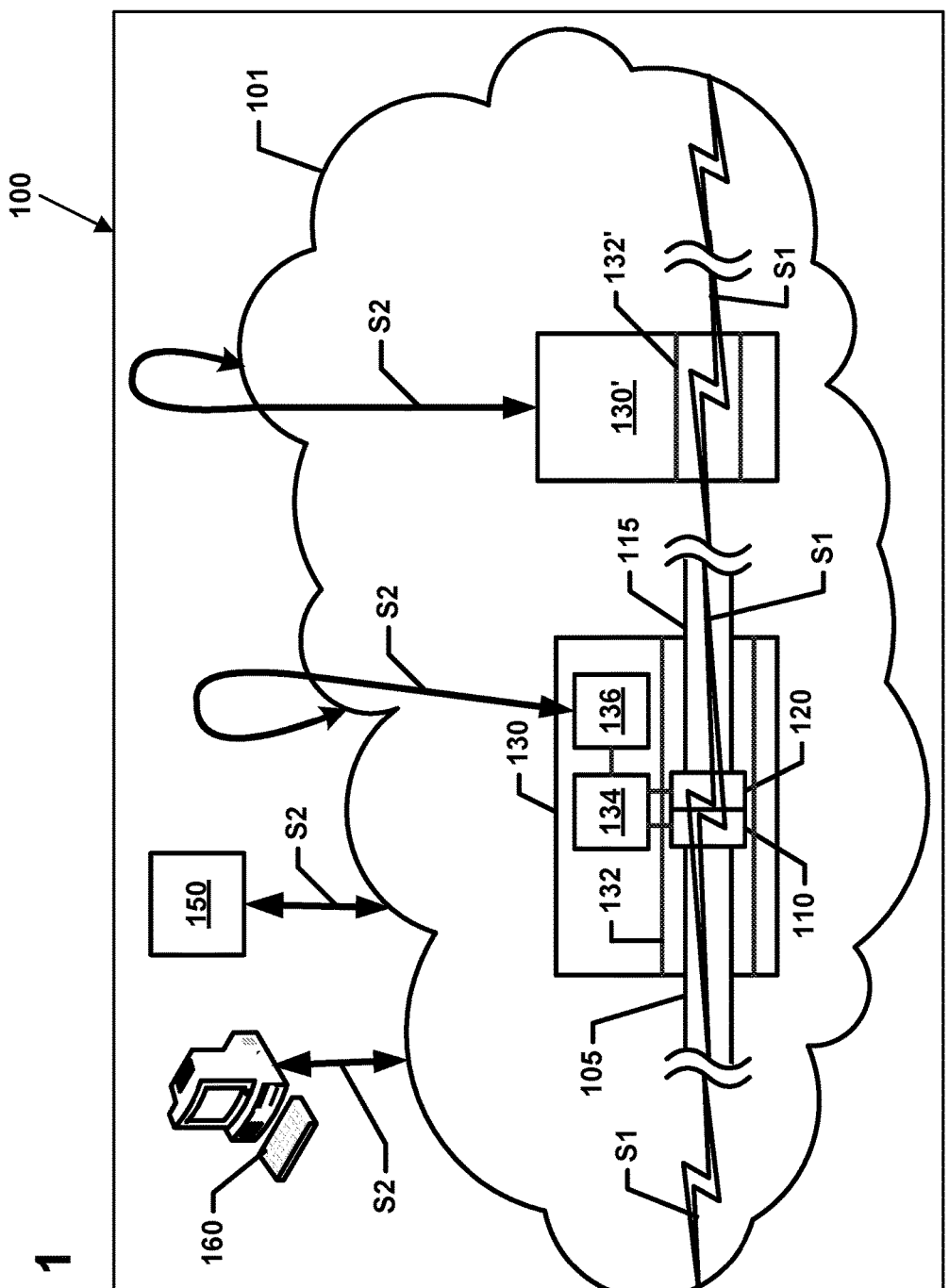
FIG. 1 is a diagram of a portion of an example communications and data management system in accordance with aspects of the present disclosure.

FIG. 1 is a diagram of a portion of an example communications and data management system 100. The example system 100 shown in FIG. 1 includes a part of a communications network 101 along which communications signals S1 pass. In one example implementation, the network 101 can include an Internet Protocol network. In other implementations, however, the communications network 101 may include other types of networks.

The communications network 101 includes interconnected network components (e.g., connector assemblies, inter-networking devices, interne working devices, servers, outlets, and end user equipment (e.g., computers)). In one example implementation, communications signals S1 pass from a computer to a wall outlet to a port of communication panel, to a first port of an inter-networking device, out another port of the inter-networking device, to a port of the same or another communications panel, to a rack mounted server.

The portion of the communications network 101 shown in FIG. 1 includes first and second connector assemblies 130, 130' at which communications signals S1 pass from one portion of the communications network 101 to another portion of the communications network 101. Non-limiting examples of connector assemblies 130, 130' include, for example, rack-mounted connector assemblies (e.g., patch panels, distribution units, and media converters for fiber and copper physical communication media), wall-mounted connector assemblies (e.g., boxes, jacks, outlets, and media converters for fiber and copper physical communication media), and inter-networking devices (e.g., switches, routers, hubs, repeaters, gateways, and access points). In the example shown, the first connector assembly 130 defines at least one port 132 configured to communicatively couple at least a first media segment 105 to at least a second media segment 115 to enable the communication signals S1 to pass between the media segments 105, 115.

The at least one port 132 of the first connector assembly 130 may be directly connected to a port 132' of the second connector assembly 130'. As the term is used herein, the port 132 is directly connected to the port 132' when the communications signals S1 pass between the two ports 132, 132' without passing through an intermediate port. For example, routing a patchcord between port 132 and port 132' directly connects the ports 132, 132'.

The port 132 of the first connector assembly 130 also may be indirectly connected to the port 132' of the second connector assembly 130'. As the term is used herein, the port 132 is indirectly connected to the port 132' when the communications signals S1 pass through an intermediate port when traveling between the ports 132, 132'. For example, in one implementation, the communications signals S1 may be routed over one media segment from the port 132 at the first connector assembly 130 to a port of a third connector assembly at which the media segment is coupled to another media segment that is routed from the port of the third connector assembly to the port 132' of the second connector assembly 130'.

Non-limiting examples of media segments include optical fibers, which carry optical data signals, and electrical conductors (e.g., CAT-5, 6, and 7 twisted-pair cables), which carry electrical data signals. Media segments also can include electrical plugs, fiber optic connectors (e.g., SC, LC, FC, LX.5, or MPO connectors), adapters, media converters, and other physical components terminating to the fibers, conductors, or other such media segments. The techniques described here also can be used with other types of connectors including, for example, BNC connectors, F connectors, DSX jacks and plugs, bantam jacks and plugs.

In the example shown, each media segment 105, 115 is terminated at a plug or connector 110, 120, respectively, which is configured to communicatively connect the media segments 105, 115. For example, in one implementation, the port 132 of the connector assembly 130 can be configured to align ferrules of two fiber optic connectors 110, 120. In another implementation, the port 132 of the connector assembly 130 can be configured to electrically connect an electrical plug with an electrical socket (e.g., a jack). In yet another implementation, the port 132 can include a media converter configured to connect an optical fiber to an electrical conductor.

In accordance with some aspects, the connector assembly 130 does not actively manage (e.g., is passive with respect to) the communications signals S1 passing through port 132. For example, in some implementations, the connector assembly 130 does not modify the communications signal S1 carried over the media segments 105, 115. Further, in some implementations, the connector assembly 130 does not read, store, or analyze the communications signal S1 carried over the media segments 105, 115.

In accordance with aspects of the disclosure, the communications and data management system 100 also provides physical layer information (PLI) functionality as well as physical layer management (PLM) functionality. As the term is used herein, "PLI functionality" refers to the ability of a physical component or system to identify or otherwise associate physical layer information with some or all of the physical components used to implement the physical layer of the system. As the term is used herein, "PLM functionality" refers to the ability of a component or system to manipulate or to enable others to manipulate the physical components used to implement the physical layer of the system (e.g., to track what is connected to each component, to trace connections that are made using the components, or to provide visual indications to a user at a selected component).

As the term is used herein, "physical layer information" refers to information about the identity, attributes, and/or status of the physical components used to implement the physical layer of the communications system 101. In accordance with some aspects, physical layer information of the communications system 101 can include media information, device information, and location information.

As the term is used herein, "media information" refers to physical layer information pertaining to cables, plugs, connectors, and other such media segments. In accordance with some aspects, the media information is stored on or in the media segments, themselves. In accordance with other aspects, the media information can be stored at one or more data repositories for the communications system, either alternatively or in addition to the media, themselves. Non-limiting examples of media information include a part number, a serial number, a plug or other connector type, a conductor or fiber type, a cable or fiber length, cable polarity, a cable or fiber pass-through capacity, a date of manufacture, a manufacturing lot number, information about one or more visual attributes of physical communication media (e.g., information about the color or shape of the physical communication media or an image of the physical communication media), and an insertion count (i.e., a record of the number of times the media segment has been connected to another media segment or network component). Media information also can include testing or media quality or performance information. The testing or media quality or performance information, for example, can be the results of testing that is performed when a particular segment of media is manufactured.

As the term is used herein, "device information" refers to physical layer information pertaining to the communications panels, inter-networking devices, media converters, computers, servers, wall outlets, and other physical communications devices to which the media segments attach. In accordance with some aspects, the device information is stored on or in the devices, themselves. In accordance with other aspects, the device information can be stored at one or more data repositories for the communications system, either alternatively or in addition to the devices, themselves. Non-limiting examples of device information include a device identifier, a device type, port priority data (that associates a priority level with each port), and port updates (described in more detail herein).

As the term is used herein, "location information" refers to physical layer information pertaining to a physical layout of a building or buildings in which the network 101 is deployed. Location information also can include information indicating where each communications device, media segment, network component, or other component that is physically located within the building. In accordance with some aspects, the location information of each system component is stored on or in the respective component. In accordance with other aspects, the location information can be stored at one or more data repositories for the communications system, either alternatively or in addition to the system components, themselves.

In accordance with some aspects, one or more of the components of the communications network 101 is configured to store physical layer information pertaining to the component as will be disclosed in more detail herein. In FIG. 1, the connectors 110, 120, the media segments 105, 115, and/or the connector assemblies 130, 130' may store physical layer information. For example, in FIG. 1, each connector 110, 120 may store information pertaining to itself (e.g., type of connector, data of manufacture, etc.) and/or to the respective media segment 105, 115 (e.g., type of media, test results, etc.).

In another example implementation, the media segments 105, 115 or connectors 110, 120 may store media information that includes a count of the number of times that the media segment (or connector) has been inserted into port 132. In such an example, the count stored in or on the media segment is updated each time the segment (or plug or connector) is inserted into port 132. This insertion count value can be used, for example, for warranty purposes (e.g., to determine if the connector has been inserted more than the number of times specified in the warranty) or for security purposes (e.g., to detect unauthorized insertions of the physical communication media).

In accordance with certain aspects, one or more of the components of the communications network 101 also can read the physical layer information from one or more media segments retained thereat. In certain implementations, one or more network components includes a media reading interface that is configured to read physical layer information stored on or in the media segments or connectors attached thereto. For example, in one implementation, the connector assembly 130 includes a media reading interface 134 that can read media information stored on the media cables 105, 115 retained within the port 132. In another implementation, the media reading interface 134 can read media information stored on the connectors or plugs 110, 120 terminating the cables 105, 115, respectively.

In some implementations, some types of physical layer information can be obtained by the connector assembly 130 from a user at the connector assembly 130 via a user interface (e.g., a keypad, a scanner, a touch screen, buttons, etc.). The connector assembly 130 can provide the physical layer information obtained from the user to other devices or systems that are coupled to the network 101 (as described in more detail herein). In other implementations, some or all physical layer information can be obtained by the connector assembly 130 from other devices or systems that are coupled to the network 101. For example, physical layer information pertaining to media that is not configured to store such information can be entered manually into another device or system that is coupled to the network 101 (e.g., at the connector assembly 130, at the computer 160, or at the aggregation point 150).

In some implementations, some types of non-physical layer information (e.g., network information) can be obtained by one network component from other devices or systems that are coupled to the network 101. For example, the connector assembly 130 may pull non-physical layer information from one or more components of the network 101. In other implementations, the non-physical layer information can be obtained by the connector assembly 130 from a user at the connector assembly 130.

In accordance with some aspects of the disclosure, the physical layer information read by a network component may be processed or stored at the component. For example, in certain implementations, the first connector assembly 130 shown in FIG. 1 is configured to read physical layer information stored on the connectors 110, 120 and/or on the media segments 105, 115 using media reading interface 134. Accordingly, in FIG. 1, the first connector assembly 130 may store not only physical layer information about itself (e.g., the total number of available ports at that assembly 130, the number of ports currently in use, etc.), but also physical layer information about the connectors 110, 120 inserted at the ports and/or about the media segments 105, 115 attached to the connectors 110, 120.

In some implementations, the connector assembly 130 is configured to add, delete, and/or change the physical layer information stored in or on the segment of physical communication media 105, 115 (i.e., or the associated connectors 110, 120). For example, in some implementations, the media information stored in or on the segment of physical communication media 105, 115 can be updated to include the results of testing that is performed when a segment of physical media is installed or otherwise checked. In other implementations, such testing information is supplied to the aggregation point 150 for storage and/or processing. In some implementations, modification of the physical layer information does not affect the communications signals S1 passing through the connector assembly 130.

In other implementations, the physical layer information obtained by the media reading interface (e.g., interface 134 of FIG. 1) may be communicated (see PLI signals S2) over the network 101 for processing and/or storage. The components of the communications network 101 are connected to one or more aggregation devices 150 (described in greater detail herein) and/or to one or more computing systems 160. For example, in the implementation shown in FIG. 1, each connector assembly 130 includes a PLI port 136 that is separate from the "normal" ports 132 of the connector assembly 130. Physical layer information is communicated between the connector assembly 130 and the network 101 through the PLI port 136. In the example shown in FIG. 1, the connector assembly 130 is connected to a representative aggregation device 150, a representative computing system 160, and to other components of the network 101 (see looped arrow) via the PLI port 136.

The physical layer information is communicated over the network 101 just like any other data that is communicated over the network 101, while at the same time not affecting the communication signals S1 that pass through the connector assembly 130 on the normal ports 132. Indeed, in some implementations, the physical layer information may be communicated as one or more of the communication signals S1 that pass through the normal ports 132 of the connector assemblies 130, 130'. For example, in one implementation, a media segment may be routed between the PLI port 136 and one of the "normal" ports 132. In such an implementation, the physical layer information may be passed along the communications network 101 to other components of the communications network 101 (e.g., to the one or more aggregation points 150 and/or to the one or more computer systems 160). By using the network 101 to communicate physical layer information pertaining to it, an entirely separate network need not be provided and maintained in order to communicate such physical layer information.

In other implementations, however, the communications network 101 includes a data network along which the physical layer information described above is communicated. At least some of the media segments and other components of the data network may be separate from those of the communications network 101 to which such physical layer information pertains. For example, in some implementations, the first connector assembly 130 may include a plurality of fiber optic adapters defining ports at which connectorized optical fibers are optically coupled together to create an optical path for communications signals S1. The first connector assembly 130 also may include one or more electrical cable ports at which the physical layer information (see PLI signals S2) are passed to other parts of the data network. (e.g., to the one or more aggregation points 150 and/or to the one or more computer systems 160).

Figure 2:
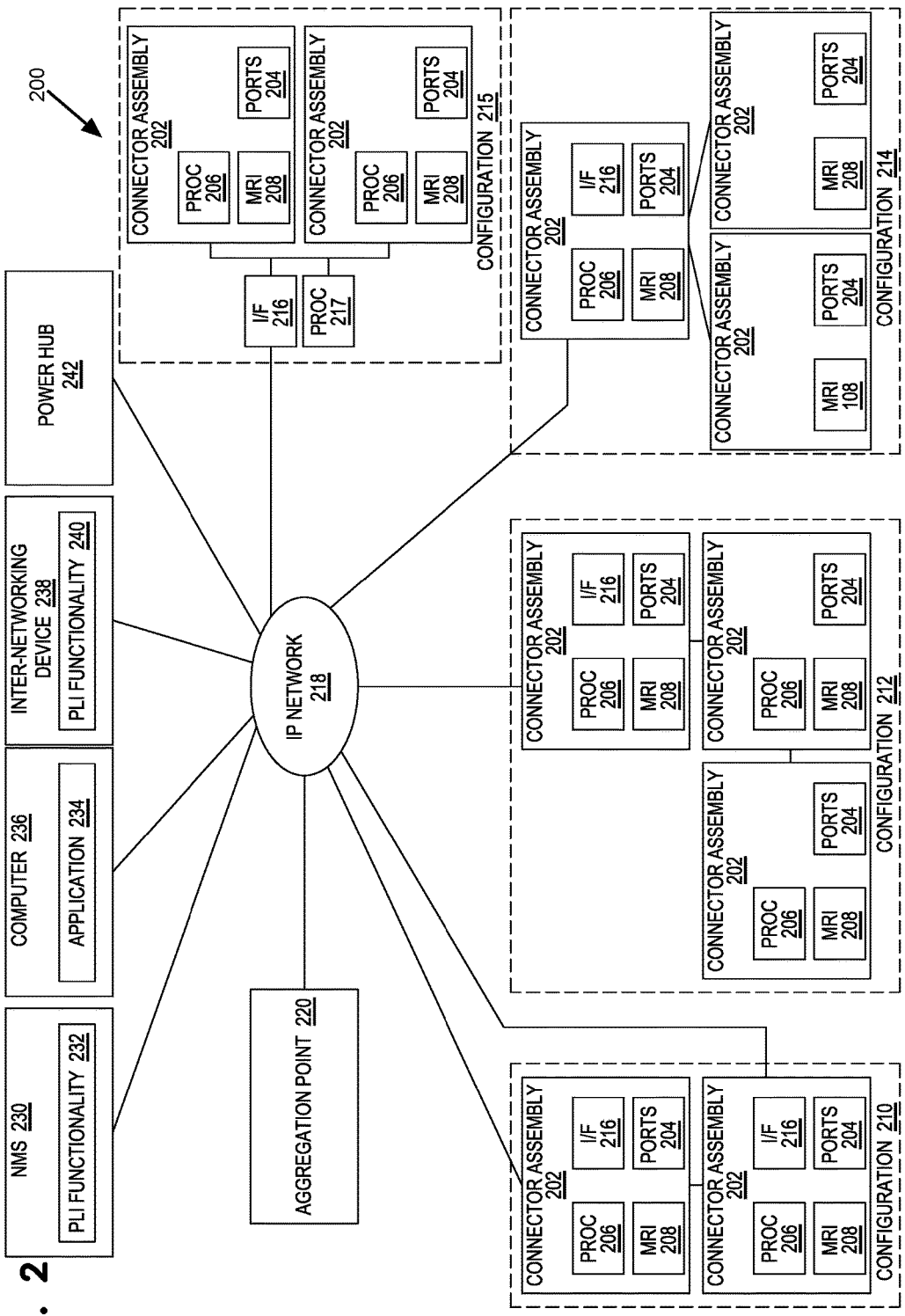
FIG. 2 is a block diagram of one implementation of a communications management system that includes PLI functionality as well as PLM functionality in accordance with aspects of the present disclosure.

FIG. 2 is a block diagram of one example implementation of a communications management system 200 that includes PLI functionality as well as PLM functionality. The management system 200 comprises a plurality of connector assemblies 202. The system 200 includes one or more connector assemblies 202 connected to an IP network 218. The connector assemblies 202 shown in FIG. 2 illustrate various implementations of the connector assembly 130 of FIG. 1.

Each connector assembly 202 includes one or more ports 204, each of which is used to connect two or more segments of physical communication media to one another (e.g., to implement a portion of a logical communication link for communication signals S1 of FIG. 1). At least some of the connector assemblies 202 are designed for use with segments of physical communication media that have physical layer information stored in or on them. The physical layer information is stored in or on the segment of physical communication media in a manner that enables the stored information, when the segment is attached to a port 204, to be read by a programmable processor 206 associated with the connector assembly 202.

In the particular implementation shown in FIG. 2, each of the ports 204 of the connector assemblies 202 comprises a respective media reading interface 208 via which the respective programmable processor 206 is able to determine if a physical communication media segment is attached to that port 204 and, if one is, to read the physical layer information stored in or on the attached segment (if such media information is stored therein or thereon). The programmable processor 206 associated with each connector assembly 202 is communicatively coupled to each of the media reading interfaces 208 using a suitable bus or other interconnect (not shown).

In the particular implementation shown in FIG. 2, four example types of connector assembly configurations are shown. In the first connector assembly configuration 210 shown in FIG. 2, each connector assembly 202 includes its own respective programmable processor 206 and its own respective network interface 216 that is used to communicatively couple that connector assembly 202 to an Internet Protocol (IP) network 218.

In the second type of connector assembly configuration 212, a group of connector assemblies 202 are physically located near each other (e.g., in a bay or equipment closet). Each of the connector assemblies 202 in the group includes its own respective programmable processor 206. However, in the second connector assembly configuration 212, some of the connector assemblies 202 (referred to here as "interfaced connector assemblies") include their own respective network interfaces 216 while some of the connector assemblies 202 (referred to here as "non-interfaced connector assemblies") do not. The non-interfaced connector assemblies 202 are communicatively coupled to one or more of the interfaced connector assemblies 202 in the group via local connections. In this way, the non-interfaced connector assemblies 202 are communicatively coupled to the IP network 218 via the network interface 216 included in one or more of the interfaced connector assemblies 202 in the group. In the second type of connector assembly configuration 212, the total number of network interfaces 216 used to couple the connector assemblies 202 to the IP network 218 can be reduced. Moreover, in the particular implementation shown in FIG. 2, the non-interfaced connector assemblies 202 are connected to the interfaced connector assembly 202 using a daisy chain topology (though other topologies can be used in other implementations and embodiments).

In the third type of connector assembly configuration 214, a group of connector assemblies 202 are physically located near each other (e.g., within a bay or equipment closet). Some of the connector assemblies 202 in the group (also referred to here as "master" connector assemblies 202) include both their own programmable processors 206 and network interfaces 216, while some of the connector assemblies 202 (also referred to here as "slave" connector assemblies 202) do not include their own programmable processors 206 or network interfaces 216. Each of the slave connector assemblies 202 is communicatively coupled to one or more of the master connector assemblies 202 in the group via one or more local connections. The programmable processor 206 in each of the master connector assemblies 202 is able to carry out the PLM functions for both the master connector assembly 202 of which it is a part and any slave connector assemblies 202 to which the master connector assembly 202 is connected via the local connections. As a result, the cost associated with the slave connector assemblies 202 can be reduced. In the particular implementation shown in FIG. 2, the slave connector assemblies 202 are connected to a master connector assembly 202 in a star topology (though other topologies can be used in other implementations and embodiments).

Each programmable processor 206 is configured to execute software or firmware that causes the programmable processor 206 to carry out various functions described below. Each programmable processor 206 also includes suitable memory (not shown) that is coupled to the programmable processor 206 for storing program instructions and data. In general, the programmable processor 206 determines if a physical communication media segment is attached to a port 204 with which that processor 206 is associated and, if one is, to read the identifier and attribute information stored in or on the attached physical communication media segment (if the segment includes such information stored therein or thereon) using the associated media reading interface 208.

In the fourth type of connector assembly configuration 215, a group of connector assemblies 202 are housed within a common chassis or other enclosure. Each of the connector assemblies 202 in the configuration 215 includes their own programmable processors 206. In the context of this configuration 215, the programmable processors 206 in each of the connector assemblies are "slave" processors 206. Each of the slave programmable processor 206 is also communicatively coupled to a common "master" programmable processor 217 (e.g., over a backplane included in the chassis or enclosure). The master programmable processor 217 is coupled to a network interface 216 that is used to communicatively couple the master programmable processor 217 to the IP network 218.

In this configuration 215, each slave programmable processor 206 is configured to determine if physical communication media segments are attached to its port 204 and to read the physical layer information stored in or on the attached physical communication media segments (if the attached segments have such information stored therein or thereon) using the associated media reading interfaces 208. The physical layer information is communicated from the slave programmable processor 206 in each of the connector assemblies 202 in the chassis to the master processor 217. The master processor 217 is configured to handle the processing associated with communicating the physical layer information read from by the slave processors 206 to devices that are coupled to the IP network 218.

The system 200 includes functionality that enables the physical layer information that the connector assemblies 202 capture to be used by application-layer functionality outside of the traditional physical-layer management application domain. That is, the physical layer information is not retained in a PLM "island" used only for PLM purposes but is instead made available to other applications. In the particular implementation shown in FIG. 2, the management system 200 includes an aggregation point 220 that is communicatively coupled to the connector assemblies 202 via the IP network 218.

The aggregation point 220 includes functionality that obtains physical layer information from the connector assemblies 202 (and other devices) and stores the physical layer information in a data store. The aggregation point 220 can be used to receive physical layer information from various types of connector assemblies 202 that have functionality for automatically reading information stored in or on the segment of physical communication media. Also, the aggregation point 220 and aggregation functionality 224 can be used to receive physical layer information from other types of devices that have functionality for automatically reading information stored in or on the segment of physical communication media. Examples of such devices include end-user devices—such as computers, peripherals (e.g., printers, copiers, storage devices, and scanners), and IP telephones—that include functionality for automatically reading information stored in or on the segment of physical communication media.

The aggregation point 220 also can be used to obtain other types of physical layer information. For example, in this implementation, the aggregation point 220 also obtains information about physical communication media segments that is not otherwise automatically communicated to an aggregation point 220. This information can be provided to the aggregation point 220, for example, by manually entering such information into a file (e.g., a spreadsheet) and then uploading the file to the aggregation point 220 (e.g., using a web browser) in connection with the initial installation of each of the various items. Such information can also, for example, be directly entered using a user interface provided by the aggregation point 220 (e.g., using a web browser).

The aggregation point 220 also includes functionality that provides an interface for external devices or entities to access the physical layer information maintained by the aggregation point 220. This access can include retrieving information from the aggregation point 220 as well as supplying information to the aggregation point 220. In this implementation, the aggregation point 220 is implemented as "middleware" that is able to provide such external devices and entities with transparent and convenient access to the PLI maintained by the access point 220. Because the aggregation point 220 aggregates PLI from the relevant devices on the IP network 218 and provides external devices and entities with access to such PLI, the external devices and entities do not need to individually interact with all of the devices in the IP network 218 that provide PLI, nor do such devices need to have the capacity to respond to requests from such external devices and entities.

For example, as shown in FIG. 2, a network management system (NMS) 230 includes PLI functionality 232 that is configured to retrieve physical layer information from the aggregation point 220 and provide it to the other parts of the NMS 230 for use thereby. The NMS 230 uses the retrieved physical layer information to perform one or more network management functions. The NMS 230 communicates with the aggregation point 220 over the IP network 218.

As shown in FIG. 2, an application 234 executing on a computer 236 can also use the API implemented by the aggregation point 220 to access the PLI information maintained by the aggregation point 220 (e.g., to retrieve such information from the aggregation point 220 and/or to supply such information to the aggregation point 220). The computer 236 is coupled to the IP network 218 and accesses the aggregation point 220 over the IP network 218.

In the example shown in FIG. 2, one or more inter-networking devices 238 used to implement the IP network 218 include physical layer information (PLI) functionality 240. The PLI functionality 240 of the inter-networking device 238 is configured to retrieve physical layer information from the aggregation point 220 and use the retrieved physical layer information to perform one or more inter-networking functions. Examples of inter-networking functions include Layer 1, Layer 2, and Layer 3 (of the OSI model) inter-networking functions such as the routing, switching, repeating, bridging, and grooming of communication traffic that is received at the inter-networking device.

The aggregation point 220 can be implemented on a standalone network node (e.g., a standalone computer running appropriate software) or can be integrated along with other network functionality (e.g., integrated with an element management system or network management system or other network server or network element). Moreover, the functionality of the aggregation point 220 can be distribute across many nodes and devices in the network and/or implemented, for example, in a hierarchical manner (e.g., with many levels of aggregation points). The IP network 218 can include one or more local area networks and/or wide area networks (e.g., the Internet). As a result, the aggregation point 220, NMS 230, and computer 236 need not be located at the same site as each other or at the same site as the connector assemblies 202 or the inter-networking devices 238.

Also, power can be supplied to the connector assemblies 202 using conventional "Power over Ethernet" techniques specified in the IEEE 802.3af standard, which is hereby incorporated herein by reference. In such an implementation, a power hub 242 or other power supplying device (located near or incorporated into an inter-networking device that is coupled to each connector assembly 202) injects DC power onto one or more of the wires (also referred to here as the "power wires") included in the copper twisted-pair cable used to connect each connector assembly 202 to the associated inter-networking device.

Figure 3:
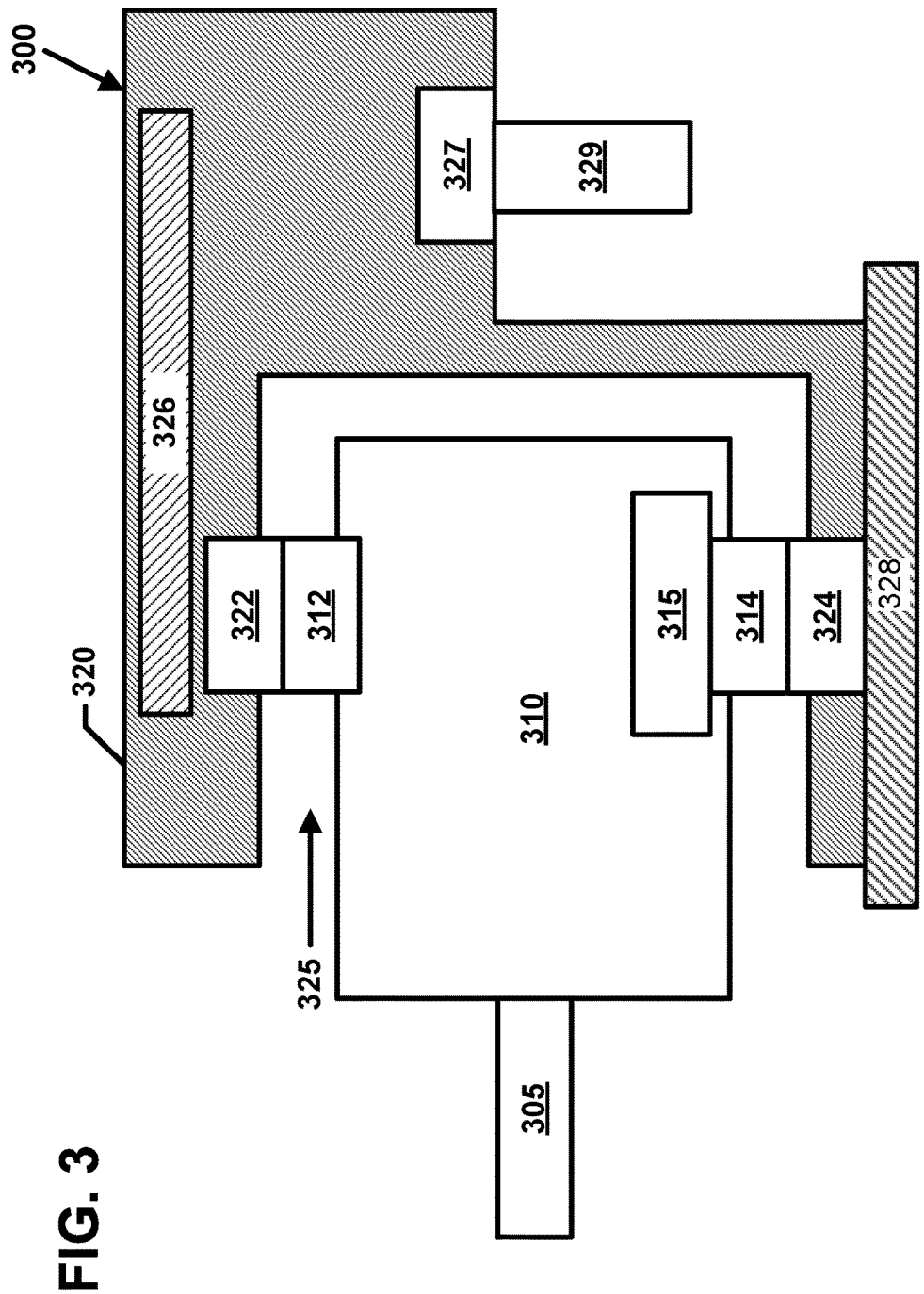
FIG. 3 is a block diagram of one high-level example of a port and media reading interface that are suitable for use in the management system of FIG. 2 in accordance with aspects of the present disclosure.

FIG. 3 is a schematic diagram of one example connection system 300 including a connector assembly 320 configured to collect physical layer information from a connector arrangement 310. The example connection system 300 shown includes a jack module 320 and an electrical plug 310. The connector arrangement 310 terminates at least a first electrical segment (e.g., a conductor cable) 305 of physical communications media and the connector assembly 320 terminates at least second electrical segments (e.g., twisted pairs of copper wires) 329 of physical communications media. The connector assembly 320 defines at least one socket port 325 in which the connector arrangement 310 can be accommodated.

Each electrical segment 305 of the connector arrangement 310 carries communication signals (e.g., communications signals S1 of FIG. 1) to primary contact members 312 on the connector arrangement 310. The connector assembly 320 includes a primary contact arrangement 322 that is accessible from the socket port 325. The primary contact arrangement 322 is aligned with and configured to interface with the primary contact members 312 to receive the communications signals (S1 of FIG. 1) from the primary contact members 312 when the connector arrangement 310 is inserted into the socket 325 of the connector assembly 320.

The connector assembly 320 is electrically coupled to one or more printed circuit boards. For example, the connector assembly 320 can support or enclose a first printed circuit board 326, which connects to insulation displacement contacts (IDCs) 327 or to another type of electrical contacts. The IDCs 327 terminate the electrical segments 329 of physical communications media (e.g., conductive wires). The first printed circuit board 326 manages the primary communication signals carried from the conductors terminating the cable 305 to the electrical segments 329 that couple to the IDCs 327.

In accordance with some aspects, the connector arrangement 310 can include a storage device 315 configured to store physical layer information. The connector arrangement 310 also includes second contact members 314 that are electrically coupled (i.e., or otherwise communicatively coupled) to the storage device 315. In one implementation, the storage device 315 is implemented using an EEPROM (e.g., a PCB surface-mount EEPROM). In other implementations, the storage device 315 is implemented using other non-volatile memory device. Each storage device 315 is arranged and configured so that it does not interfere or interact with the communications signals communicated over the media segment 305.

The connector assembly 320 also includes a second contact arrangement (e.g., a media reading interface) 324. In certain implementations, the media reading interface 324 is accessible through the socket port 325. The second contact arrangement 324 is aligned with and configured to interface with the second contact members 314 of the media segment to receive the physical layer information from the storage device 315 when the connector arrangement 310 is inserted into the socket 325 of the connector assembly 320.

In some such implementations, the storage device interfaces 314 and the media reading interfaces 324 each comprise three (3) leads—a power lead, a ground lead, and a data lead. The three leads of the storage device interface 314 come into electrical contact with three (3) corresponding leads of the media reading interface 324 when the corresponding media segment is inserted in the corresponding port 325. In certain example implementations, a two-line interface is used with a simple charge pump. In still other implementations, additional leads can be provided (e.g., for potential future applications). Accordingly, the storage device interfaces 314 and the media reading interfaces 324 may each include four (4) leads, five (5) leads, six (6) leads, etc.

The storage device 315 also may include a processor or micro-controller, in addition to the storage for the physical layer information. In some example implementations, the micro-controller can be used to execute software or firmware that, for example, performs an integrity test on the cable 305 (e.g., by performing a capacitance or impedance test on the sheathing or insulator that surrounds the cable 305, (which may include a metallic foil or metallic filler for such purposes)). In the event that a problem with the integrity of the cable 305 is detected, the micro-controller can communicate that fact to a programmable processor (e.g., processor 206 of FIG. 2) associated with the port using the storage device interface (e.g., by raising an interrupt). The micro-controller also can be used for other functions.

The connector assembly 320 also can support or enclose a second printed circuit board 328, which connects to the second contact arrangement 324. The second printed circuit board 328 manages the physical layer information communicated from a storage device 315 through second contacts 314, 324. In the example shown, the second printed circuit board 328 is positioned on an opposite side of the connector assembly 320 from the first printed circuit board 326. In other implementations, the printed circuit boards 326, 328 can be positioned on the same side or on different sides. In one implementation, the second printed circuit board 328 is positioned horizontally relative to the connector assembly 320 (see FIG. 3). In another implementation, the second printed circuit board 328 is positioned vertically relative to the connector assembly 320.

The second printed circuit board 328 can be communicatively connected to one or more programmable electronic processors and/or one or more network interfaces. In one implementation, one or more such processors and interfaces can be arranged as components on the printed circuit board 328. In another implementation, one of more such processor and interfaces can be arranged on a separate circuit board that is coupled to the second printed circuit board 328. For example, the second printed circuit board 328 can couple to other circuit boards via a card edge type connection, a connector-to-connector type connection, a cable connection, etc. The network interface is configured to send the physical layer information to the data network (e.g., see signals S2 of FIG. 1).

Figure 4:
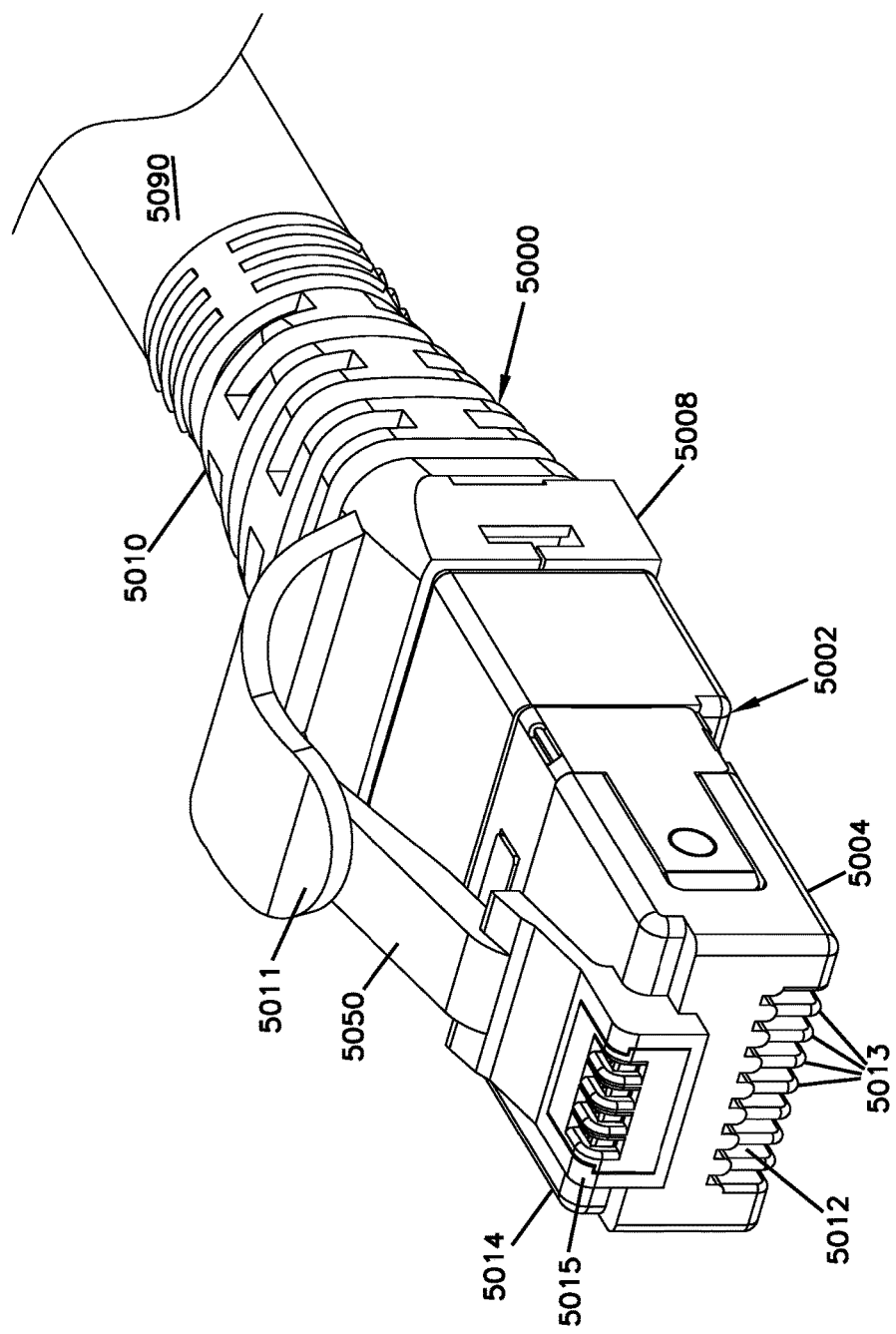
FIGS. 4-14 show an example of a connector arrangement in the form of a modular plug for terminating an electrical communications cable.
Figure 78:
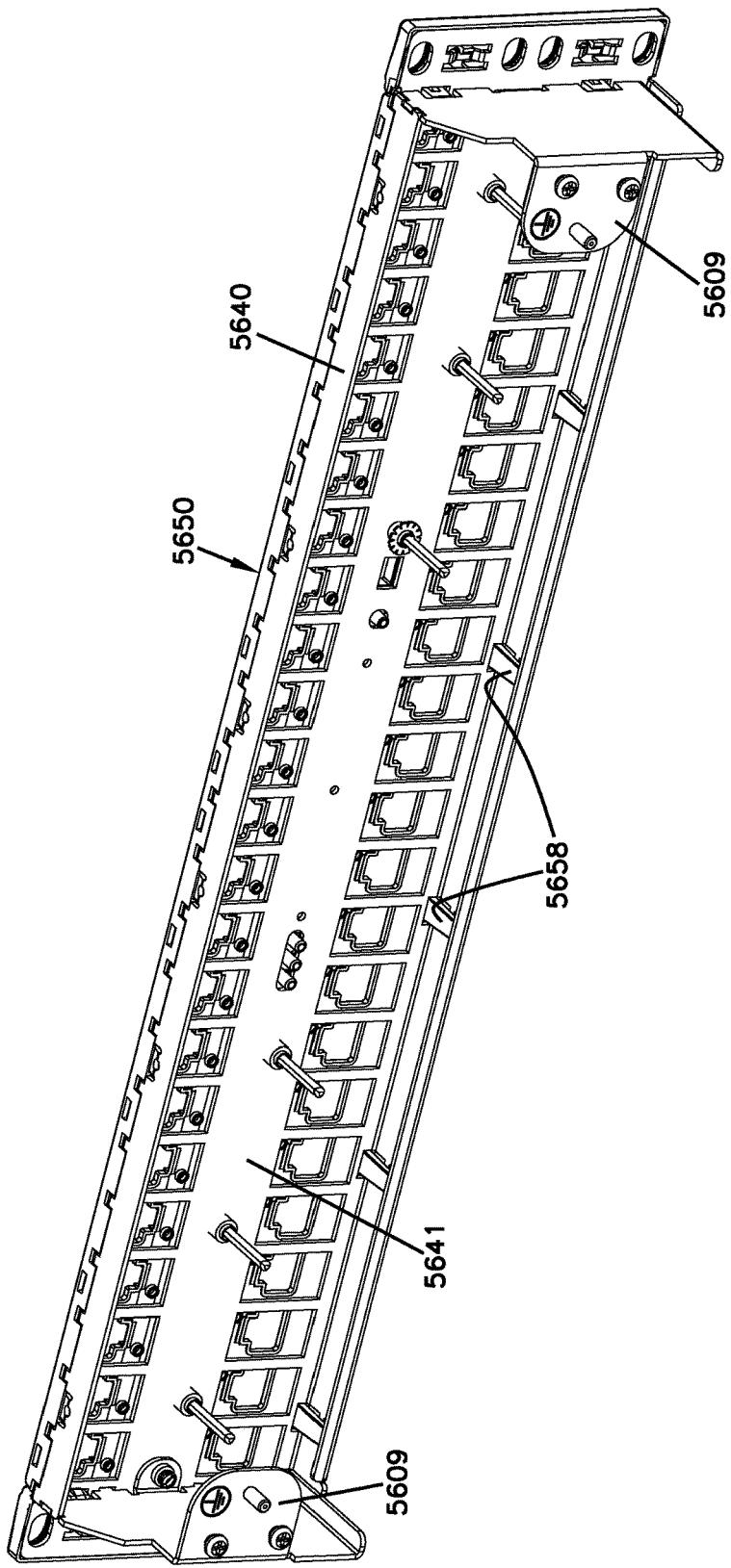

FIGS. 4-78 provide example implementations of physical layer management networks and components for electrical (e.g., copper) communications applications. FIGS. 4-14 show an example of a connector arrangement 5000 in the form of a modular plug 5002 for terminating an electrical communications cable 5090. The connector arrangement 5000 is configured to be received within a port of a connector assembly as will be described in more detail herein. In accordance with one aspect, the connector arrangement 5000 includes a plug 5002, such as an RJ plug, that connects to the end of an electrical segment of communications media, such as twisted pair copper cable 5090.

Figure 5:
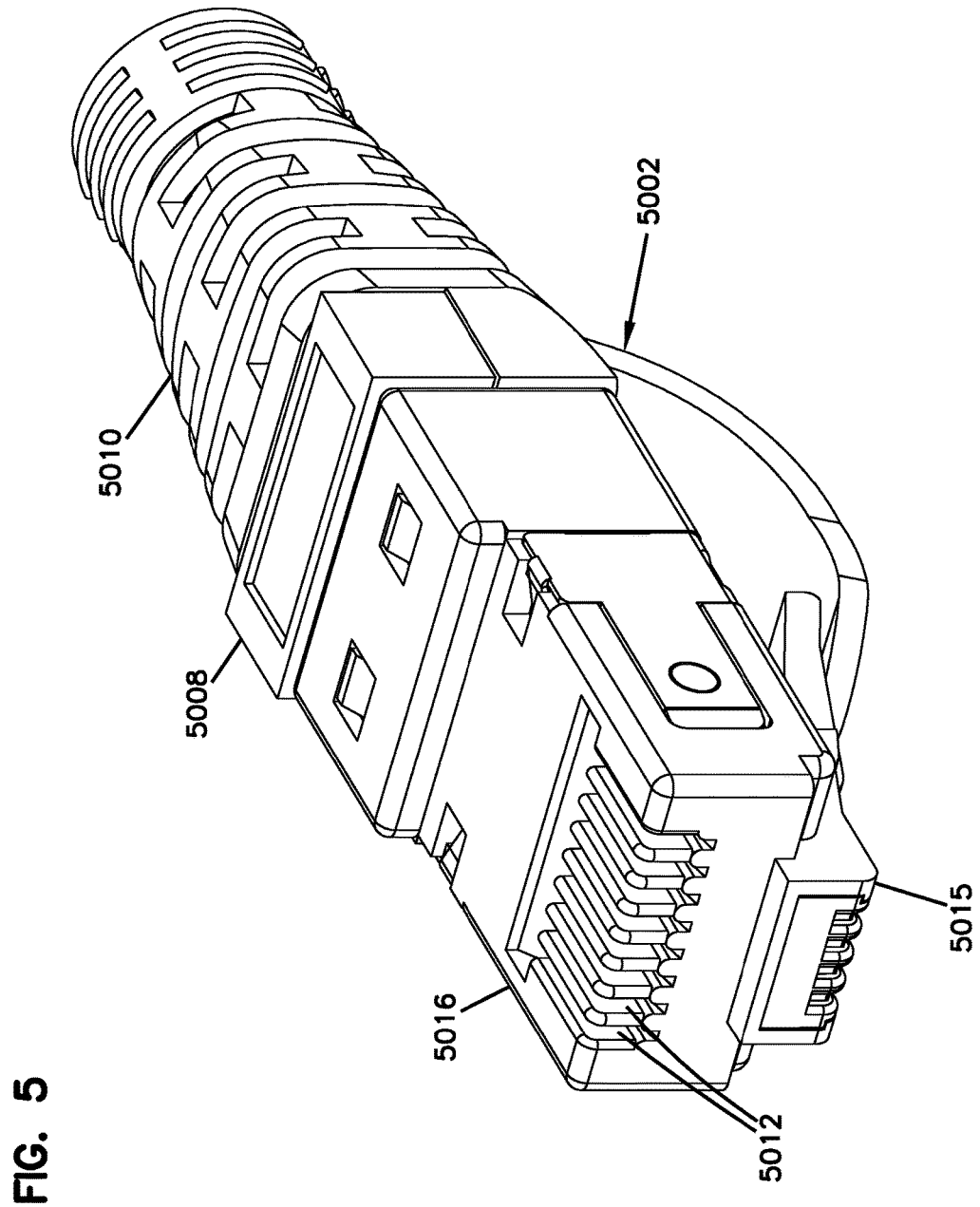
Figure 12:
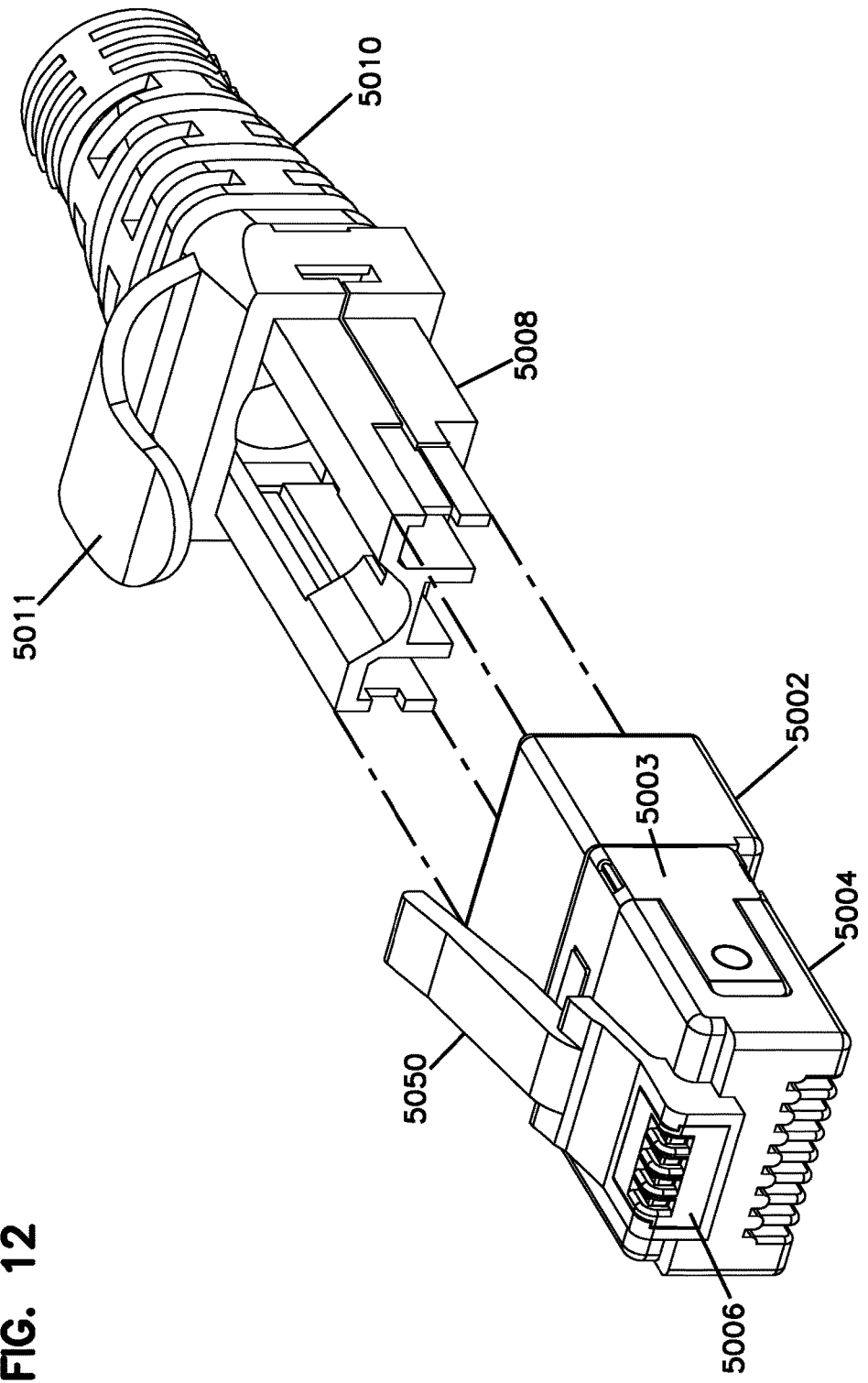
Figure 13:
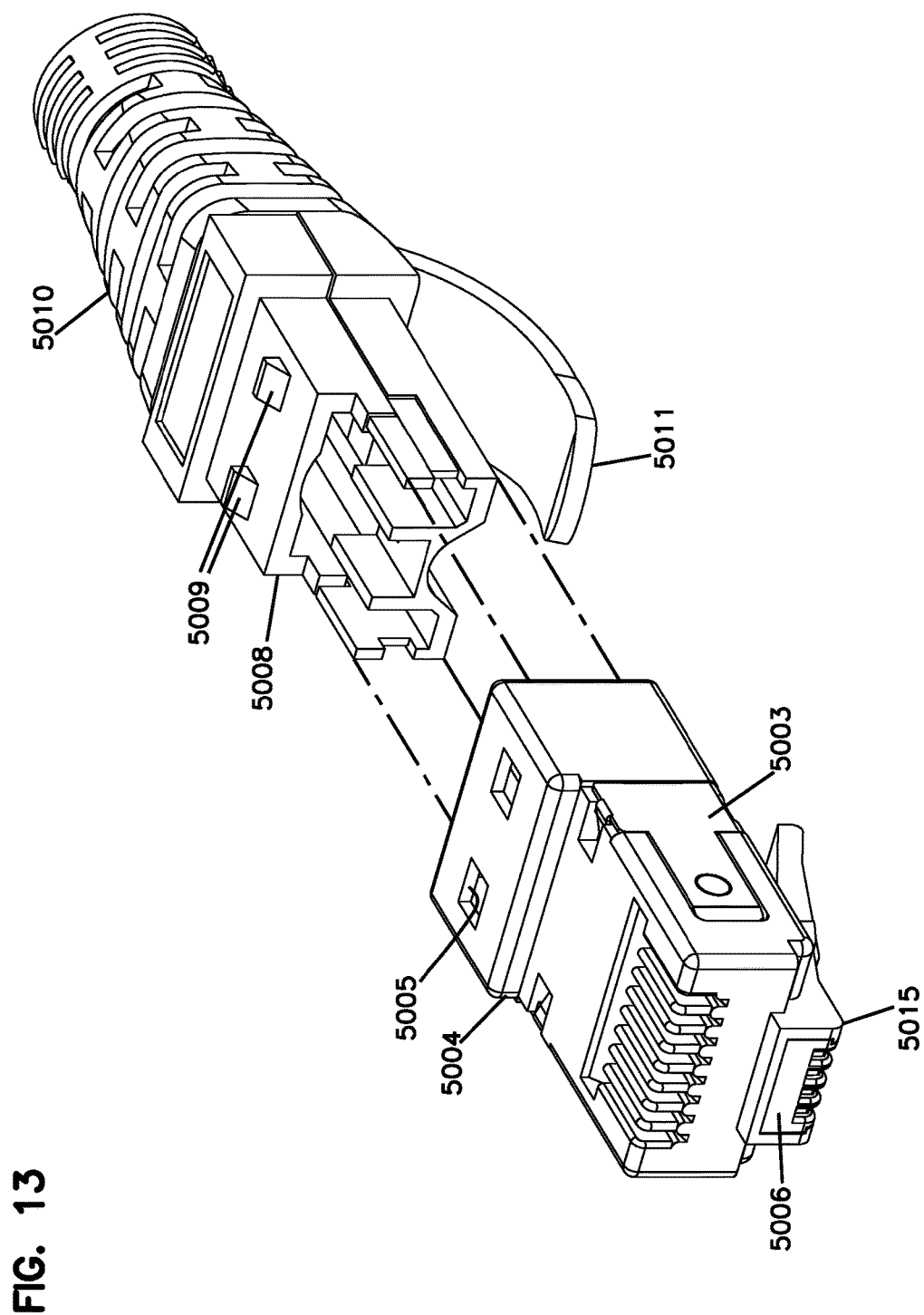
Figure 14:
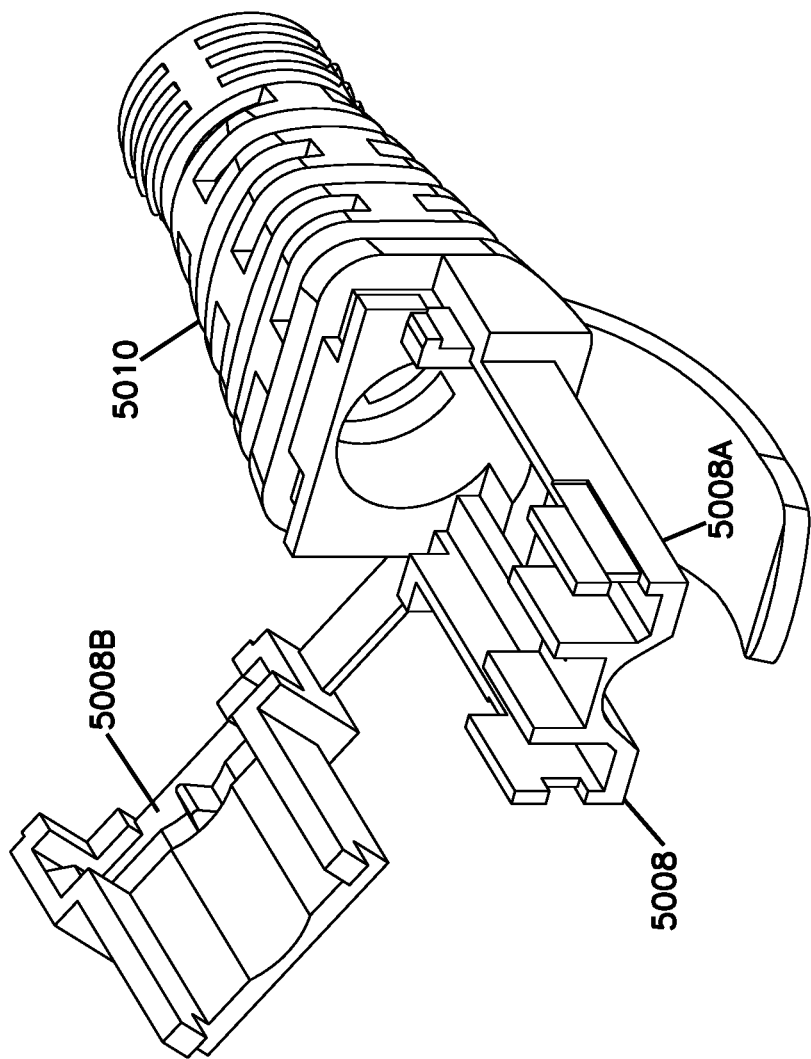

The plug 5002 includes a wire manager 5008 for managing the twisted wire pairs and a strain relief boot 5010, which snaps to the plug 5002 (see FIGS. 4 and 5). For example, the plug 5002 defines openings 5005 in which lugs 5009 on the wire manager 5008 can latch (see FIG. 13). FIGS. 12-14 show details of one example wire manager 5008 and boot 5010 suitable for use with the plug 5002. In the example shown, the wire manager 5008 and boot 5010 are integrally formed. A first portion 5008A of the wire manager 5008 is connected to a second portion 5008B with a living hinge. In other implementations, however, other types of wire managers and boots may be utilized.

The plug 5002 also includes a plug nose body 5004 having a first side 5014 and a second side 5016 (FIGS. 6-11). In one embodiment, a shield 5003 can be mounted to the plug nose body 5004. For example, the shield 5003 can be snap-fit to the plug nose body 5004. The first side 5014 of the plug nose body 5004 includes a key member 5015 and a finger tab 5050 that extends outwardly from the key member 5015. The key member 5015 and finger tab 5050 facilitates aligning and securing the connector arrangement 5000 to a connector assembly as will be described in more detail herein. In certain implementations, the finger tab 5050 attaches to the plug nose body 5004 at the key member 5015. In one implementation, the finger tab 5050 and the key member 5015 are unitary with the plug nose body 5004.

The finger tab 5050 is sufficiently resilient to enable a distal end 5051 of the finger tab 5050 to flex or pivot toward and away from the plug nose body 5004. Certain types of finger tabs 5050 include at least one cam follower surface 5052 and a latch surface 5054 for latching to the connector assembly as will be described in more detail herein. In certain implementations, the finger tab 5050 includes two cam follower surfaces 5052 located on either side of a handle extension 5053 (see FIG. 6). Depressing the handle extension 5053 moves the latch surfaces 5054 toward the plug nose body 5004. In certain implementations, the wire manager 5008 and/or boot 5010 include a flexible grip surface 5011 that curves over at least the distal end 5051 of the handle extension 5053 to facilitate depressing of the handle extension 5053 (e.g., see FIG. 4).

The second side 5016 of the plug nose body 5004 is configured to hold main signal contacts 5012, which are electrically connected to the twisted pair conductors of the communications cable. Ribs 5013 protect the main signal contacts 5012. In the example shown, the plug 5002 is insertable into a port of a mating jack of a connector assembly, such as port 325 of jack module 320 of FIG. 3. The main signal contacts 5012 of the plug 5002 electrically connect to contacts positioned in the jack module to create an electrical path over which communications signals, such as signals S1 of FIG. 1, are carried. In accordance with other aspects, however, the connector arrangement 5000 can define other types of electrical connections.

Figure 6:
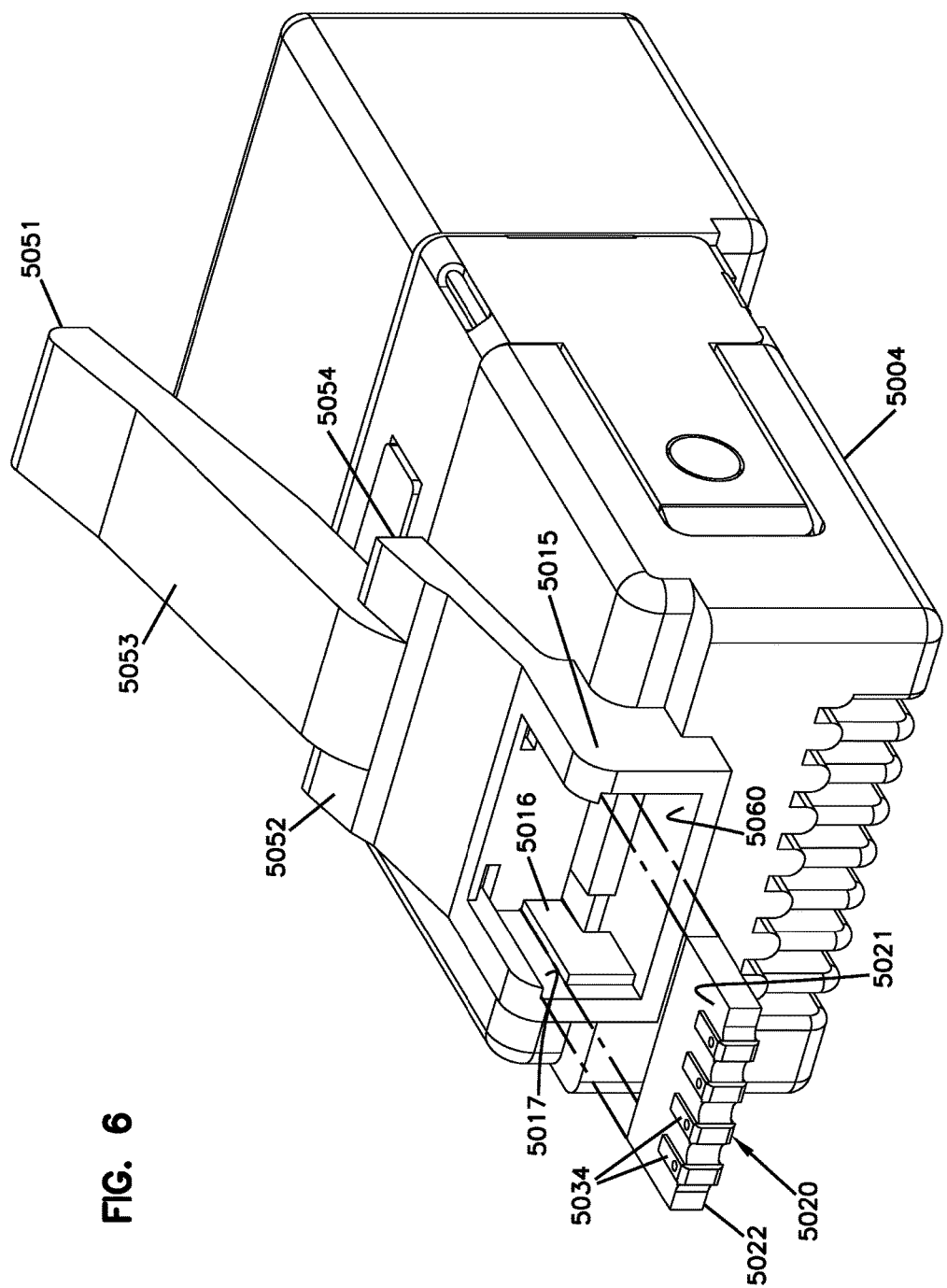

In some implementations, the key member 5015 of the plug nose body 5004 defines a cavity 5060 (see FIG. 6). In accordance with some aspects, the key member 5015 is positioned at a front of the plug nose body 5004. In the example shown, the key member 5015 forms the base 5052 of the finger tab 5050. The key member 5015 includes support members 5016 that defines guide grooves 5017 in the interior sides of the housing member 5015.

The connector arrangement 5000 also includes a storage device 5030 (FIG. 7) that is configured to store information (e.g., an identifier and/or attribute information) pertaining to the segment of physical communications media (e.g., the plug 5002 and/or the electrical cable terminated thereat). In some embodiments, the connector arrangement 5000 also can include additional components to aid in physical layer management. In some embodiments, the storage device 5030 can be arranged on a printed circuit board 5020 that is mounted to the modular plug 5002 (see FIGS. 8-9). In the example shown, the printed circuit board 5020 can be slid along the guide grooves 5017 within the cavity 5060 defined by the housing member 5015. In certain embodiments, additional components can be arranged on the printed circuit board 5020.

Figure 7:
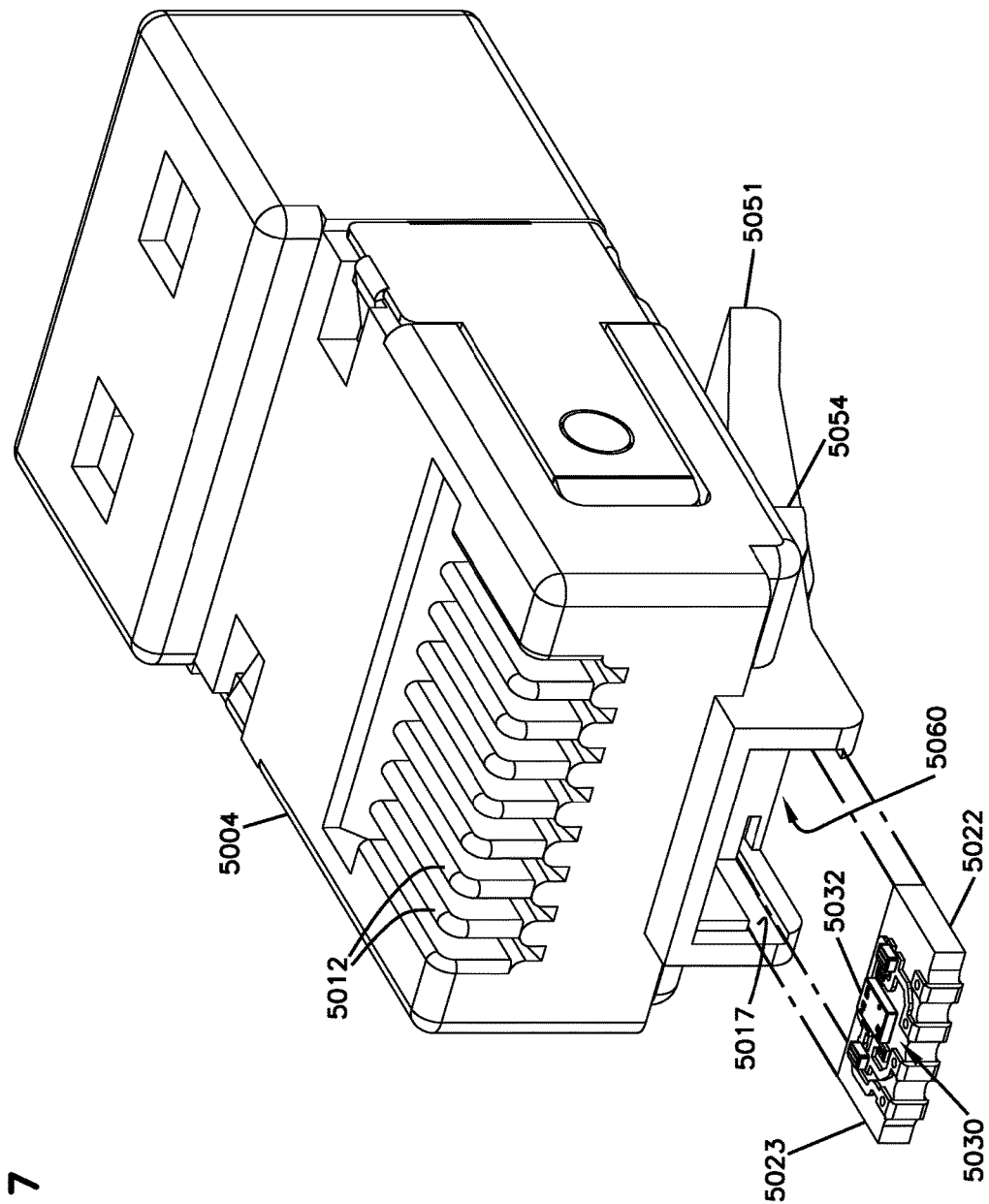

In the example shown in FIGS. 6-7, the printed circuit board 5020 includes a substrate with conductive traces electrically connecting contacts and lands. The circuit 5020 also includes circuit components, including the media storage device 5030, at the lands. In the example shown in FIG. 7, the circuit 5020 includes an EEPROM 5032. In one embodiment, the EEPROM 5032 forms the media storage device 5030 for modular plug 5002. In other embodiments, however, the storage device 5030 can include any suitable type of memory.

In accordance with some aspects, the circuit 5020 defines a body 5022 having a first side 5021 and a second side 5023. The EEPROM 5032 can be mounted to the second side 5023 of the PCB body 5022. The circuit contacts 5034 are arranged on the first side 5023 of the PCB body 5022. The circuit contacts 5034 permit connection of the EEPROM 5032 to a media reading interface, such as media reading interface 324 of FIG. 3.

Figure 8:
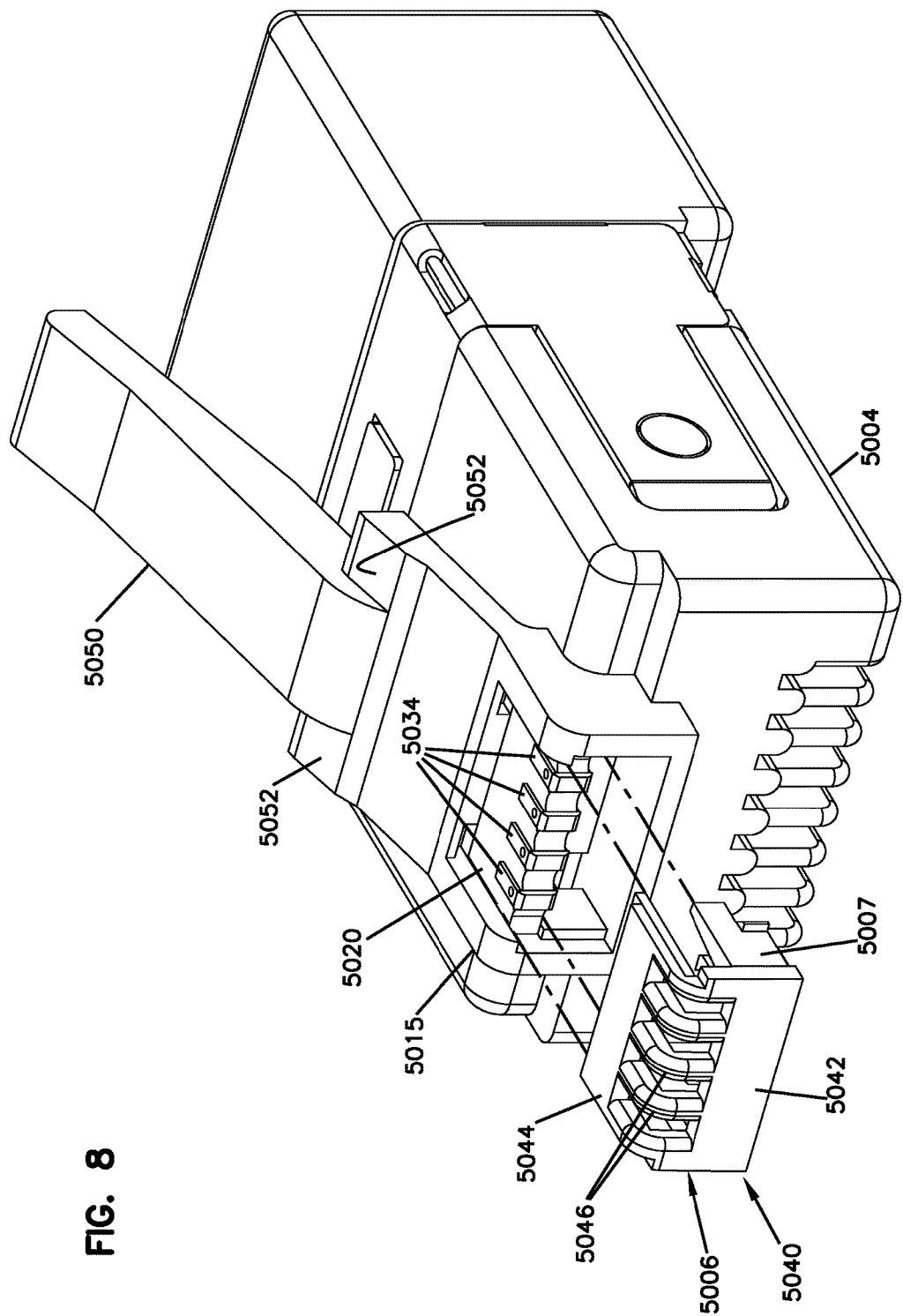
Figure 9:
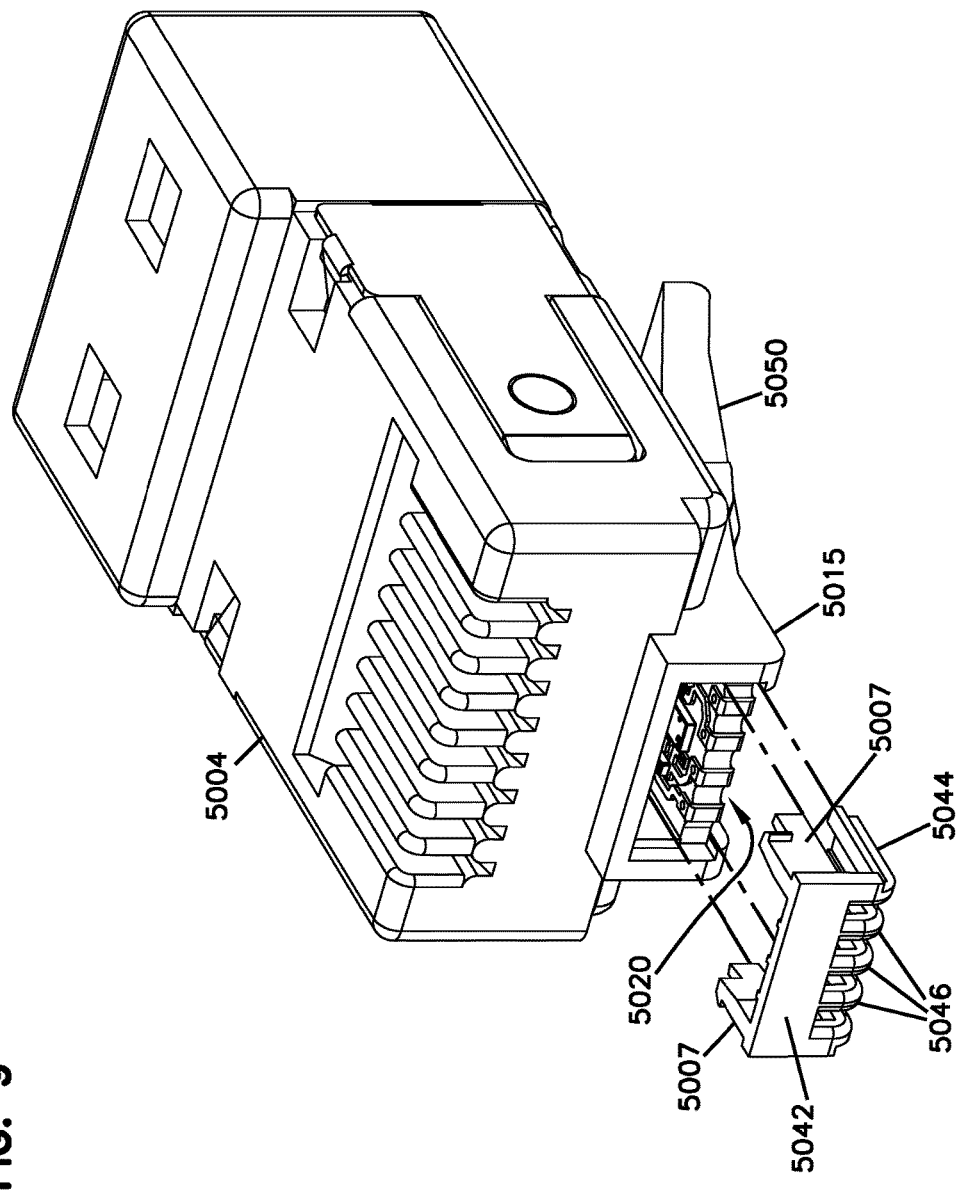
Figure 10:
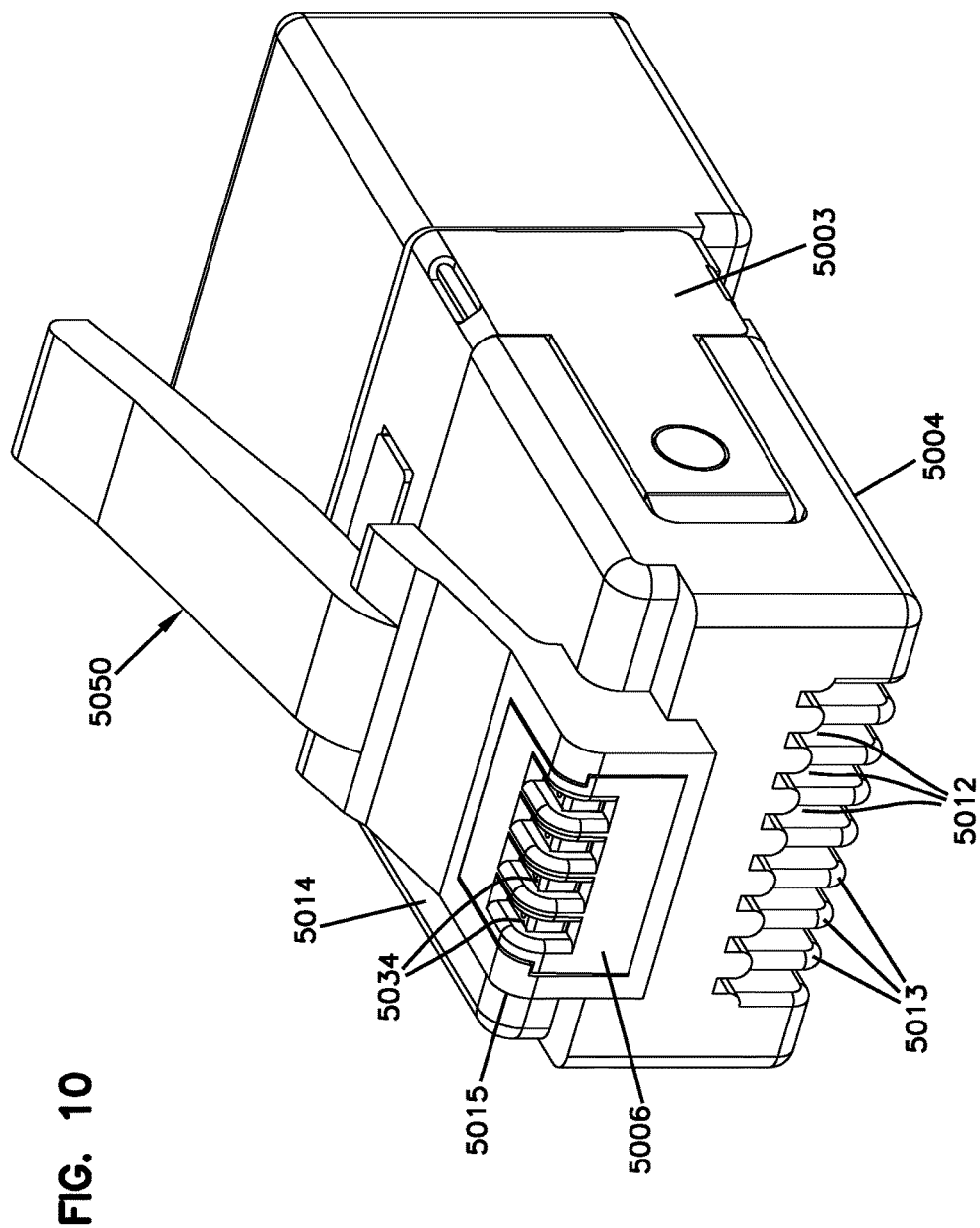
Figure 11:
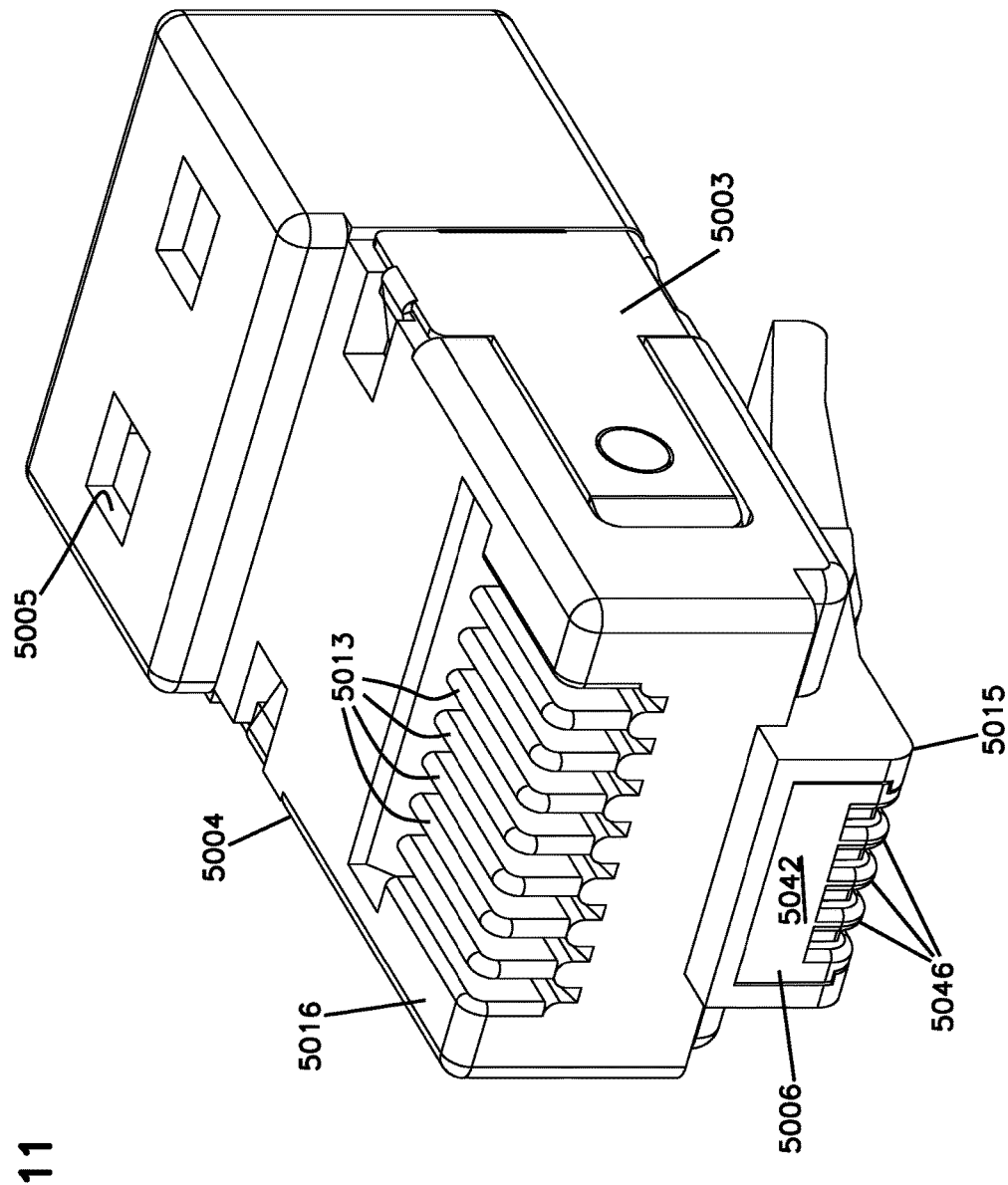

The plug 5002 also includes a plug cover 5006 that mounts on the plug nose body 5004 (see FIGS. 8-9). In the example shown, the plug cover 5006 mounts to the housing member 5015 to enclose the cavity 5060. For example, the plug cover 5006 includes a body 5040 defining a first side 5042 and a second side 5044. In the example shown, the first side 5042 is generally orthogonal to the second side 5044. Ribs 5046 extend between the first and second sides 5042, 5044. In the example shown, the ribs 5046 extend over a curved edge defined by the first and second sides 5042, 5044. In one example, contacts of a media reading interface on a patch panel can extend through the ribs 5046 to connect to the circuit contacts 5034 on the printed circuit board 5020.

The body 5040 of the plug cover 5006 can define latch arms 5007 configured to latch within the cavity 5060 defined in the housing member 5015. For example, the latch arms 5007 can latch behind the support members 5016 defined in the cavity 5060. In the example shown, the latch arms 5007 are configured to extend beneath the printed circuit board 5020 when the board 5020 is mounted within the guiding grooves 5017 in the cavity 5060. In one implementation, the plug cover 5006 fits generally flush with the housing member 5015 when the printed circuit board 5020 is mounted within the housing member 5015 (see FIGS. 10-11)

In accordance with some aspects, the connector arrangement is manufactured by fabricating a plug body 5004 including a key member 5015, mounting a storage device 5030 within a cavity 5060 of the key member 5015, and closing the cavity 5060 with a cover member 5006. In some implementations, fabricating the plug body 5004 includes molding the plug body 5004 with the cavity 5060 in the key member 5015. In other implementations, fabricating the plug body 5004 includes molding the plug body 5004 with the key member 5015 and subsequently eliminating (e.g., cutting, melting, disintegrating, etc.) material in the key member 5015 to form the cavity 5060.

In some implementations, the storage device 5030 is manufactured by mounting an EEPROM chip 5032 on a printed circuit board 5020. Contacts 5034 also are mounted to the printed circuit board 5020 to be electrically connected to the EEPROM chip 5032 via tracings of the printed circuit board 5020. In certain implementations, the EEPROM 5032 is mounted to one side of the printed circuit board and the contacts 5034 are mounted to a different (e.g., opposite) side.

In some implementations, positioning the storage device 5030 within the plug cavity 5060 includes sliding the storage device 5030 along guides 5017 formed in the cavity 5060. In certain implementations, mounting the storage device 5030 within the cavity 5060 including positioning the storage device 5030 within the cavity 5060 with the contact pads 5034 outwardly from the plug body 5004 and the EEPROM 5032 facing inwardly toward the plug body 5004. In certain implementations, closing the cavity 5060 of the plug 5002 includes latching the cover member 5006 to inner surfaces of the key member 5015.

Figure 15:
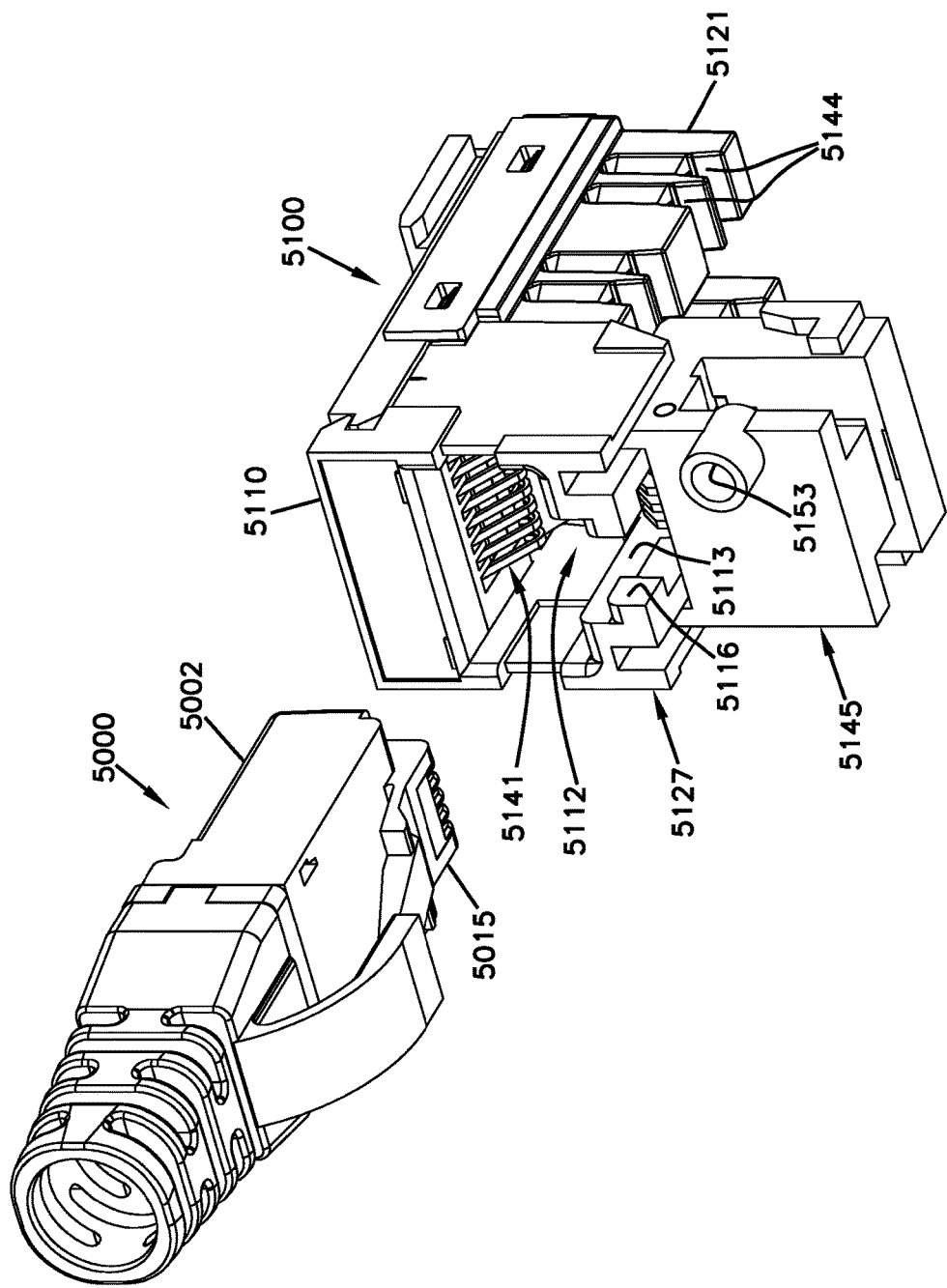
FIG. 15 shows one example plug being inserted into an example jack module, which is connected to an example media reading interface.

FIG. 15 shows one example connector arrangement 5000 (e.g., plug 5002) being inserted into an example connector assembly 5100. The example connector assembly 5100 shown includes a jack module 5110 defining a socket 5112 that is configured to receive the plug 5002. In one implementation, the jack module 5110 includes an RJ-45 jack socket 5112. In other implementations, the jack module 5110 may include another type of jack socket.

Figure 16:
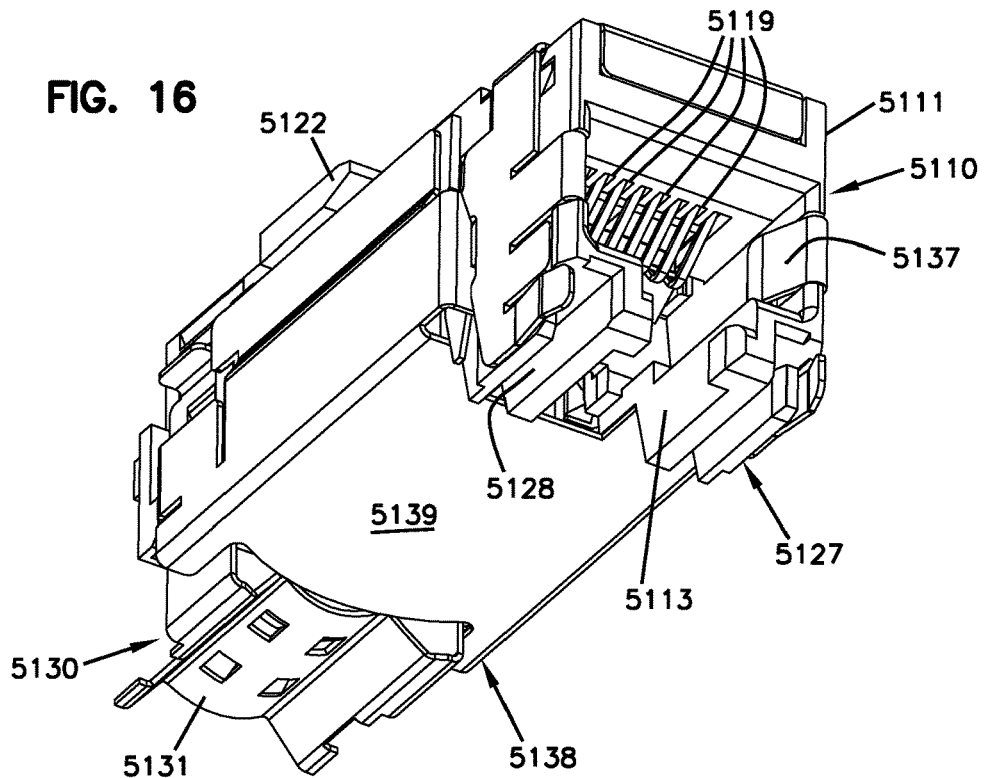
Figure 17:
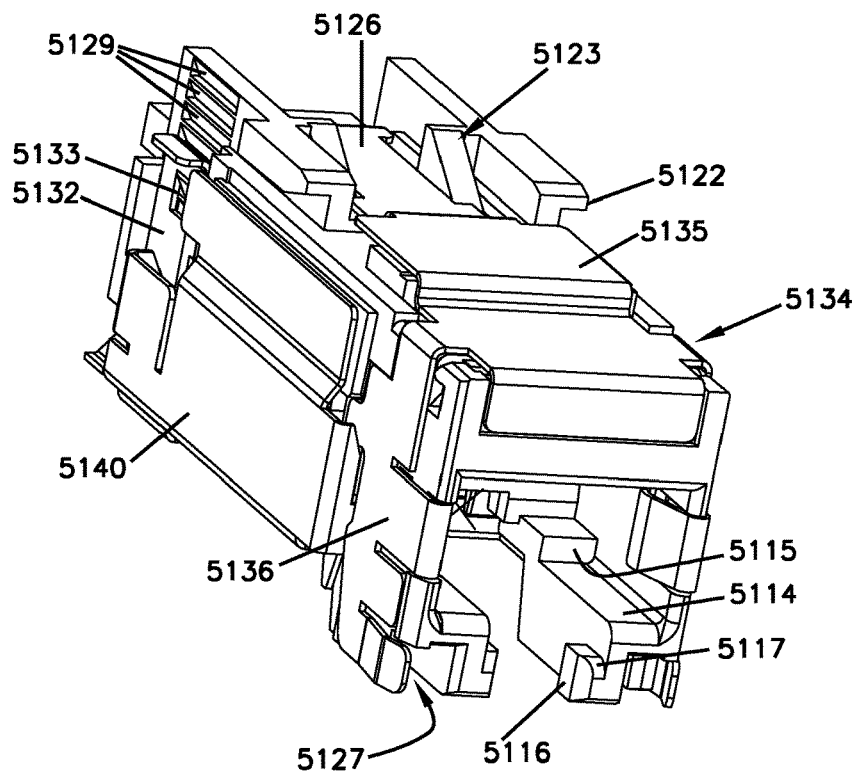

FIGS. 16-23 illustrate one example jack module 5110 that is suitable for use with the plug 5002 disclosed herein. The jack module 5110 also defines slots 5119 through which plug connection contacts 5141 extend into the socket 5112. The plug connection contacts 5141 define contact surfaces 5142 at which the plug connection contacts 5141 contact the main signal contacts 5012 of the plug 5002. The jack module 5110 defines a guide surface 5114 within the socket 5112 that the plug 5002 follows when inserted into the jack module 5110 (FIG. 17). The guide surface 5114 leads to a stop surface 5115 within the socket 5112 that abuts against a front end of the plug 5002 when the plug 5002 is inserted.

Certain types of jack modules 5110 also include latching members 5116 that retain the plug 5002 within the socket 5112 when the plug 5002 is inserted (see FIG. 17). In some implementations, the latching members 5116 having a first end defining a cam surface 5117 and a second end defining a shoulder 5118 (FIG. 19). When the plug 5002 is inserted into the socket 5112, the cam follower surfaces 5052 on the finger tab 5050 of the plug 5002 ride over the cam surface 5117 of the latching member 5116 of the jack module 5110. When the plug 5002 has been sufficiently inserted, the latch surfaces 5054 of the finger tab 5050 snap behind the shoulders 5118 of the latching members 5116 of the jack module 5110.

The latching members 5116 retain the plug 5002 within the socket 5112 and guard against unintentional removal of the plug 5002 from the socket 5112. To remove the plug 5002 from the socket 5112, a user may depress the handle extension 5053 of the finger tab 5050 to flex the finger tab 5050 toward the plug nose body 5004. For example, the user may push on the flexible grip surface 5011 on the plug 5002, which presses on the handle extension 5053 of the finger tab 5050. Flexing the finger tab 5050 toward the plug nose body 5004 lifts the latch surfaces 5054 out of alignment with the shoulders 5118 of the latching members 5116 of the jack module 5110, thereby allowing a user to pull the plug 5002 out of the socket 5112.

Figure 32:
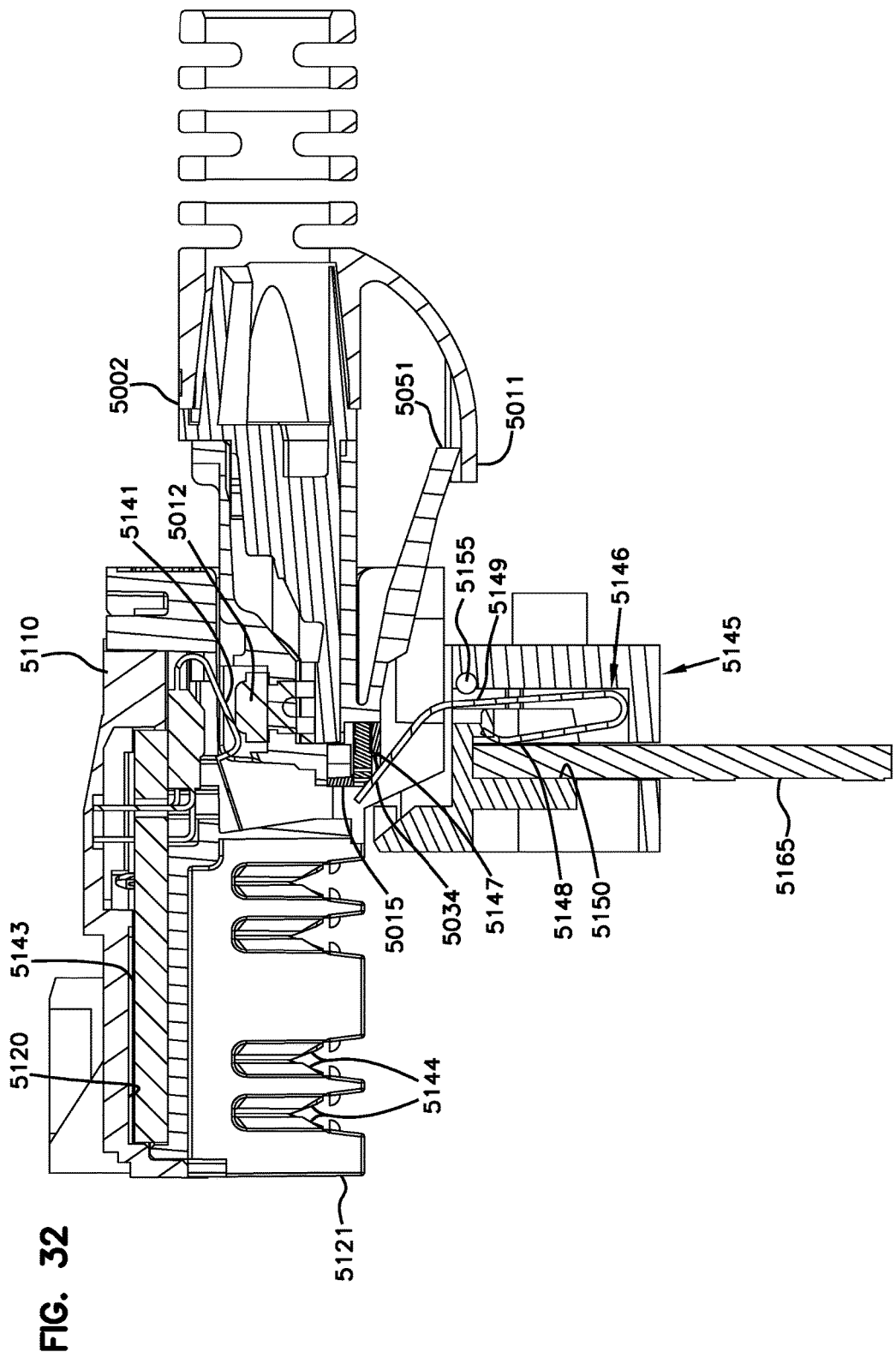
FIG. 32 is a cross-sectional view of FIG. 30 with the bodies of the jack module and media reading interfaces shown.
Figure 33:
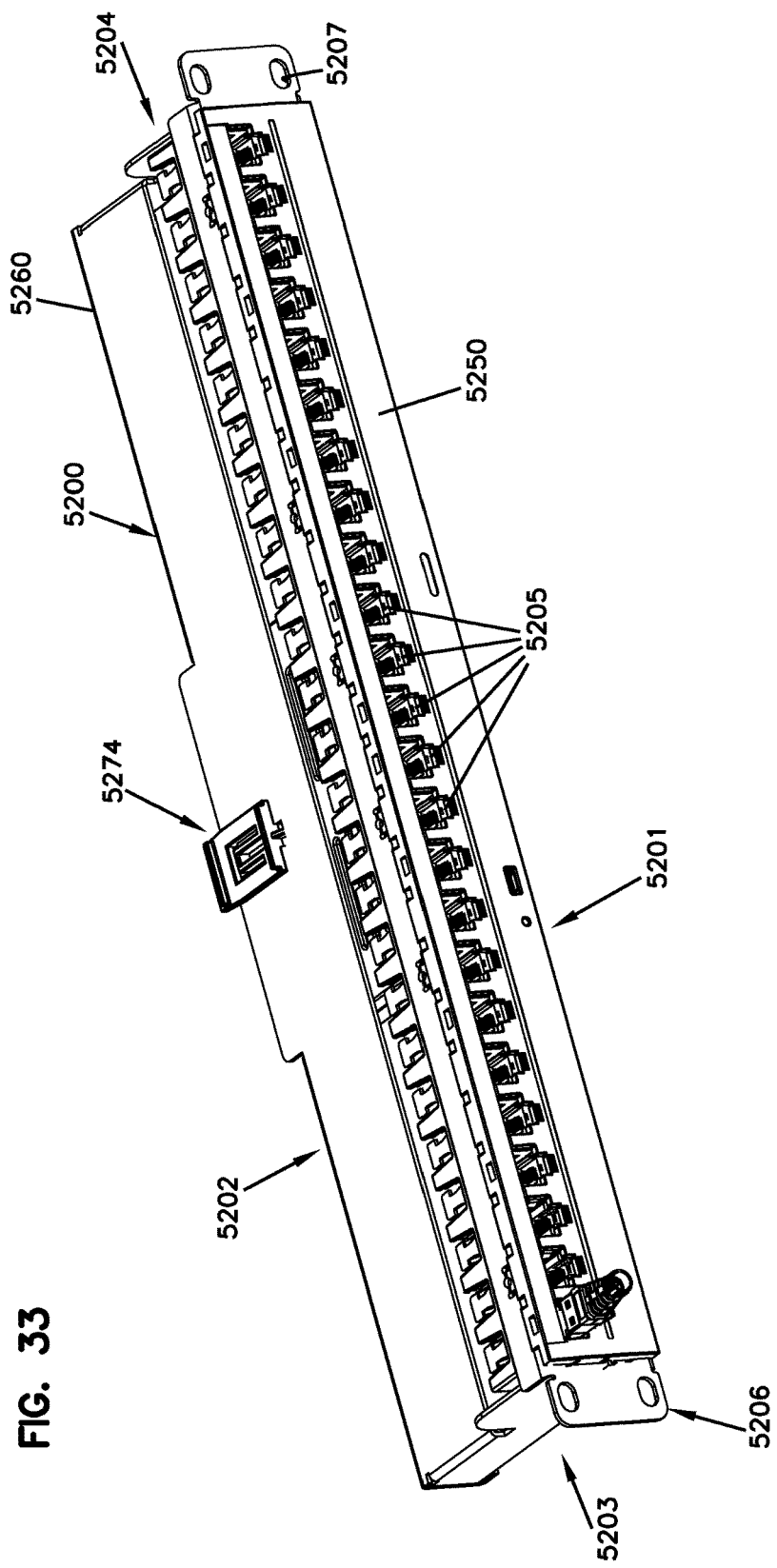

In certain types of jack modules 5110, the plug connection contacts 5141 of the jack module 5110 are configured to electrically couple to one or more insulation displacement contacts (IDCs) 5144 located at an IDC section 5121 of the jack module 5110 (see FIG. 32). Inserting the plug 5002 into the socket 5112 brings the main signal contacts 5012 of the plug 5002 into contact with the contact surfaces 5142 of the plug connection contacts 5141, thereby establishing an electrical connection therebetween. Signals carried by the media segments terminated at the plug 5002 may be transferred to media segments terminated at the IDCs 5144 via the plug main signal contacts 5012 of the jack module 5110. In other implementations, however, the plug connection contacts 5141 may connect to other types of contacts, such as plug contacts of another jack module, or to other electrical components.

In some implementations, the plug connection contacts 5141 connect directly to the IDCs 5144. For example, in one implementation, the plug connection contacts 5141 and the IDCs 5144 may form a unitary contact member. In other implementations, the plug connection contacts 5141 connect to the IDCs 5144 via a first printed circuit board 5143. For example, in one implementation, the plug connection contacts 5141 and the IDCs 5144 may connect to the printed circuit board 5143 using solder pins, using a surface mount connection, or using another type of connection (see FIG. 32). Certain types of jack modules 5110 includes a seat 5120 configured to support the first printed circuit board 5143. In the example shown in FIG. 32, the first printed circuit board 5143 extends in a plane that is parallel to the insertion axis of the plug 5002.

In some implementations, the jack module 5110 also includes a strain relief member 5130 that aids in retaining a second electrical cable at the jack module 5110. In particular, the strain relief member 5130 aids in retaining a second electrical cable having electrical conductors (e.g., wires) terminated at the IDCs 5144 of the jack module 5110. Certain types of strain relief members 5130 include a support surface 5131 connected to at least one arm 5132 having a latching tab 5133 that connects to the jack module 5110. In the example shown in FIGS. 18, 19, and 21, the example strain relief member 5130 includes a curved support surface 5131 extending between two arms 5132, each arm 5132 defining a latching tab 5133.

The jack module 5110 defines at least one rib 5129 at which the latching tab 5133 of the strain relief member 5130 may latch. In the example shown, the jack module 5110 defines multiple ribs 5129 at each side of the jack module 5110. The strain relief device 5130 may be adjusted to accommodate various types and sizes of second cables by latching the tabs 5133 of the strain relief device 5130 to appropriate ribs 5129. In certain implementations, the strain relief device 5130 defines a spring clip such that outward pressure applied to the support member 5131 causes the arms 5132 to flex toward the sides of the jack module 5110, thereby strengthening the force with which the strain relief device 5130 attaches to the jack module 5110. In one implementation, the support member 5131 defines one or more protrusions, cutouts, bumps, or other surface texturing members that aid in retaining the cable against the support member 5131 (e.g., see FIG. 18).

In some implementations, the jack module 5110 includes a second section 5138 that couples to the first section 5111. In certain implementations, the first section 5111 defines the socket 5112, the latching members 5116, and the IDC section 5121. In such implementations, the second section 5138 may cover at least the IDC section 5121 of the first section 5111 to protect the conductor terminations at the IDCs 5144. For example, certain types of second sections 5138 include a base 5139 that extends across the IDC section 5121 and arms 5140 that extend over sides of the jack module 5110 (FIG. 16). The arms 5140 of the second section 5138 may latch or otherwise attach to the first section 5111 of the jack module 5110. In some implementations, the first section 5111 defines the ribs 5129 to which the strain relief member 5130 attaches. In other implementations, however, the second section 5138 may define the ribs 5129.

In some implementations, an electrically conductive shield 5134 may be installed (e.g., snap-fit, clipped, latched, etc.) on the jack module 5110 (FIG. 17). For example, the shield 5134 may be used to ground the jack module 5110 and electrical segments connected therein. In the example shown, the conductive shield 5134 includes a first section 5135 that extends over a first side of the jack module 5110 and side sections 5136 that extend over the sides of the jack module 5110. In certain implementations, the shield 5134 includes wrap-around sections 5137 that wrap around the front of the jack module 5110 and extend at least partially into the socket 5112. The wrap-around sections 5137 are configured to contact the shield 5003 of the plug 5002 when the plug 5002 is inserted in the jack module 5110. In one implementation, the wrap-around sections 5137 define a resilient section to aid in making contact with the plug shield 5003.

Figure 20:
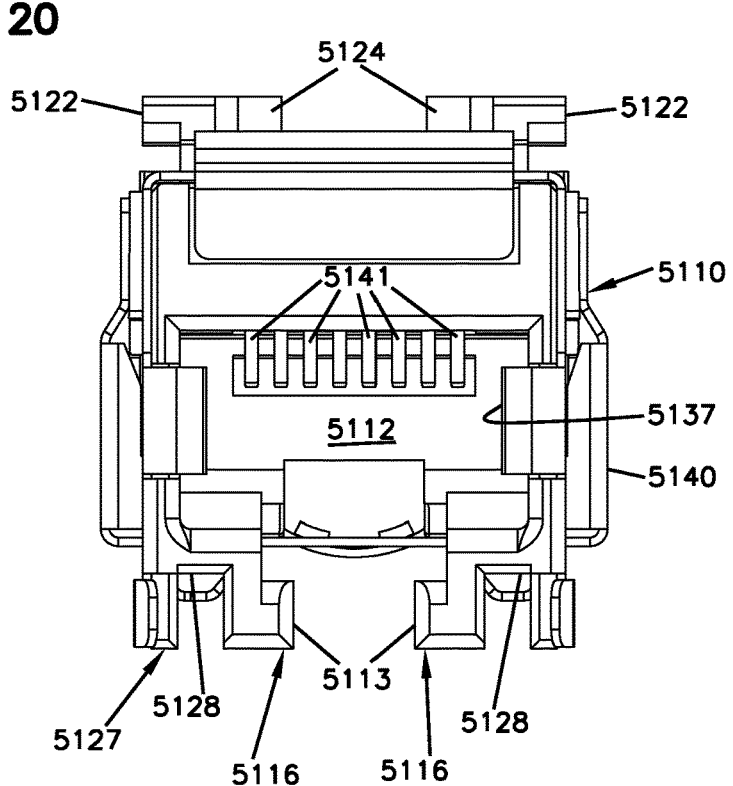
Figure 21:
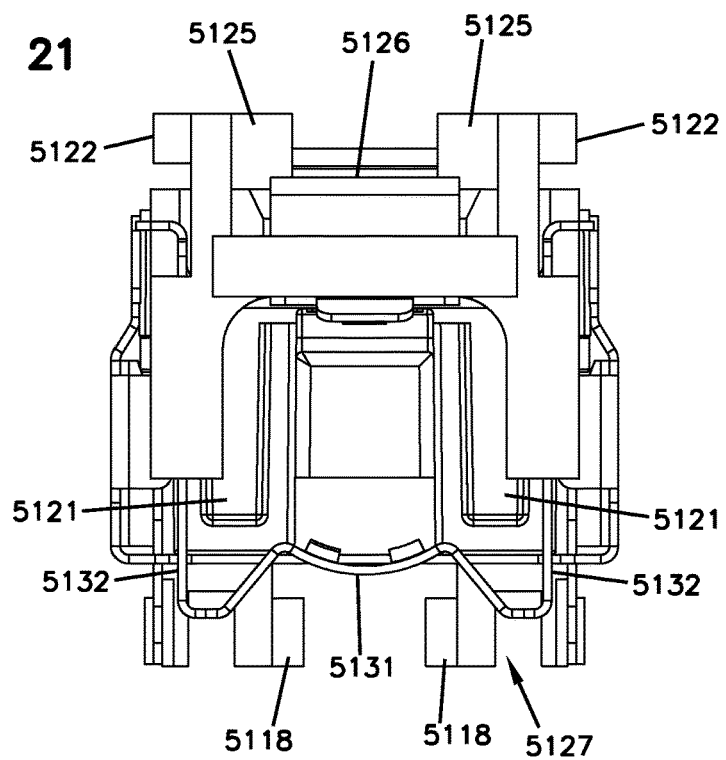
Figure 22:
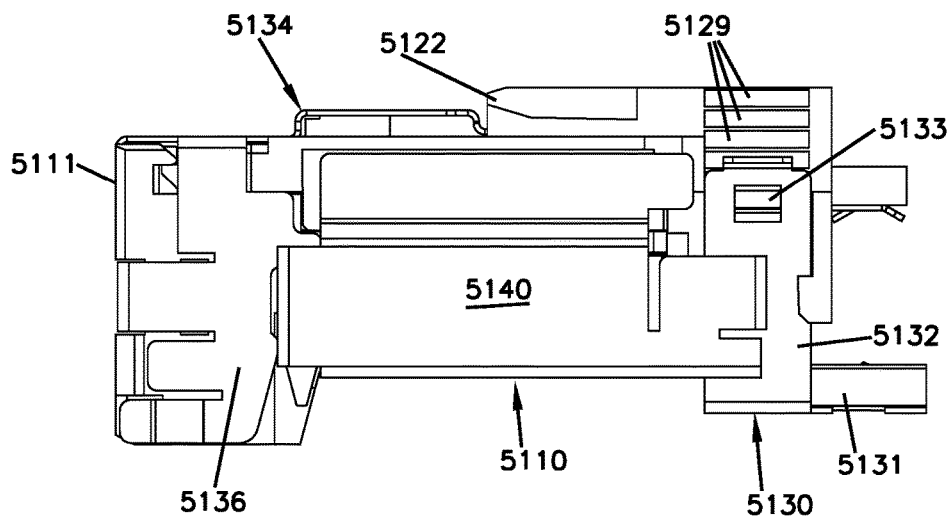
Figure 23:
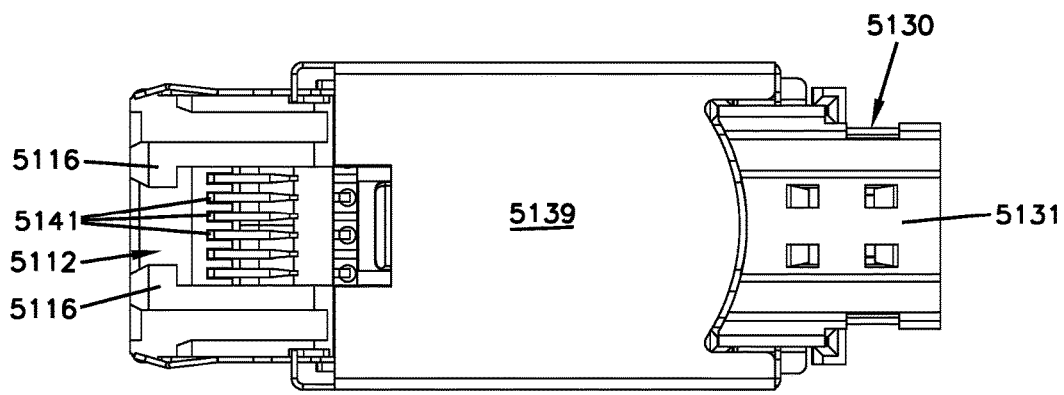
Figure 24:
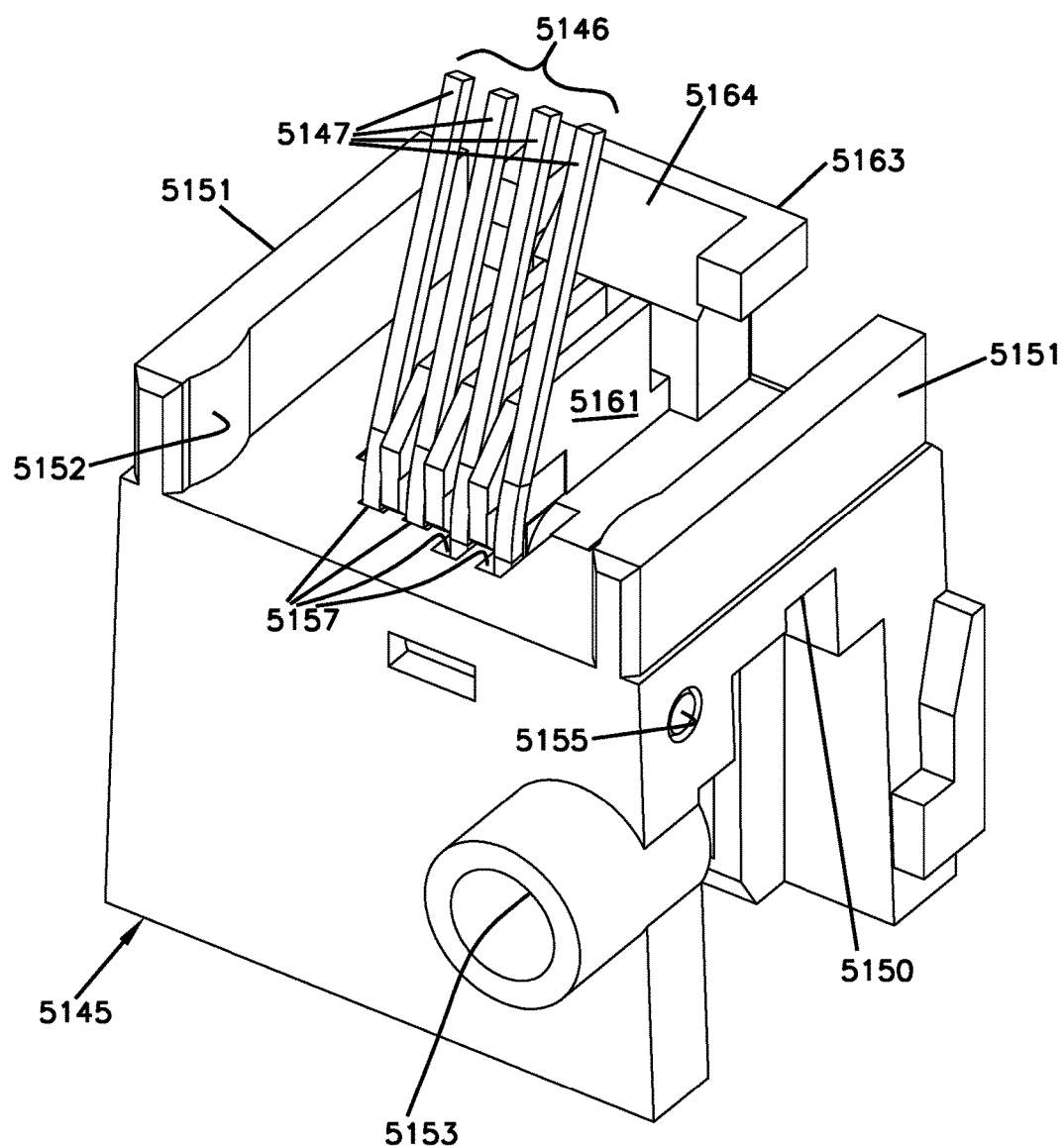
FIGS. 24-29 show an example media reading interface configured to connect to the jack module of FIGS. 16-23.
Figure 25:
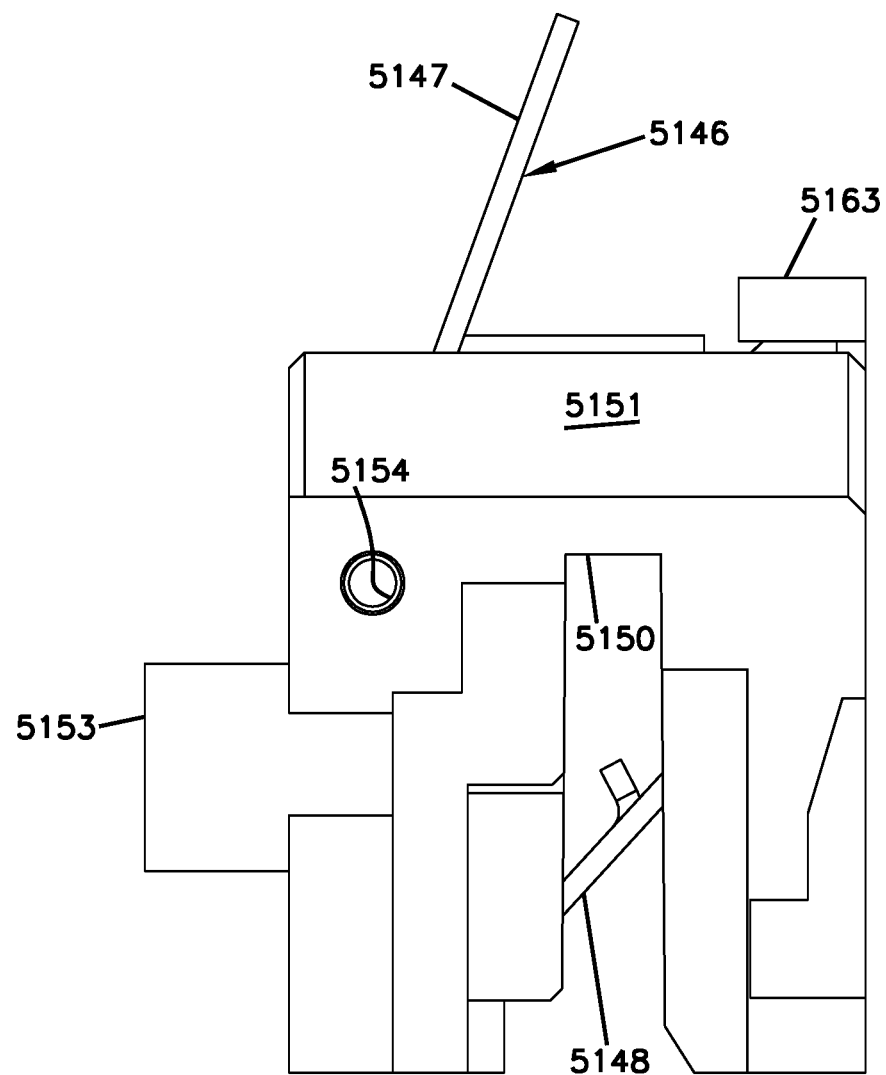

Certain types of jack modules 5110 are configured to mount to a patch panel as will be described in more detail herein. In some implementations, the jack module 5110 includes guides 5122 that aid in installing the jack module 5110 in an example patch panel. In the example shown in FIGS. 16-23, the guides 5122 define wing extensions having ramped or camming surfaces at a first end. In one implementation, the jack module 5110 includes a guide 5122 extending outwardly from each side of the jack module 5110 (FIGS. 20-21). In one implementation, the guides 5122 are formed on the first section 5111 of the jack module 5110.

Certain types of jack modules 5110 also may include a panel latching arrangement 5123 to aid in securing the jack module 5110 to a patch panel. In some implementations, the panel latching arrangement 5123 includes at least a first latch member having a ramped surface 5124 and a shoulder 5125. In the example shown, the panel latching arrangement 5123 includes two latch members separated by a gap 5126. Each latch member defines a ramped surface 5124 at one end and a shoulder 5125 at the opposite end. In certain implementations, the latch members are generally located between the guides 5122. In certain implementations, the panel latching arrangement 5123 is located on the first section 5111 of the jack module 5110.

Figure 30:
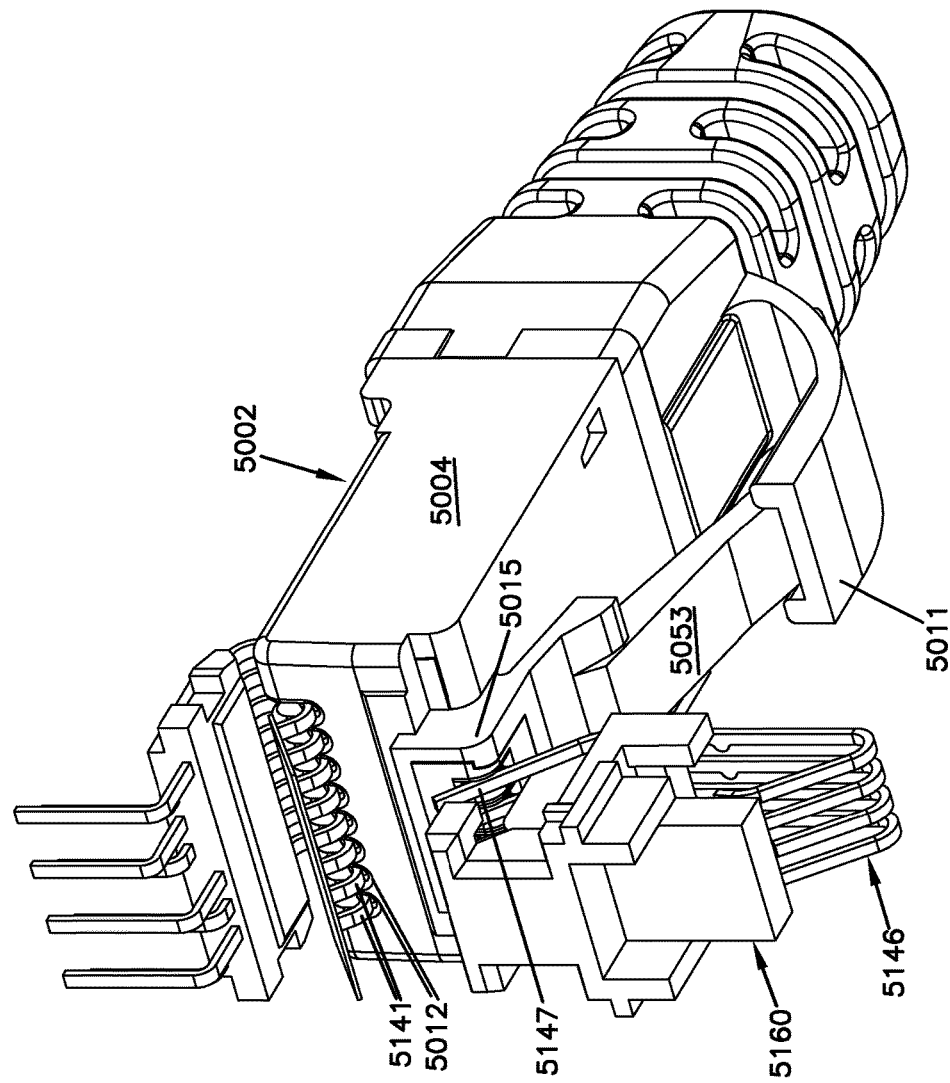
FIG. 30 is a perspective view showing a plug inserted within a socket of a jack module with the bodies of the jack module and media reading interface substantially removed from view so that the connections between the various contact members are visible.

Referring back to FIG. 15, the connector assembly 5100 also includes a media reading interface 5145 (FIGS. 24-29) coupled to the jack module 5110. The media reading interface 5145 includes a second set of contacts 5146 that are configured to contact the storage device contacts 5034 of the plug 5002 (e.g., see FIG. 30) to provide a conductive path between the storage device contacts 5034 and a data network, such as network 101 of FIG. 1 or network 218 of FIG. 2. In certain implementations, the second contacts 5146 connect to a second printed circuit board 5165 (see FIG. 32) that is configured to connect to the data network (e.g., via a processor and/or network interface as described herein).

Figure 31:
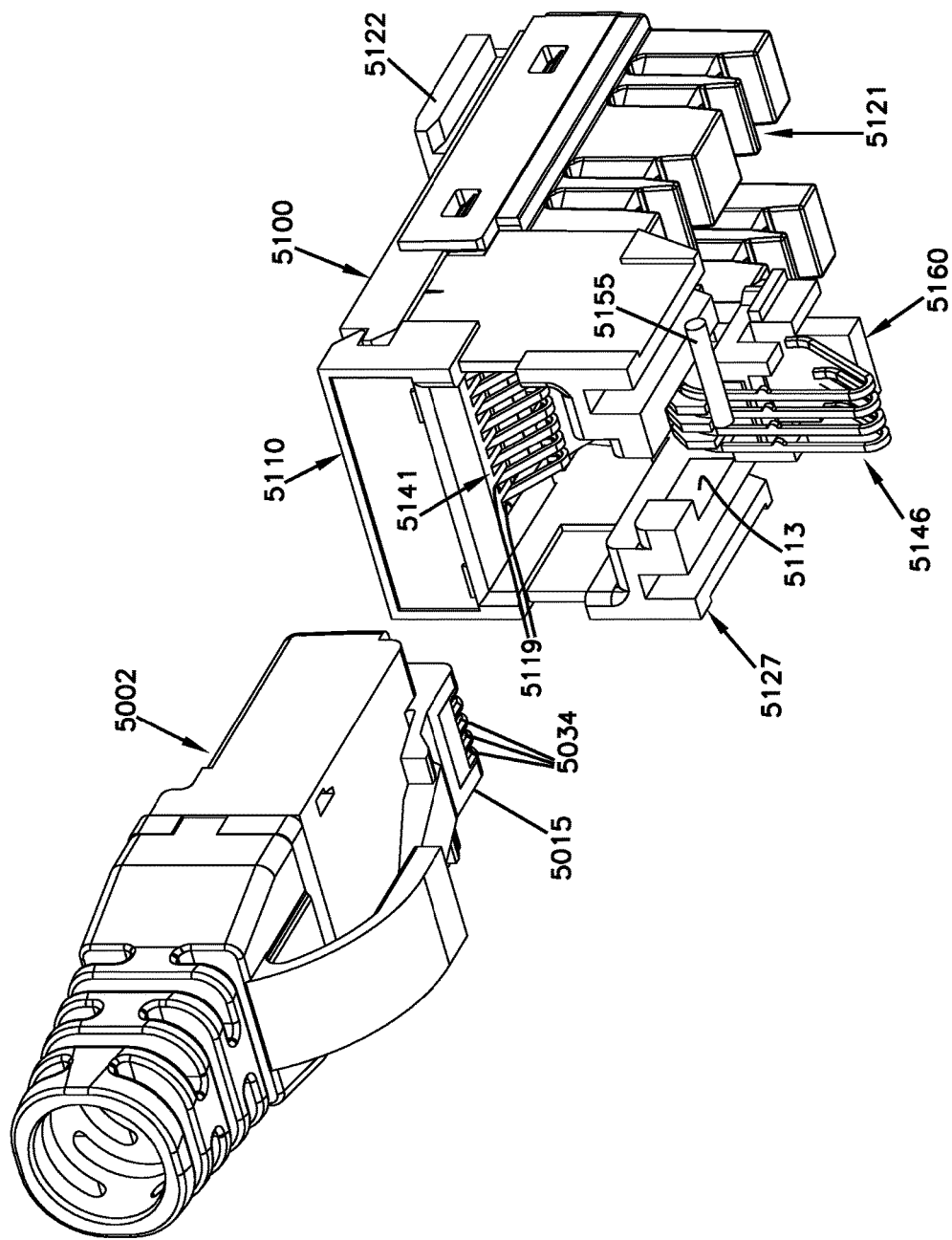
FIG. 31 shows one example plug being inserted into an example jack module, which is connected to an example media reading interface, where a main housing of the media reading interface has been removed so that second contacts and a shorting pin are visible.

In accordance with some aspects, at least portions of the second contacts 5146 of the media reading interface 5145 extend into the socket 5112 of the jack module 5110. In some implementations, the portions of the second contacts 5146 may extend through a cutout 5113 defined in a surface of the jack module 5110 (see FIG. 31). The cutout 5113 provides access to the jack socket 5112 through a wall of the jack module 5110. In some implementations, the cutout 5113 is continuous with a socket port at the front of the jack module 5110. In certain implementations, the cutout 5113 may be located at an opposite side of the jack module 5110 from the contact slots 5119 through which the plug connection contacts 5141 extend into the socket 5112 (e.g., see FIG. 15). For example, in one implementation, the cutout 5113 is located on the same side of the jack module 5110 as the latching members 5116 for securing the plug 5002 (e.g., see FIG. 31).

Certain types of jack modules 5110 may include guide members 5127 (see FIGS. 16, 19, and 20) that aid in securing the media reading interface 5145 to the jack module 5110. In the example shown in FIG. 16, the guide members 5127 are located on either side of the cutout 5113. In other implementations, the guide members 5127 may be located elsewhere on the jack module 5110. In some implementations, the guide members 5127 define channels 5128 (FIG. 20) that are configured to receive portions of the media reading interface 5145 (e.g., see FIG. 15).

One example media reading interface 5145 is shown in FIGS. 24-29. The example media reading interface 5145 is suitable for use with the jack module 5110 shown in FIGS. 16-23. The media reading interface 5145 includes guide flanges 5151 (FIG. 24) that are sized and shaped to be received within the channels 5128 of the guide members 5127 of the jack module 5110. In one implementation, the guide flanges 5151 include stops (e.g., bumps) 5152 that aid in securing the media reading interface 5145 to the guide members 5127 of the jack module 5110 (see FIG. 24). For example, the stops 5152 may be defined at forward ends of the guide flanges 5151.

In some implementations, the media reading interface 5145 also includes a stop arrangement 5163. In the example shown in FIG. 24, the stop arrangement 5163 defines a generally U-shaped upward extension including laterally extending wings that define guide channels on either side of the stop 5163. In some implementations, the media reading interface 5145 is mounted to the jack module 5110 by sliding the guide flanges 5151 of the media reading interface 5145 into the guide channels 5128 of the jack module 5110. In certain implementations, the stop 5163 of the media reading interface 5145 defines wings that ride over the camming surfaces of the latching members 5116 of the jack module 5110 when the media reading interface 5145 is inserted.

The example media reading interface 5145 also defines a channel 5150 (FIGS. 25 and 29) configured to receive a second printed circuit board 5165, which connects to a data network. For example, the second printed circuit board 5165 may connect to a processor (e.g., a slave processor or a master processor) and/or to a network interface for connection to the data network. In certain implementations, the second printed circuit board 5165 extends in a plane that is generally orthogonal to the insertion axis of the plug 5002 into the socket 5112. In one implementation, the second printed circuit board 5165 extends in a plane that is generally orthogonal to the first printed circuit board 5143.

Figure 26:
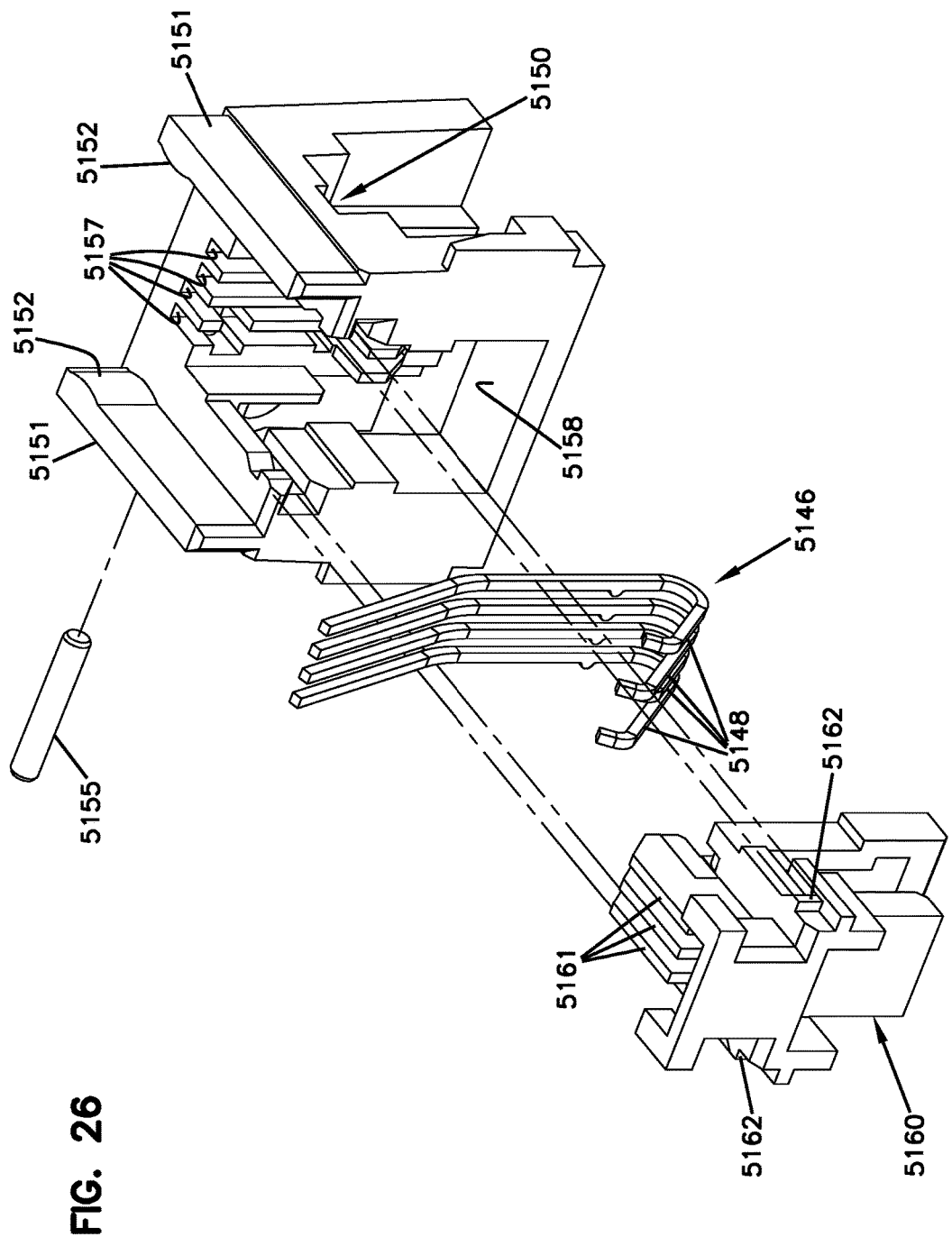
Figure 27:
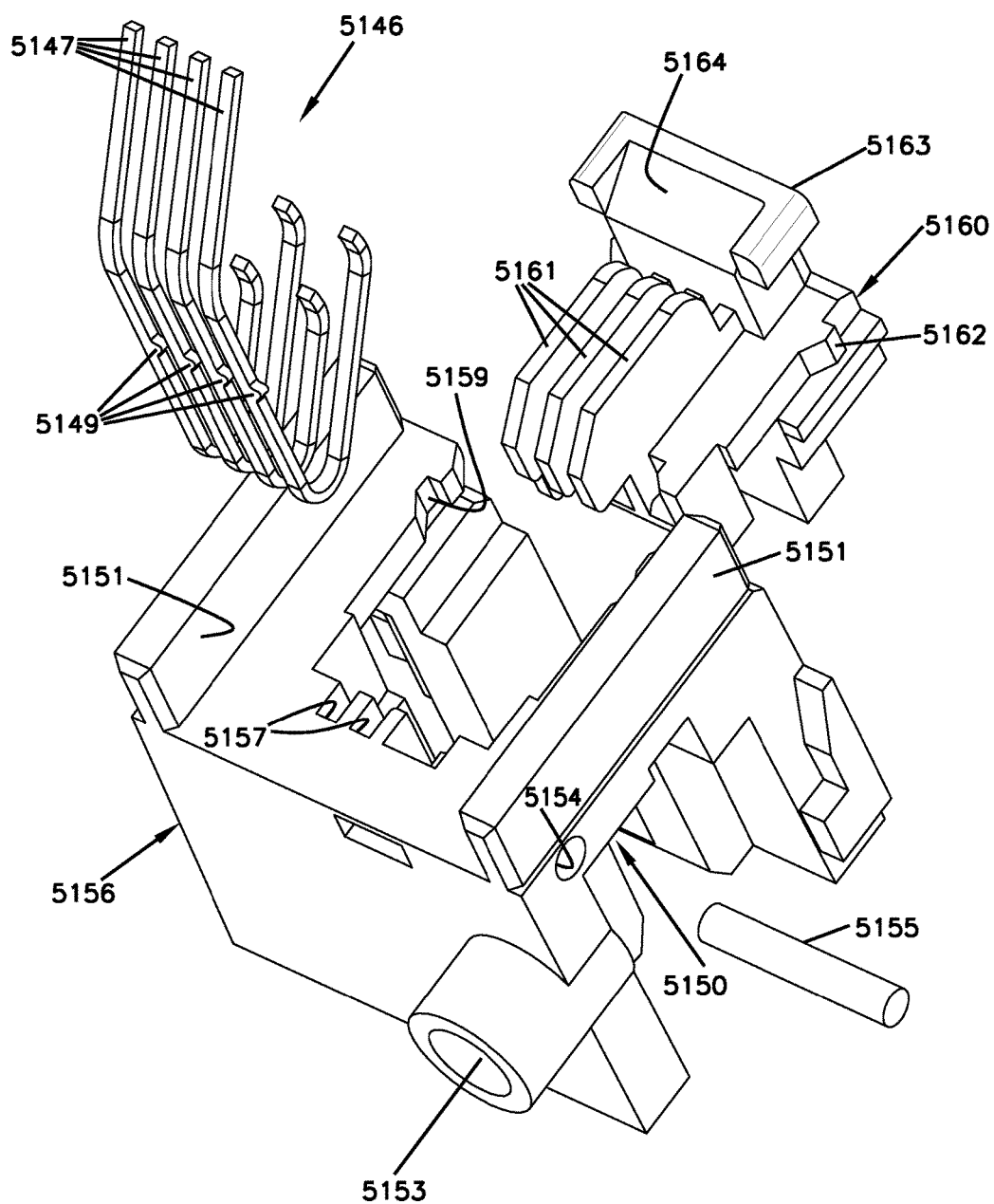
Figure 28:
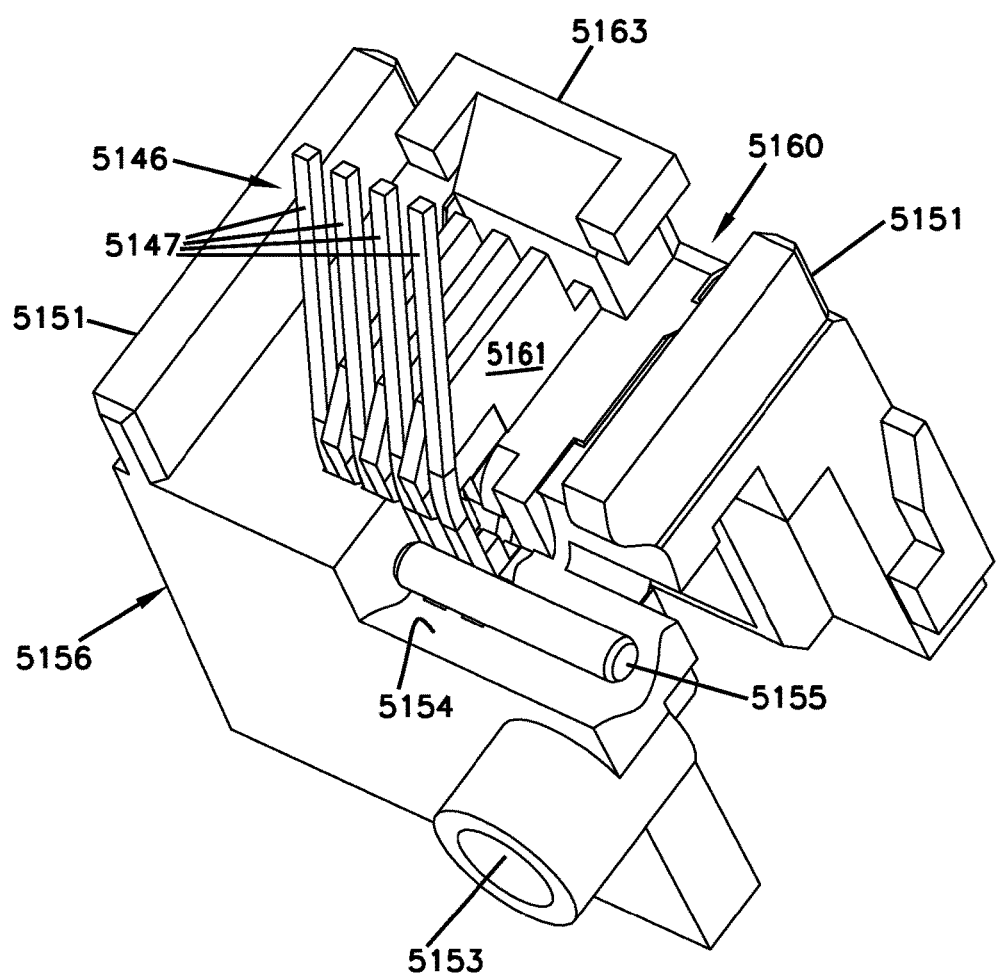
Figure 29:
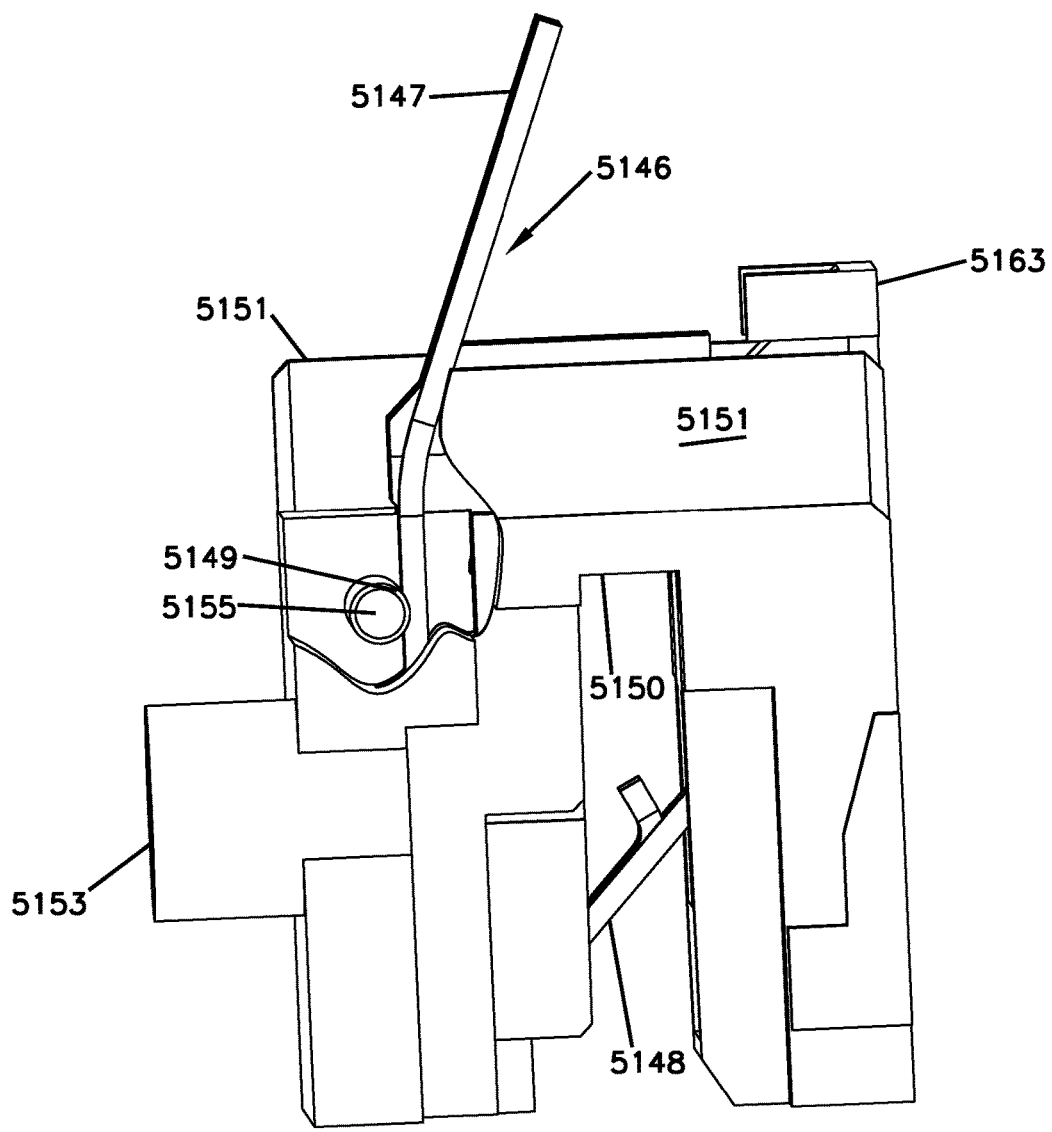

As shown in FIGS. 26 and 27, the second contacts 5146 include one or more contact members that extend from first sections defining plug contact surfaces 5147 to second sections defining PCB contact surfaces 5148. The plug contact surfaces 5147 of the second contacts 5146 extend out of the media reading interface 5145, through the cutout 5113 of the jack module 5110, and into the jack socket 5112. The PCB contact surfaces extend into the channel 5150 to contact the second printed circuit board 5165 (see FIG. 25). In certain implementations, the second sections of the second contacts 5146 curve around in a J-shape to align the PCB contact surfaces 5148 with the second circuit board 5165 within the channel 5150.

In certain implementations, the media reading interface 5145 includes a first housing part 5156 and a second housing part 5160. The second contacts 5146 are held between the first and second housing parts 5156, 5160. In some implementations, the channel 5150 for the second circuit board 5165 is formed in the first housing part 5156. In other implementations, the channel 5150 is formed in the second housing part 5160. In still other implementations, the first and second housing parts 5156, 5160 cooperate to form the channel 5150 (e.g., see FIG. 32). In some implementations, the first housing part 5156 defines a viewing channel 5153 that forms a passage between the PCB channel 5150 and an exterior of the media reading interface 5145. The viewing channel 5153 is configured to align with a light indicator (e.g., an LED) 5169 installed on the second printed circuit board 5165 (e.g., see FIG. 42).

In some implementations, the first housing part 5156 forms a main housing and the second housing part 5160 defines a retention section. The first housing part 5156 defines the PCB channel 5150 extending between front and rear flanges. The viewing channel 5153 extends through the front flange. The rear flange defines a passage 5158 in which the second housing part 5160 may be received. In certain implementations, one of the housing parts 5156, 5160 defines alignment members and the other of the housing parts 5156, 5160 defines alignment slots to aid in assembling the media reading interface 5146 (e.g., see FIG. 26).

Further, in certain implementations, one of the housing parts 5156, 5160 defines slots in which the contact members of the second contacts 5146 may be received. For example, in some implementations, the first housing part 5156 defines slots 5157 that receive the contact members of the second contacts 5146. Indeed, in some implementations, the second housing part 5160 includes ribs 5161 that aid in spacing the contact members of the second contacts 5146 and inhibit touching of the contact members. The slots 5157 of the first housing part 5156 align with channels between the ribs 5161 of the second housing part 5160.

In some implementations, the second contacts 5146 form spring contacts. In some such implementations, the first sections are configured to flex toward the stop 5163 when a plug 5002 presses against the plug contact surfaces 5147. For example, the first sections may pass through the channels defined between the ribs 5161. In certain implementations, the stop 5163 defines a ramped surface 5164 facing the second contacts 5146. The ramped surface 5164 may be shaped and positioned to accommodate flexing of the second contacts 5146 when a plug 5002 is inserted into the jack 5110.

In some implementations, the second housing part 5160 is configured to latch to the first housing part 5156. For example, in some implementations, the second housing part includes one or more latch members 5162 that are configured to latch to latching recesses 5159 of the first housing part 5156. In one implementation, each latch member 5162 defines a ramped surface and an opposite facing shoulder (FIGS. 26-27). In other implementations, the latch members may be defined on the first housing part 5156 and the latching recesses may be defined on the second housing part 5160. In still other implementations, the second housing part 5160 may be otherwise secured to the first housing part 5156.

In accordance with some aspects, certain types of media reading interfaces 5145 are configured to aid in determining whether a plug 5002 has been received in the socket 5112 of the jack module 5110. In some implementations, the media reading interface 5145 includes a sensing member that interacts with at least some of the second contacts 5146. In other implementations, the media reading interface 5145 includes a shorting pin 5155 that extends across at least two contact members of the second contacts 5146 (see FIGS. 28 and 31).

At least some of the contact members of the second contacts 5146 define shorting surfaces 5149 that are configured to selectively contact the shorting pin 5155. The shorting pin 5155 causes an electrical short between two or more contact members of the second contacts 5146 when the shorting surfaces 5149 of the contact members touch the shorting pin 5155. The second printed circuit board 5165 is configured to determine whether the contact members are shorted together.

In some implementations, the media reading interface 5145 defines a pin receiving passage 5154 (FIGS. 27-29) in which the shorting pin 5155 may be received. In some implementations, the pin receiving passage 5154 is defined in the first housing part 5156. In certain implementations, the passage 5154 extends across two contact member slots 5157 of the first housing 5156. In other implementations, the passage 5154 extends cross all contact members slots 5157 of the first housing part 5156. In still other implementations, the pin receiving passage 5154 may be defined in the second housing part 5160.

As shown in FIG. 32, when the plug 5002 is received in the socket 5112 of the jack module 5110, the main signal contacts 5012 touch the plug connection contacts 5141 and the storage member contacts 5034 touch the plug contact surfaces 5147 of the second contacts. The key member 5015 of the plug 5002 pushes the first sections of the second contacts 5146 downwardly (see FIG. 30). Depressing the plug contact surfaces 5147 of the second contacts 5146 pulls the shorting surfaces 5149 away from the shorting pin 5155 (see FIG. 32), thereby eliminating the electrical short between the contact members.

Referring to FIGS. 33-78, in accordance with some aspects, one or more jack modules 5110 and media reading interfaces 5145 can be coupled together to form patch panels. In general, the patch panels have fronts, rears, first sides, and second sides. The fronts of the patch panels defines multiple front ports at which to receive plugs (e.g., plug 5002 of FIGS. 4-14) that terminate electrical cables. The rears of the patch panels define multiple rear terminations at which additional electrical cables may be received and terminated. In some implementations, the rear terminations include fixed terminations, such as insulation displacement contacts. For example, in certain implementations, the sockets 5112 of the jack modules 5110 define the front ports and the IDCs 5144 of the jack modules 5110 define the rear terminations. In other implementations, the rear terminations may include additional jack modules or other types of connectors.

FIGS. 33-51 show a first example patch panel 5200 having a front 5201, a rear 5202, a first side 5203, and a second side 5204. The patch panel 5200 is configured to hold at least one jack module (e.g., jack module 5110 of FIGS. 16-23) and at least one media reading interface (e.g., media reading interface 5145 of FIGS. 24-29). The front 5201 of the first example patch panel 5200 defines one or more front ports 5205 through which the sockets of the jack modules are accessible. The rear 5202 of the first example patch panel 5200 includes rear terminations defined by the IDS section 5121 of the jack modules.

The patch panel 5200 includes mounting members 5206 that are configured to enable installation of the patch panel 5200 to a rack, frame, cabinet, or other equipment structure. In certain implementations, the mounting members 5206 are located at the sides 5203, 5204 of the patch panel 5200. In the example shown, the mounting members 5206 define openings 5207 through which fasteners (e.g., screws, bolts, rivets, etc.) may extend to secure the patch panel 5200 to one or more rails.

Figure 34:
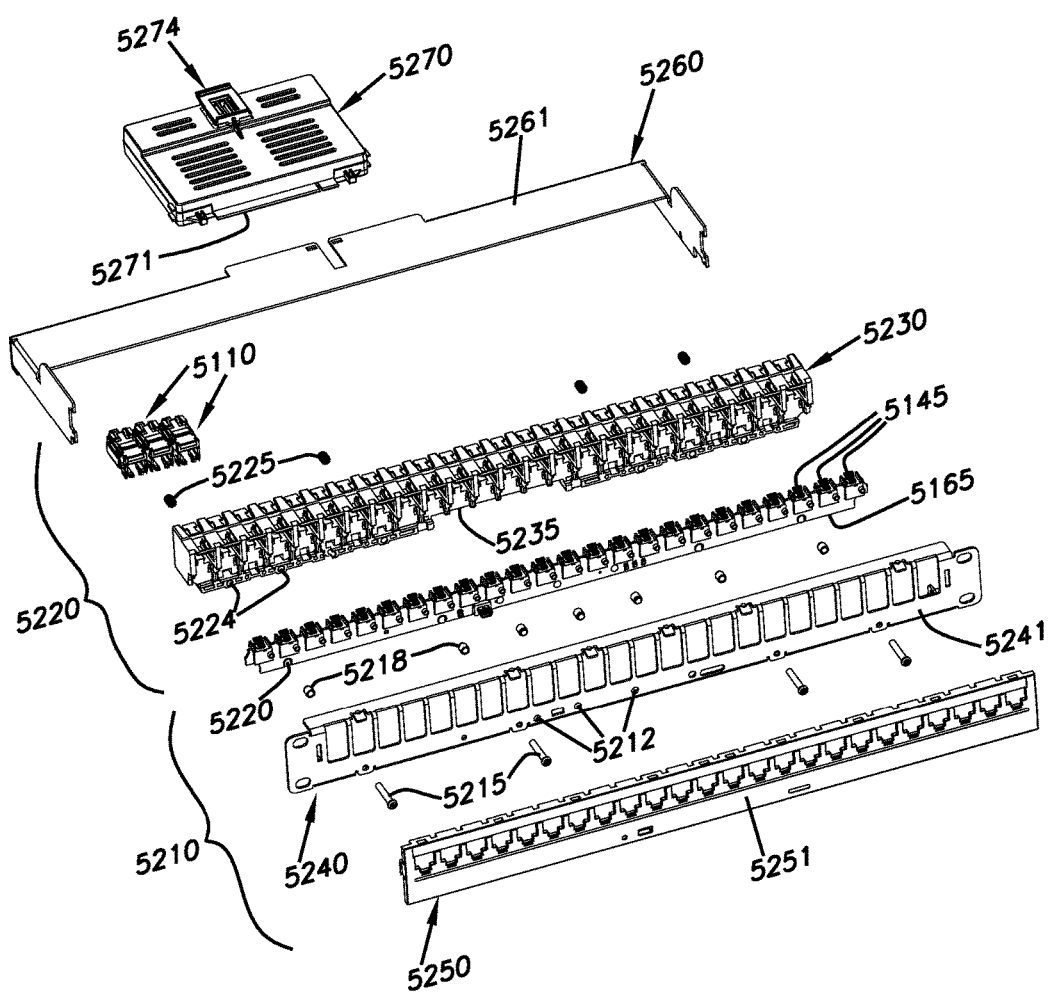
Figure 35:
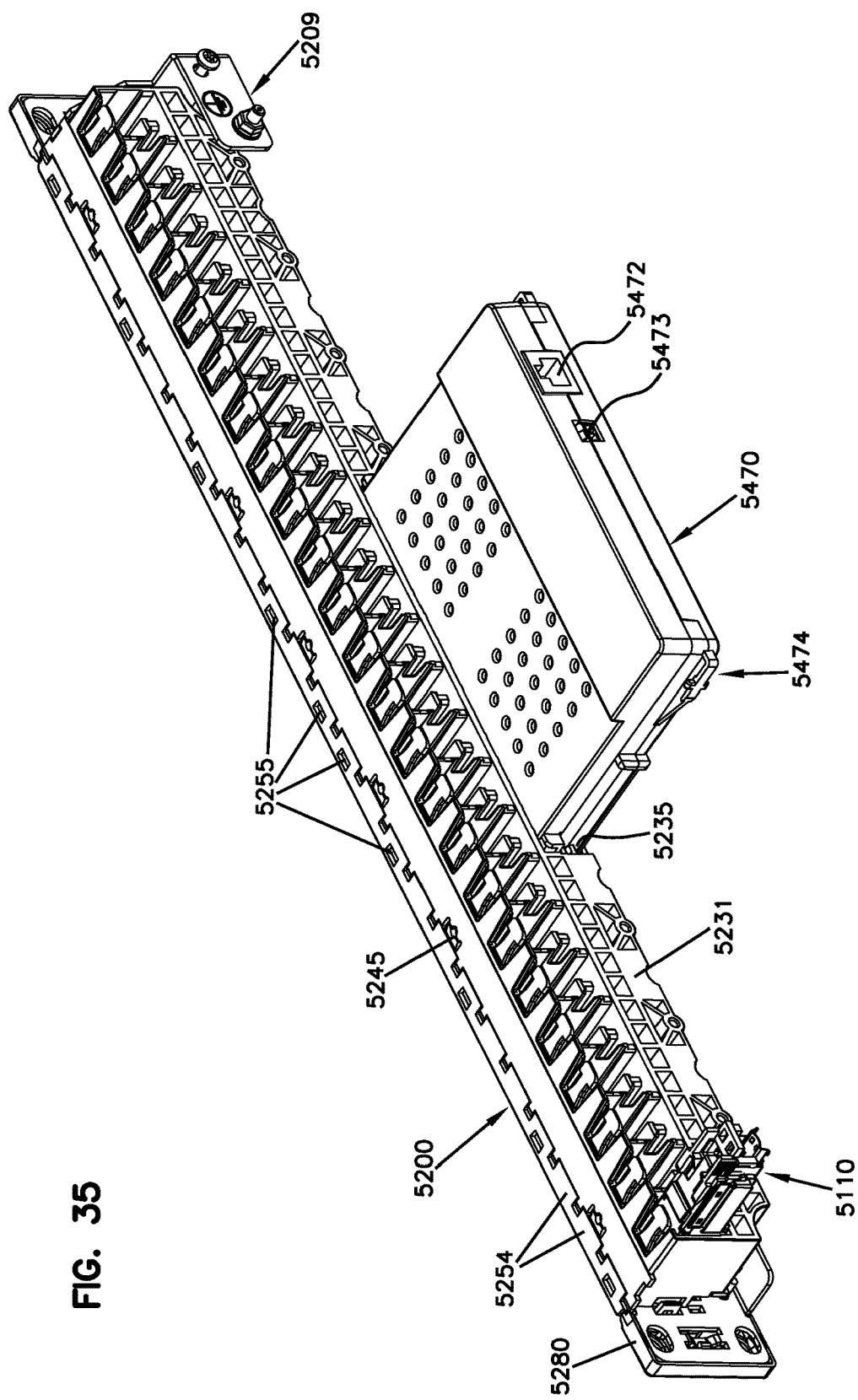

In some implementations, the patch panel 5200 includes a front housing part 5210 and a rear housing part 5220 (see FIG. 34). The first housing part 5210 defines the front ports 5205. In some implementations, the front housing part 5210 includes a frame 5240. In certain implementations, the front housing part 5210 also includes a fascia 5250 that is removeably coupled to the frame 5240. In certain implementations, the patch panel 5200 also includes a grounding connection 5209 (FIG. 35). The grounding connection 5209 may connect to the shields 5134 of the jack modules 5110 and/or to the second printed circuit board 5165.

The rear housing part 5220 includes at least one or more jack modules 5110 mounted to a chassis 5230. In certain implementations, the rear housing part 5220 also includes one or more media reading interfaces 5145. In one implementation, the patch panel 5200 has the same number of jack modules 5110 and media reading interfaces 5145. In other implementations, the patch panel 5200 has more jack modules 5110 than media reading interfaces 5145. For example, in one implementation, the patch panel 5200 may have twice as many jack modules 5110 than media reading interfaces 5145. In other implementations, the patch panel 5200 may include more media reading interfaces 5145 than jack modules 5110. For example, in certain implementations, each jack module 5110 may define two plug sockets. In such implementations, each plug socket may have its own media reading interface 5145.

In some implementations, the media reading interfaces 5145 are mounted to a printed circuit board 5165. In the example shown in FIG. 34, multiple media reading interfaces 5145 mount over at least a first edge of the second printed circuit board 5165. Each media reading interface 5145 also is connected to at least one jack module 5110. The second printed circuit board 5165 in installed at the patch panel 5200. For example, in FIG. 34, the second printed circuit board 5165 is configured to be held between the first housing part 5210 and the second housing part 5220.

In some implementations, the first housing part 5210 is fastened to the second housing part 5220. In the example shown, the frame 5240 defines one or more first openings 5212, the second printed circuit board 5165 defines one or more second openings 5222, and the chassis 5230 defines one or more third openings 5224. One or more fasteners (e.g., screws, bolts, etc.) 5215 are configured to extend through the first, second, and third openings 5212, 5222, 5224 to secure the second printed circuit board 5165 between the frame 5240 and the chassis 5230. In certain implementations, the fastener 5215 is configured to extend through a spacer 5218 positioned between the frame 5240 and the second printed circuit board 5165.

In the example shown, a threaded fastener 5215 is configured to extend through the openings 5212, 5222, 5224. In some implementations, the threaded fastener 5215 is configured to screw directly into the chassis 5230 (e.g., into the passages 5224 defined in the chassis 5230). In other implementations, however, the threaded fastener 5215 is configured to screw into a threaded insert 5225. In some such implementations, the threaded insert 5225 may abut against a portion of the chassis 5230 from a rear of the chassis 5230. For example, the threaded insert 5225 may mount at least partially within the passage 5224 defined in the chassis 5230 and abut against a forward or intermediate surface of the chassis 5230. Of course, any of these attachment mechanisms can be used on the components of any of the patch panels disclosed herein.

The patch panel 5200 may be configured to receive a processing unit (e.g., a CPU) 5270. In generally, the processing unit 5270 includes at least one processor (e.g., processor 206 or processor 217 of FIG. 2). For example, the second printed circuit board 5165 may define a connector or connector port (e.g., see FIG. 57) that connects to a connector port or connector 5271 on the processing unit 5270. The second printed circuit board 5165 electrically connects the media reading interfaces 5145 to the processing unit 5270. Accordingly, the processing unit 5270 may request one or more of the media reading interfaces 5145 to read information (e.g., physical layer information) from the storage device 5030 of one or more corresponding plugs 5002. The processing unit 5270 also may receive the information from the media reading interfaces 5145 and provide the information to a data network (e.g., network 101 of FIG. 1 or network 218 of FIG. 2). In certain implementations, the processing unit 5270 also may provide (e.g., write) information to the storage device 5030 of one or more plugs 5002 via the media reading interfaces 5145.

In some implementations, the patch panel 5200 also may include at least one cable manager 5260. In certain implementations, the patch panel 5200 includes a cable manager 5260 that organizes the cables connected to the rear terminations. In some implementations, the cable manager 5260 mounts to the second housing part 5220. For example, in one implementation, the cable manager 5260 mounts to the chassis 5230. In another implementation, the cable manager mounts to the grounding assembly 5209 (e.g., see FIG. 52) that mounts to the chassis 5230. In other implementations, the cable manager 5206 may mount to the front housing part 5210.

Figure 34A:
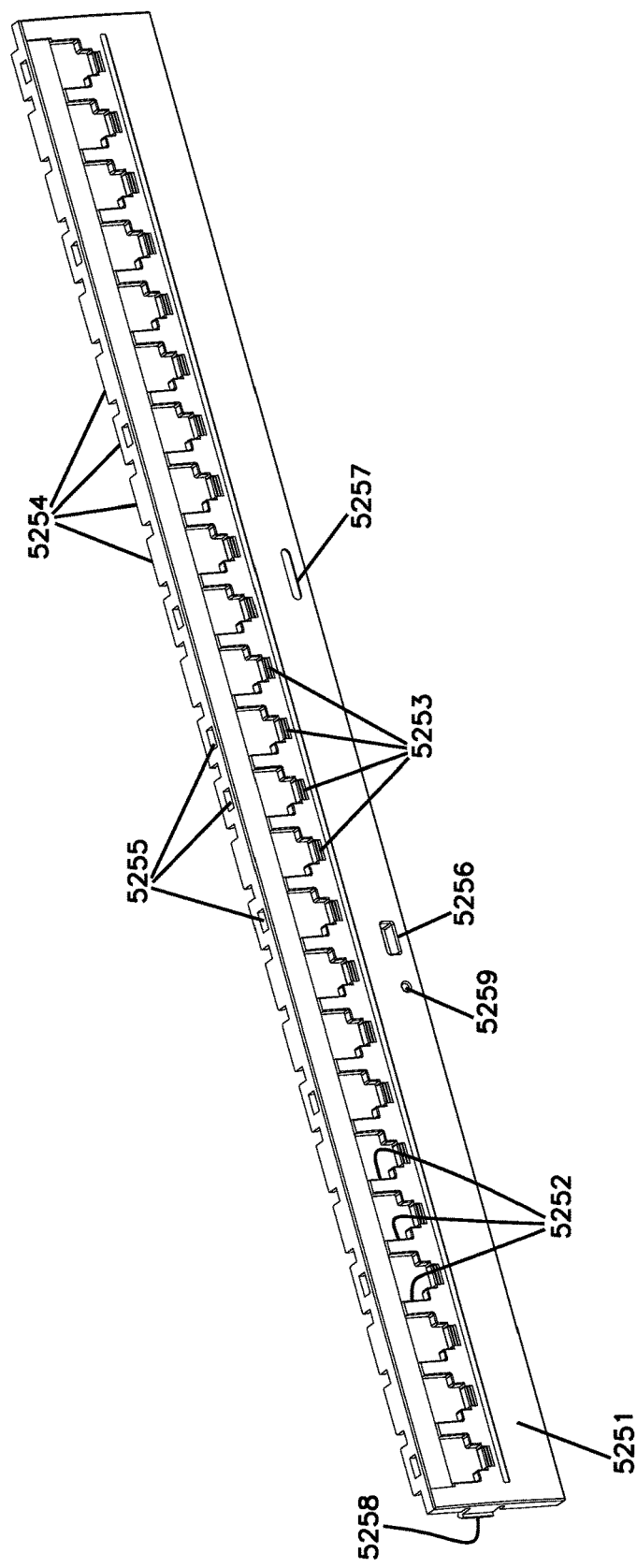
Figure 34B:
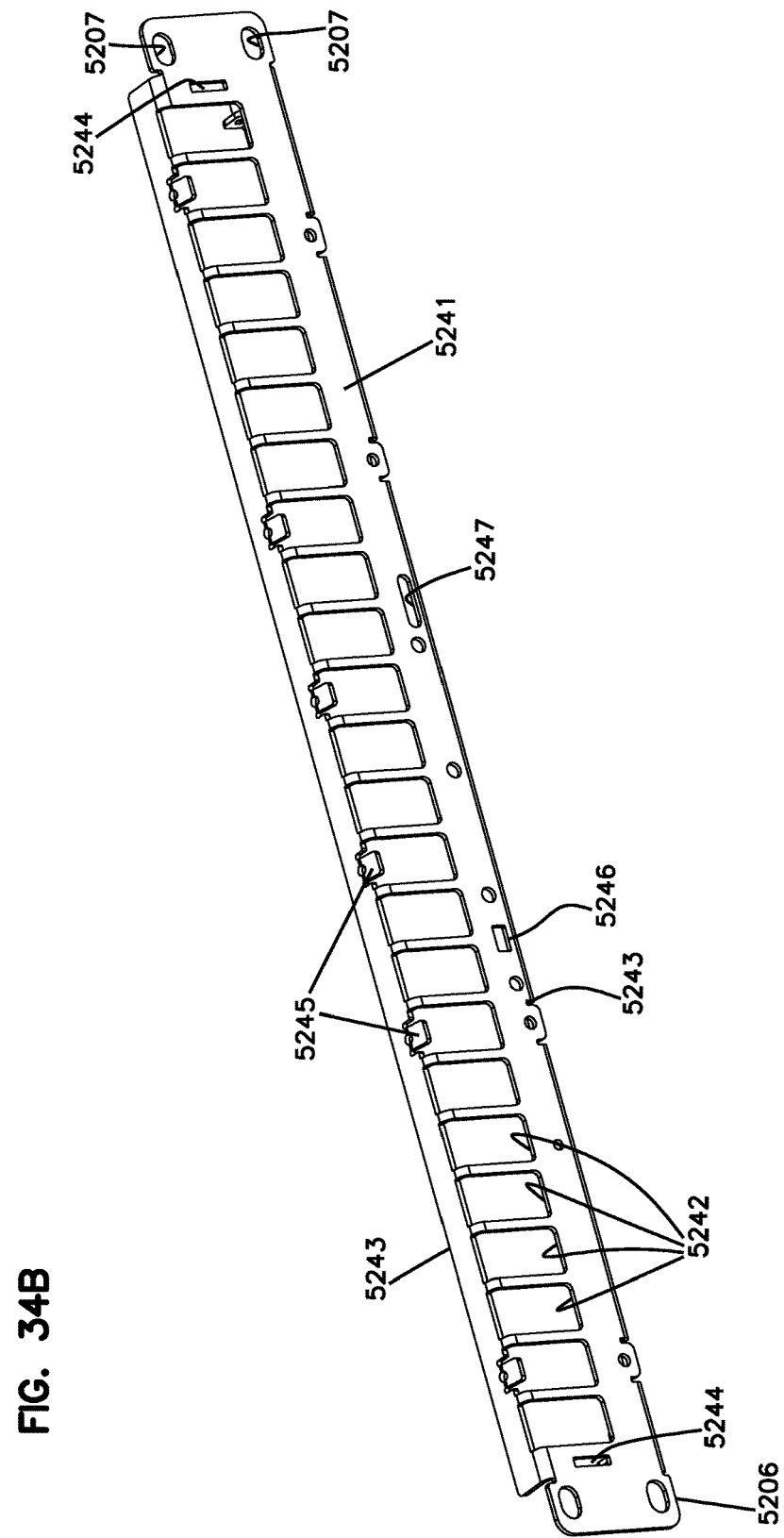

One example implementation of a frame 5240 is shown in FIG. 34B. The frame 5240 includes a frame body 5241 defining at least one opening 5242 through which a plug 5002 can access a socket 5112 of a jack module 5110. In certain implementations, the openings 5242 are sufficiently large to enable the front of both the jack module 5110 and the media reading interface 5145 to be viewing from a front of the frame 5240 when the first and second housing parts 5210, 5220 are mounted together. For example, the viewing channel 5153 of the media reading interface 5145 may be viewing through the frame opening 5242.

In certain implementations, the frame body 5241 defines upper and lower bent flanges 5243 that wrap around portions of the second housing part 5220 to aid in retaining the first and second housing parts 5210, 5220. In certain implementations, the lower flange 5243 may aid in retaining the second printed circuit board 5165 within the patch panel 5200. For example, the lower bent flange 5243 of the frame body 5241 may extend over a bottom of the second circuit board 5165 to hold the second circuit board 5165 within the channel 5150 defined in the second media reading interface (e.g., see FIG. 51)

As noted above, the frame body 5241 also defines openings 5212 through which fasteners (e.g., screws, bolts, rivets, etc.) 5215 may be inserted to secure the first housing part 5210 to the second housing part 5220. In some implementations, the frame body 5241 also defines openings to accommodate components mounted to the second housing part 5220. For example, the frame body 5241 may define openings 5246, 5247 to accommodate a cable port 5166 and light indicators 5167, respectively, as will be described in more detail herein.

In some implementations, the frame body 5241 defines the mounting members 5206. For example, side flanges of the frame 5241 define the openings 5207 through which fasteners may be extended. In other implementations, separate mounting members 5206 may connect to the frame body 5241. In other implementations, the mounting members 5206 may be defined by the fascia 5250. In still other implementations, the mounting members 5206 may connect to the second housing part 5220 (e.g., to the chassis 5230).

The frame body 5241 also is configured to receive the fascia 5250. In some implementations, the frame body 5241 defines openings 5244 configured to receive retaining members 5258 of the fascia 5250. In other implementations, the frame body 5241 may define retaining members that fit into openings defined in the fascia 5250. In certain implementations, the frame body 5241 also includes tabs 5245 that extend forwardly from some of the openings 5242 to be received in slots defined in the fascia 5250 to aid in aligning and installing the fascia 5250 on the frame 5240.

One example implementation of a fascia 5250 is shown in FIG. 34A. The fascia 5250 includes a fascia body 5251 defining a plurality of openings 5252 that align with the openings 5242 of the frame body 5241 to provide access to the jack module socket 5112 from the front 5201 of the patch panel 5200. In some implementations, the openings 5252 of the fascia body 5251 are smaller than the openings 5242 of the frame body 5241. In certain implementations, the openings 5252 of the fascia body 5251 define keyways 5253 for the plugs 5002. They keyways 5253 of the fascia body 5251 are oriented to align with the cutouts 5113 of the jack modules 5110 when the first and second housing parts 5210, 5220 are mounted together.

In some implementations, the fascia body 5251 includes tabs 5254 that extend rearwardly from the fascia body 5251. In the example shown, the tabs 5254 generally align with the openings 5252. In other implementations, however, the fascia body 5251 may include greater or fewer tabs 5254. The tabs 5254 extend over the upper and lower bend flanges 5243 of the frame body 5241 when the fascia 5250 is mounted to the frame 5240. In one implementation, the tabs 5254 friction-fit over the flanges 5243 of the frame to aid in retaining the fascia 5250 to the frame 5240. In certain implementations, some of the tabs 5254 define openings, cutouts 5255, or inner protrusions that may aid in retaining the fascia 5250 to the frame 5240.

As noted above, the fascia body 5251 also includes retaining members 5258 to secure the fascia body 5251 to the frame body 5241. In some implementations, the fascia body 5251 includes at least one retaining member 5258 at each side of the fascia body 5251. In other implementations, the fascia body 5251 includes multiple retaining members 5258 at each side of the fascia body 5251. In still other implementations, the fascia body 5251 includes multiple retaining members spaced along at least one side (e.g., a bottom) of the fascia body 5251.

In some implementations, the retaining members 5258 extend through the frame body 5241 and latch in the openings 5244. In other implementations, the retaining members 5258 may otherwise secure (e.g., latch, press-fit, snap-fit, etc.) to the frame body 5241 via latching openings 5244. In other implementations, the retaining members 5258 may extend through the openings 5244 and secure to the chassis 5230 of the second housing part 5220.

In some implementations, the fascia body 5251 also defines openings to accommodate components mounted to the second housing part 5220. For example, the fascia body 5251 may define openings 5256, 5257, 5259 to accommodate a cable port 5166 and light indicators 5167 of the second printed circuit board 5165. One example implementation of a printed circuit board 5165 including a cable port 5166 and light indicators 5167 will be described in more detail herein.

Figure 38:
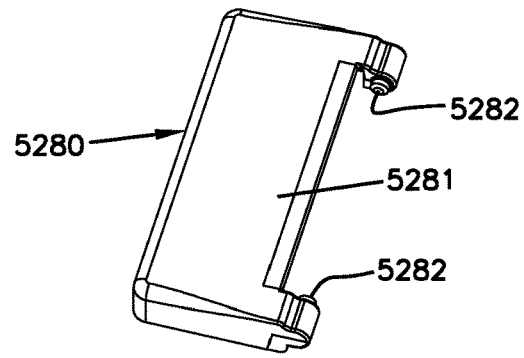
Figure 39:
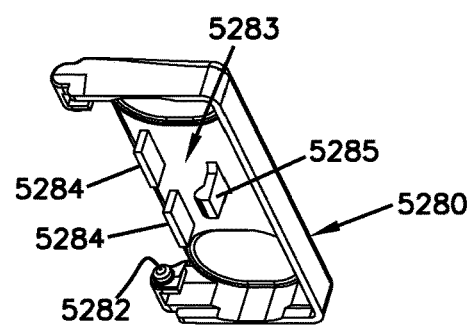
Figure 37:
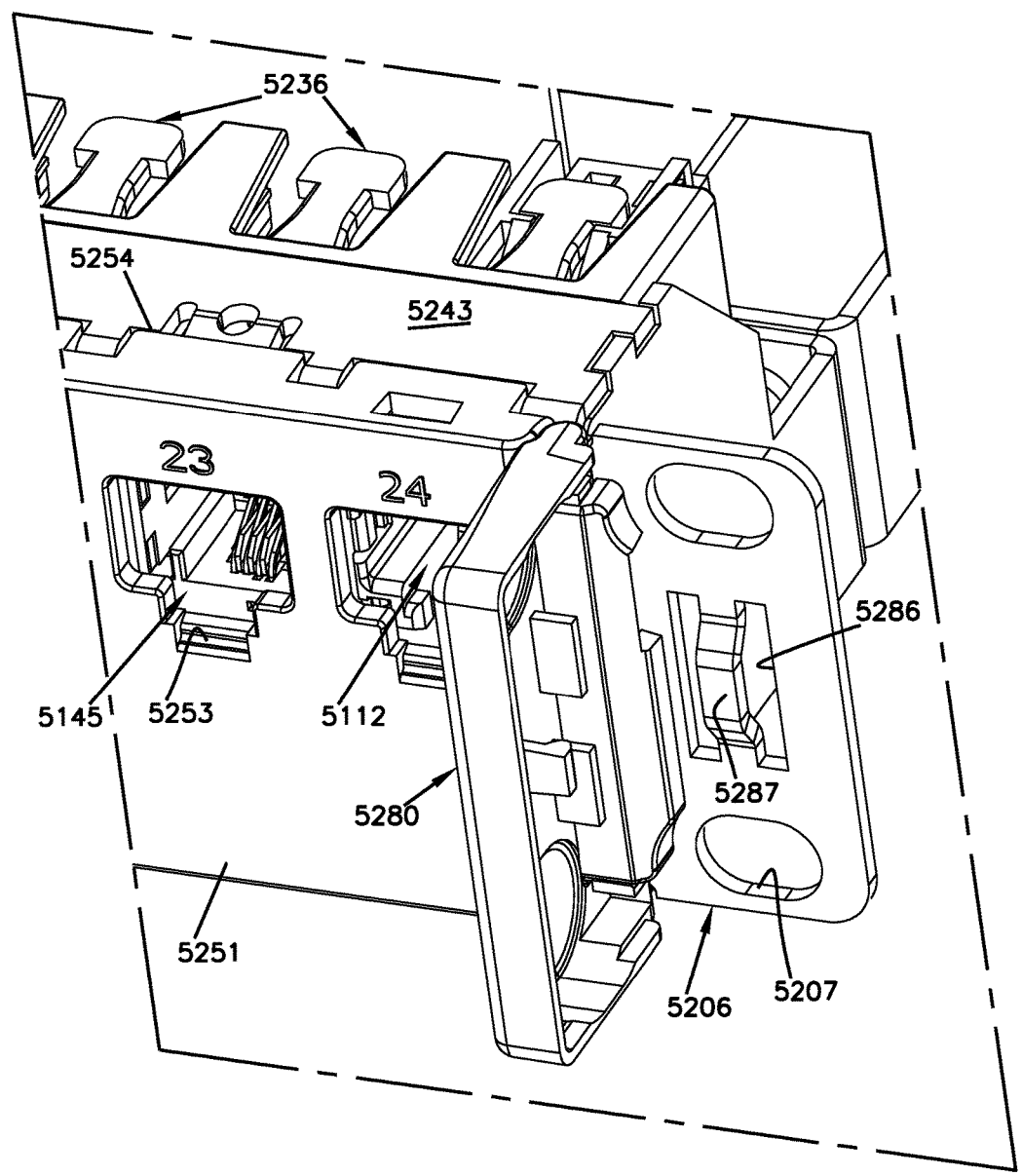

As shown in FIGS. 37-39, end caps 5280 may be mounted over the side flanges of the frame 5241 to cover the mounting members 5206. In the example shown, each end cap 5280 includes a body 5281 that is sized and shaped to cover the front of one side flange of the frame 5241. Each end cap 5280 also includes mounting members 5282 by which the end cap body 5281 is attached to the patch panel 5200. In some implementations, the mounting members 5282 attach to the frame body 5241. In other implementations, the mounting members 5282 attach to the fascia body 5251.

Certain types of end caps 5280 are configured to pivot to selectively expose and cover the openings 5207 of the mounting members 5206. In some implementations, the mounting members 5282 include pins about which the end cap body 5281 may pivot (FIG. 39). In the example shown in FIG. 37, the mounting pins 5282 attach to sides of the fascia body 5251. The end cap 5280 also includes a retention mechanism 5283 (FIG. 39) by which the end cap body 5281 may be retained in position to cover the mounting member openings 5207. The retention mechanism 5283 grips a portion 5287 (FIG. 37) of the mounting member 5206 when the end cap 5280 covers the mounting member 5206. In the example shown, the retention mechanism 5283 includes flanges 5284 and latching tab 5285 that extend through cutouts 5286 defined in the mounting member. The latching tab 5285 snaps behind the portion 5287 of the mounting member 5206.

Labels may be installed on the fascia body 5251. In some implementations, labels are installed on a front of the fascia body 5251. For example, labels may be glued, latched, or otherwise secured to a front of the fascia body 5251. In other implementations, however, labels may be installed behind a clear or opaque fascia body 5251. In certain implementations, one or more label holders 5290 may be mounted to first part 5210 of the patch panel 5200.

One example label holder 5290 is shown in FIGS. 40 and 41. The example label holder 5290 includes a holder body 5291 having a first side 5298 and a second side 5299. At least the first side 5298 of the holder body 5291 defines a tray 5292 bounded by upper and lower flanges 5293. One or more labels may be seated in the tray 5292 between the flanges 5293. In certain implementations, retention tabs 5296 (FIG. 41) may be provided to further aid in retaining the labels within the tray 5292. In certain implementations, the label holder 5290 may include dividing flanges 5297 (FIG. 41) that separate sections of the holder tray 5292 to facilitate mounting multiple labels to the tray 5292 side-by-side.

Figure 36:
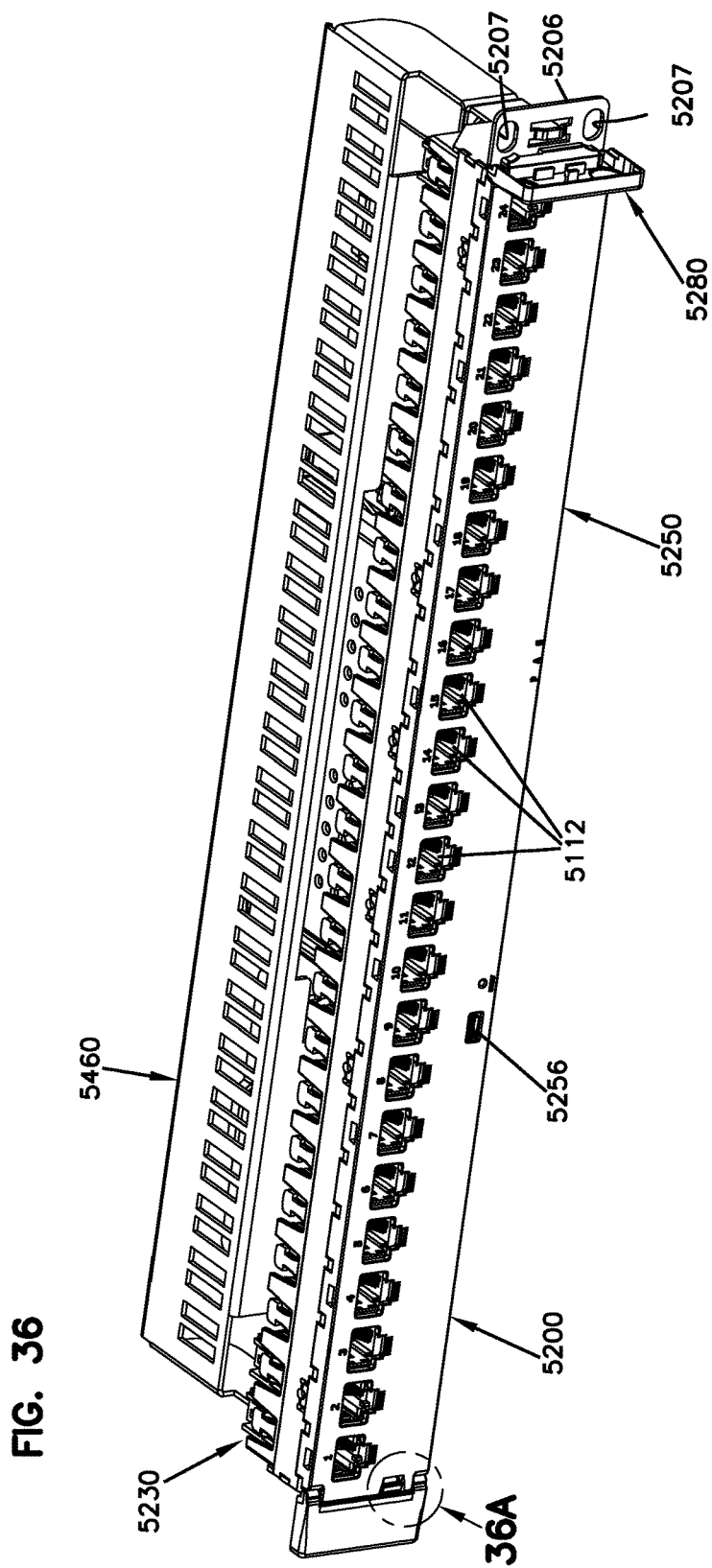
Figure 36A:
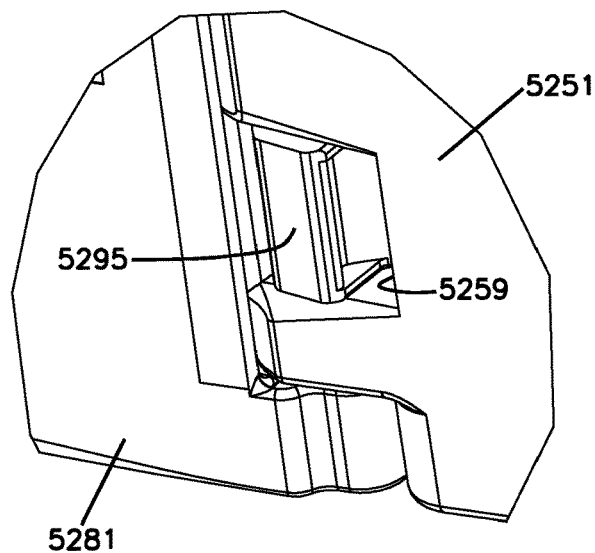

In some implementations, the label holder 5290 is configured to mount between the frame body 5241 and the fascia body 5251. For example, in certain implementations, the holder body 5291 includes a first attachment end 5294 and a second attachment end 5295 that are held between the frame and fascia bodies 5241, 5251 (e.g., see FIGS. 36 and 36A). In the example shown, at least the second attachment end 5295 is configured to extend through an opening 5259 in the fascia body 5251 (see FIG. 36A).

Certain types of label holders 5290 are configured to be reversible. For example, the label holder 5290 shown in FIGS. 40-41 includes flanges 5293 that extend both forwardly and rearwardly from the tray 5292. Accordingly, labels may be seated at the tray 5292 on either side 5298, 5299 of the label holder 5290. In one implementation, the first side 5298 (FIG. 40) of the label holder 5290 is configured to hold one elongated label and the second side 5299 (FIG. 41) of the label holder 5290 is configured to hold multiple shorter labels. The first and second attachment ends 5294, 5295 of the holder body 5291 are configured so that the label holder 5290 may be secured to the first housing part 5210 with either the first side 5298 or the second side 5299 facing forwardly through the fascia body 5251. Accordingly, a user may select which side of the label holder 5290 to utilize to holder labels.

Figure 42:
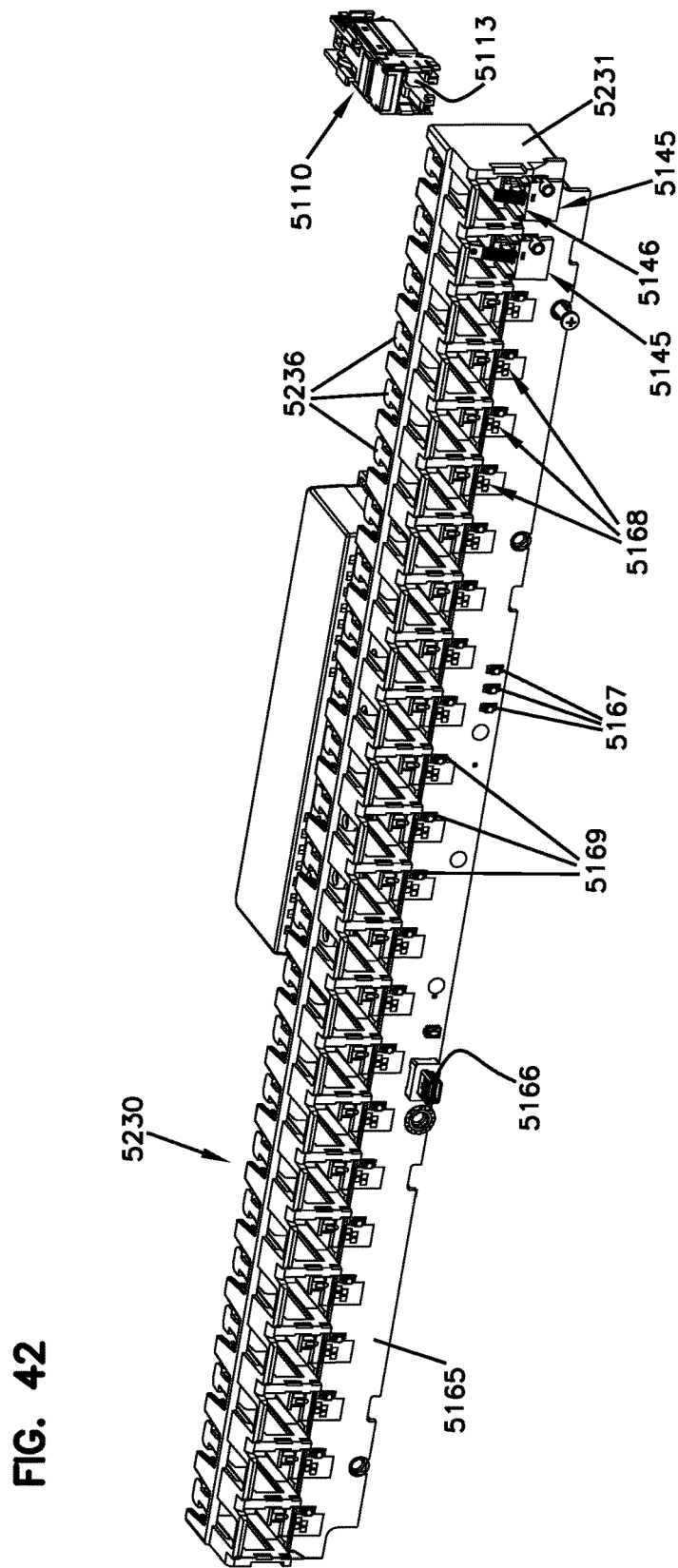

FIGS. 42-49 show example components of the second housing part 5220. FIG. 42 is a front perspective view of one example second housing part 5220 mounted to a first edge of the second printed circuit board 5165. A front side of the second printed circuit board 5165 defines contact pads 5168 at which the second contacts 5146 of the media reading interface 5145 electrically connect to the second circuit board 5165 (see FIG. 43). The rear side of the second printed circuit board 5165 includes a connector or connector 5278 (FIG. 57) that is configured to couple to a connector or connector port 5271 (FIG. 34) of the processing unit 5270.

Figure 43:
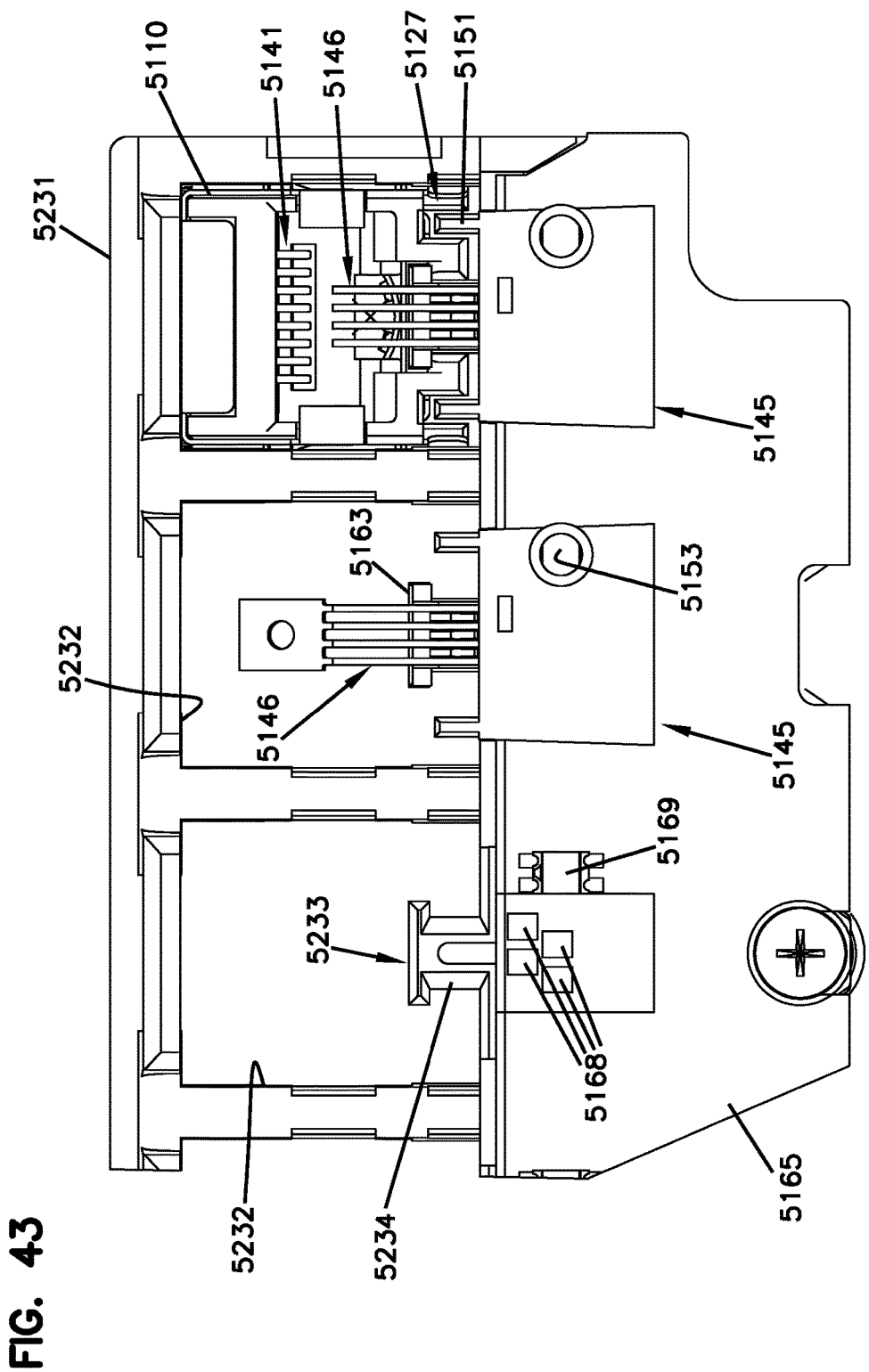
Figure 44:
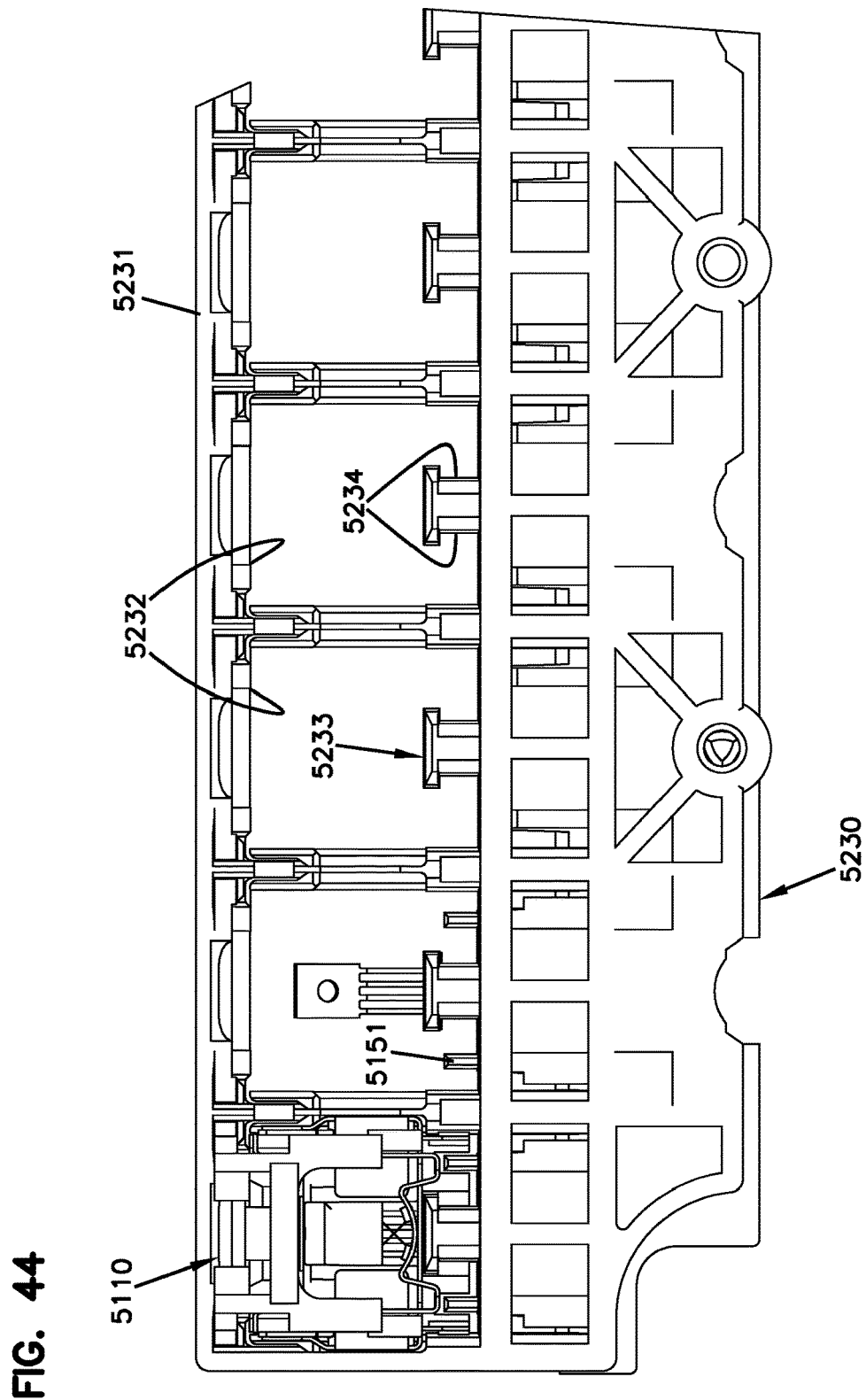
Figure 45:
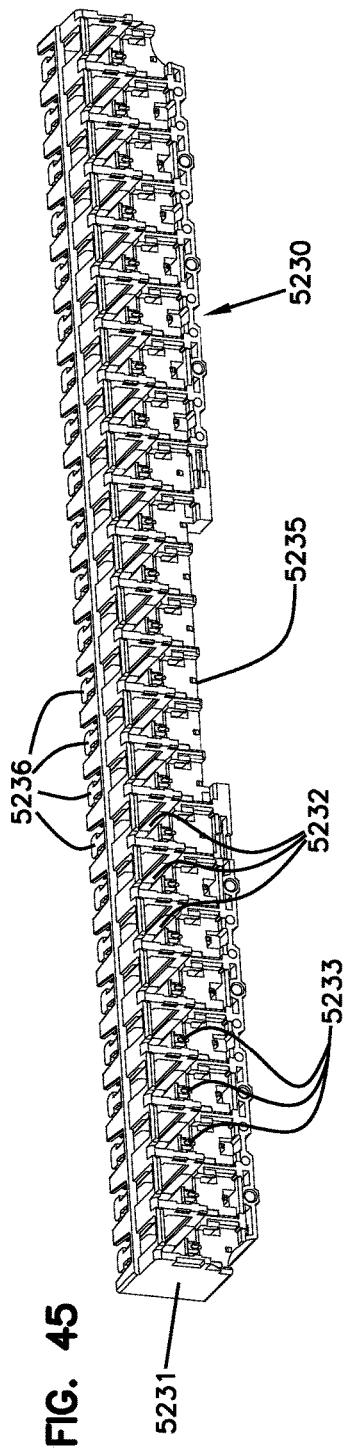
Figure 46:
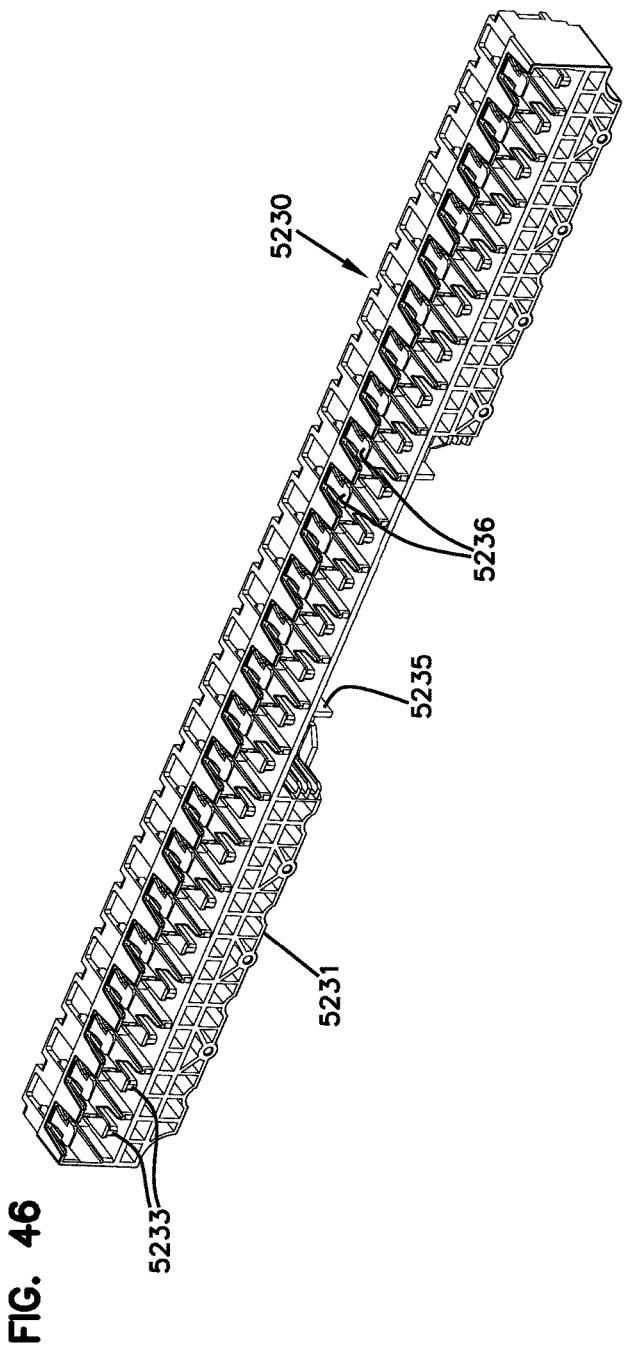
Figure 47:
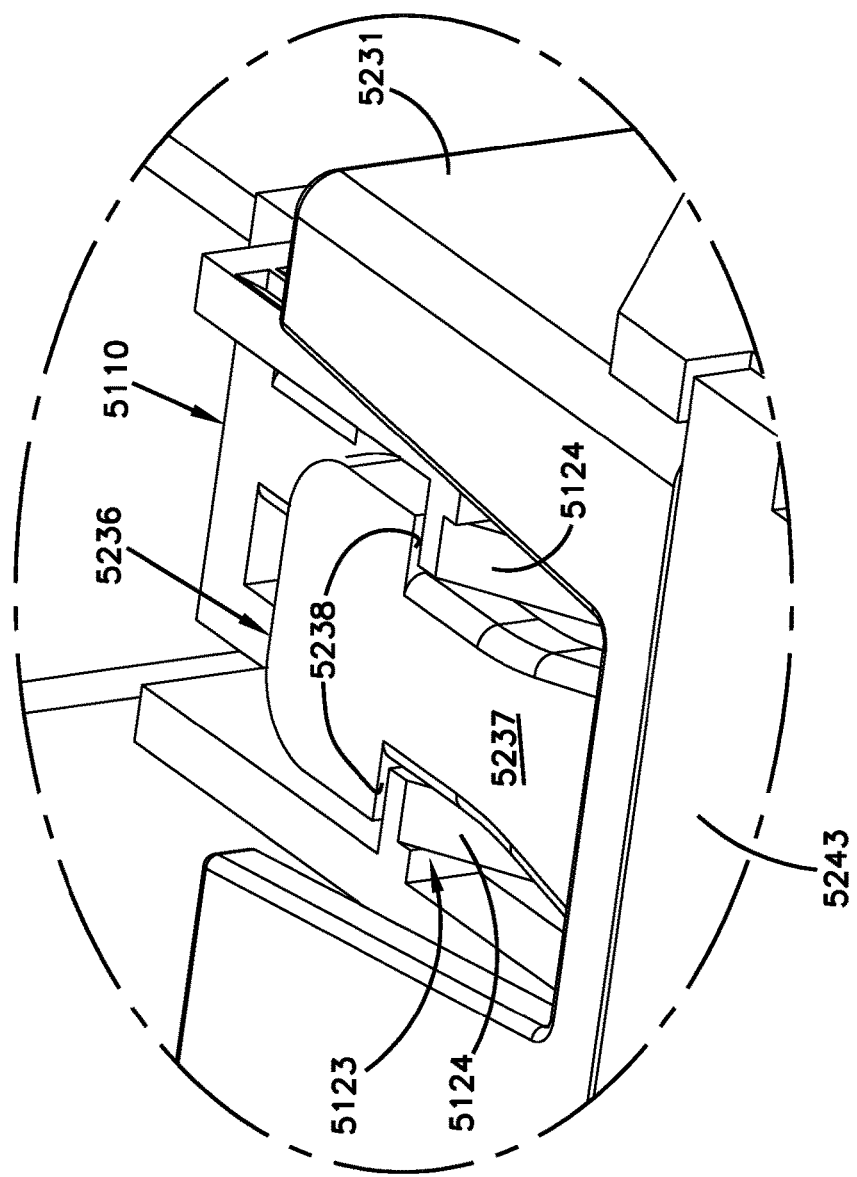
Figure 48:
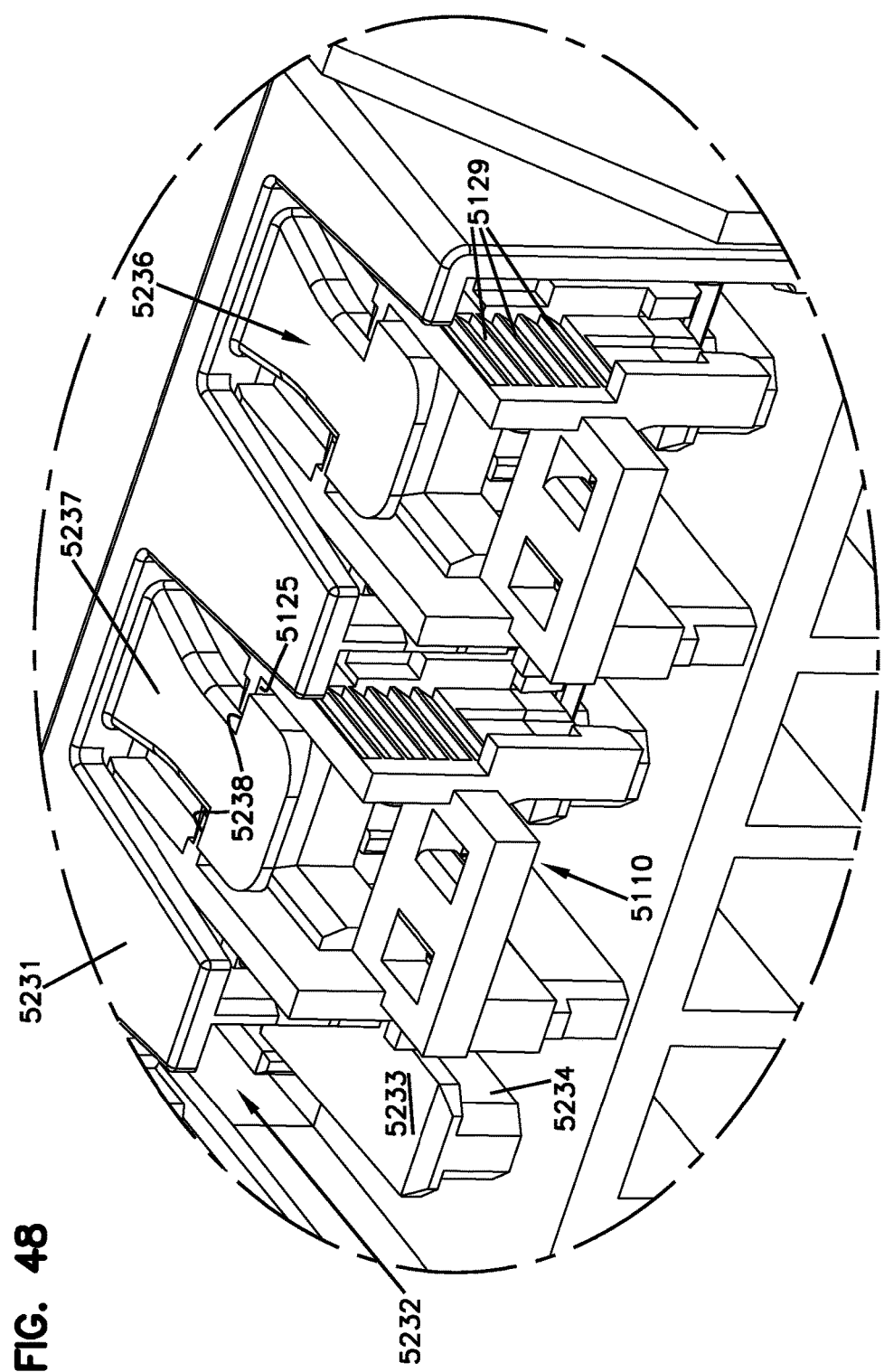

The front side of the second circuit board 5165 also includes a light indicator (e.g., an light emitting diode) 5169 that is used to display information pertaining to the media reading interface 5145, the second contacts 5146, the jack module 5110, and/or the plug connection contacts 5141 (see FIG. 43). The light is visible through the viewing channel 5153 of the media reading interface 5145. In some implementations, the second printed circuit board 5165 also may include additional light indicators 5167 to provide information to a user about the status of the patch panel (see FIG. 42). For example, the additional light indicators 5167 may provide error information. In the example shown in FIG. 42, the second printed circuit board 5165 includes three additional light indicators 5167. In other implementations, however, the second printed circuit board 5165 may include greater or fewer additional light indicators 5167.

In certain implementations, the second circuit board 5165 also includes a cable port 5166 at which a cable may be interfaced to the second printed circuit board 5165 (e.g., see FIG. 42). For example, the cable port 5166 may enable a user to connect a data cable to the second printed circuit board 5165 to obtain information from the storage device 5030 on one or more plugs 5002 inserted in the patch panel 5200. In certain implementations, the cable port 5166 also may enable a user to write information directly to the storage device 5030 of one or more plugs 5002. In other implementations, the cable port 5166 enables a user to access the processing unit 5270 from the front 5201 of the patch panel 5200.

One example chassis 5230 is shown in FIGS. 45-48. The chassis 5230 includes a chassis body 5231 defining openings 5232 through which the jack modules 5110 can be mounted to the chassis body 5231. In the example shown, the chassis body 5231 defines a recess 5235 (FIGS. 45-46) through which the processing unit 5270 may extend to connect to the second printed circuit board 5165. In certain implementations, the chassis body 5231 includes a mounting member 5233 extending into each opening 5232 (see FIGS. 43-44). In the example shown, each mounting member 5233 includes a generally T-shaped body defining channels 5234 on either side. Each mounting member 5233 is configured to aid in retaining one of the jack modules 5110 in the opening 5232.

In certain implementations, the jack modules 5110 are installed on the chassis body 5231 from the rear side of the chassis body 5231 (e.g., see FIG. 42). The jack module 5110 slides into the opening 5232 with the guide members 5127 of the jack module 5110 (see FIGS. 17 and 19) positioned on either side of the mounting member 5233. In one implementation, the latching members 5116 of the jack module 5110 slide within the channels 5234 defined by the mounting member 5233 (see FIGS. 43-44).

Figure 49:
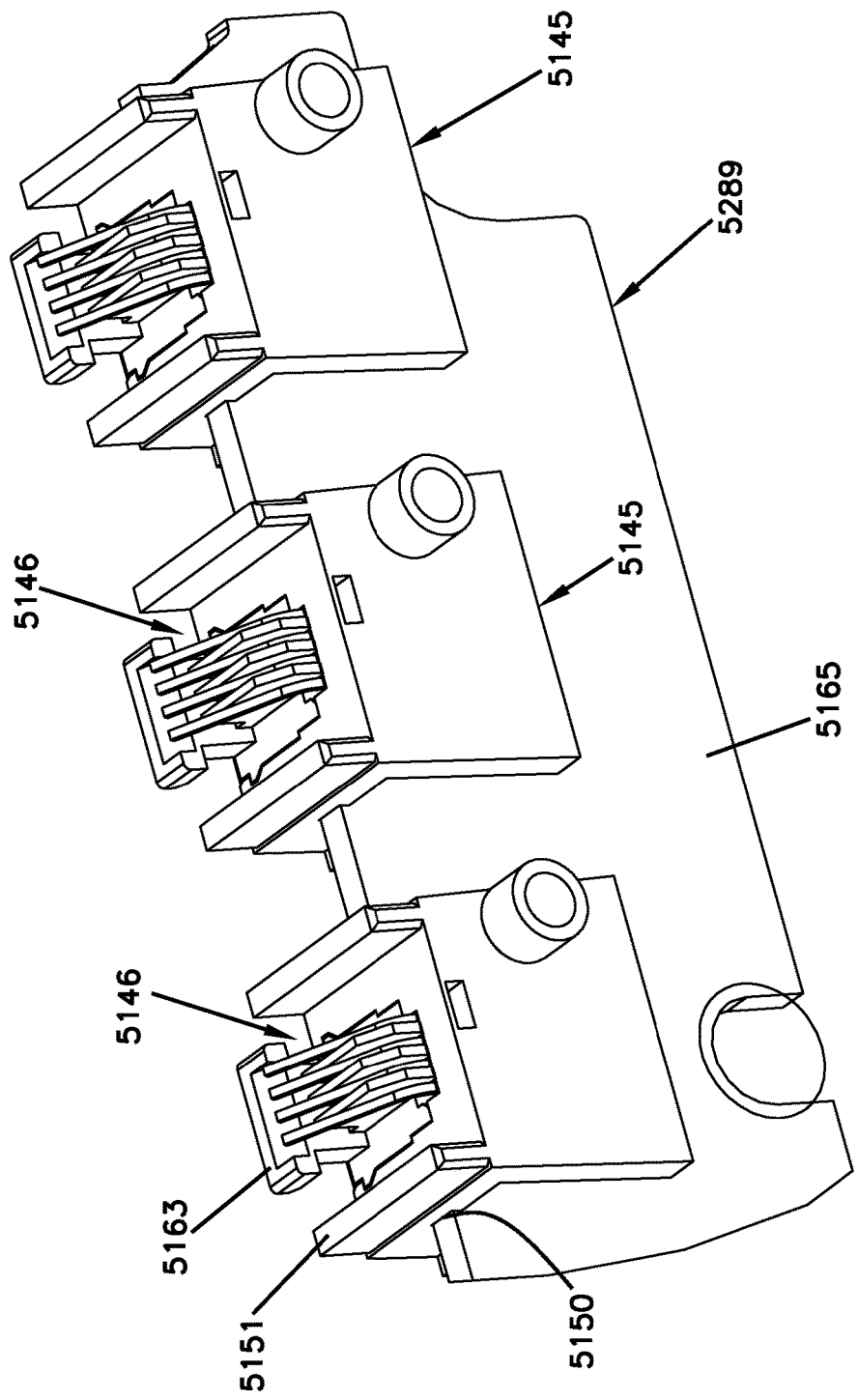

In some implementations, each media reading interface 5145 is mounted to a corresponding jack module 5110 after the jack module 5110 is mounted to the chassis body 5231. In other implementations, each media reading interface 5145 is installed on the second printed circuit board 5165 to form a board arrangement 5289 (FIG. 49). The board arrangement 5289 can be mounted to the chassis body 5231 before or after the jack modules 5110 are mounted to the chassis body 5231 (e.g., see FIG. 43).

In some implementations, the chassis body 5231 includes one or more latching members 5236 that aid in retaining the jack modules 5110 to the chassis body 5231. The example latching members 5236 shown in FIGS. 47 and 48 include flexible tabs 5237 defining at least one shoulder 5238. In certain implementations, each latching member 5236 defines a shoulder 5238 on each side of the flexible tab 5237. In the example shown, each flexible tab 5237 generally defines a mushroom shape. In other implementations, each flexible tab 5237 generally defines a T-shape.

When the jack modules 5110 are installed on the chassis body 5231, the front ends of the jack modules 5110 are inserted through the openings 5232 of the chassis body 5231 from a rear of the chassis body 5231. As the jack module 5110 is being inserted, one of the latching members 5236 of the chassis body 5231 cams over the ramped surfaces 5124 of the latching members 5123 of the jack modules 5110 (see FIG. 47). When the jack module 5110 has been sufficiently inserted in the chassis 5231, the latching member 5236 of the chassis body 5231 snaps over the latching members 5123 of the jack module 5110 so that the shoulders 5238 of the chassis latching member 5236 abut against shoulders 5125 of the jack latching member 5123 (see FIG. 48).

Figure 51:
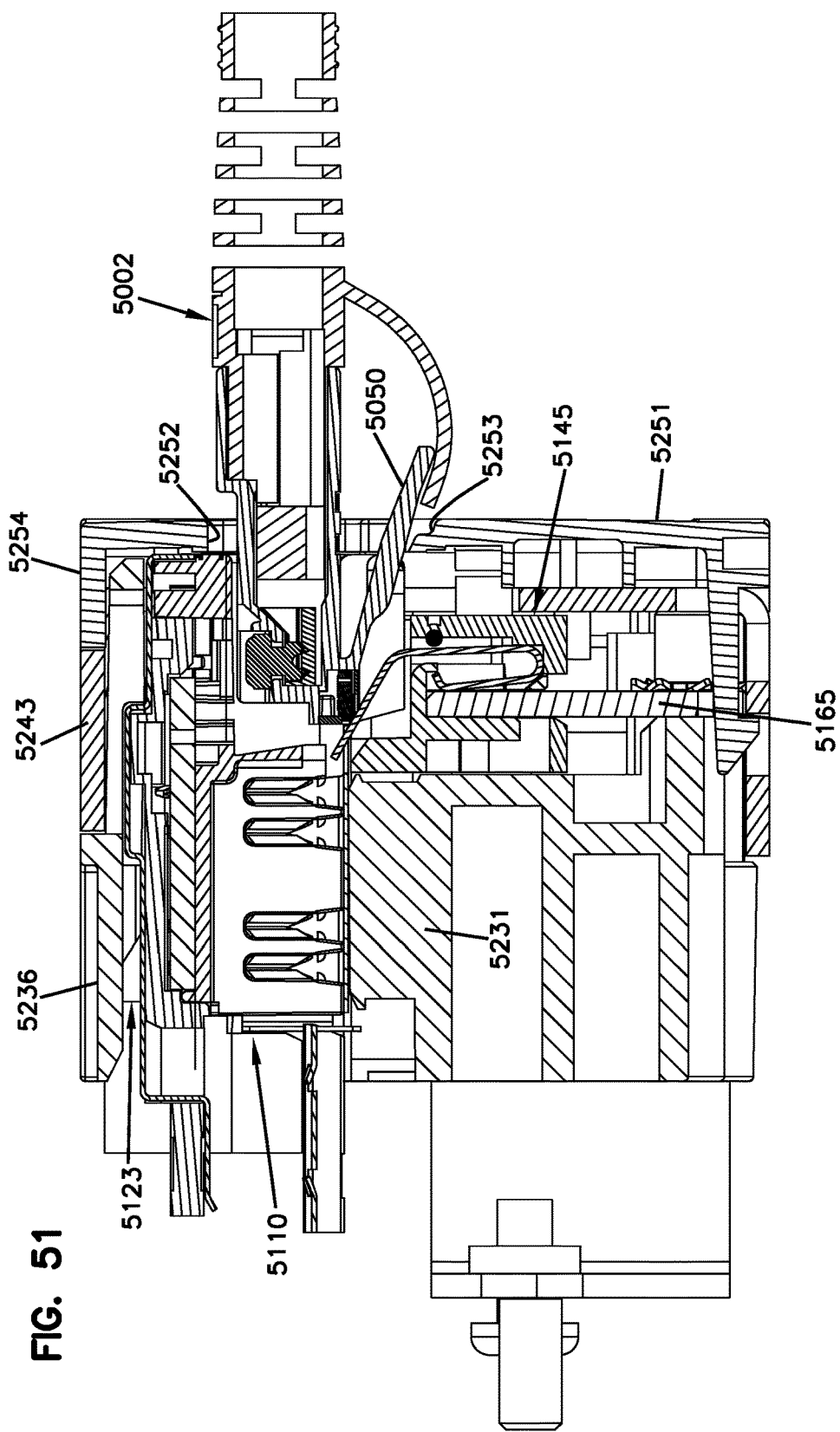
Figure 52:
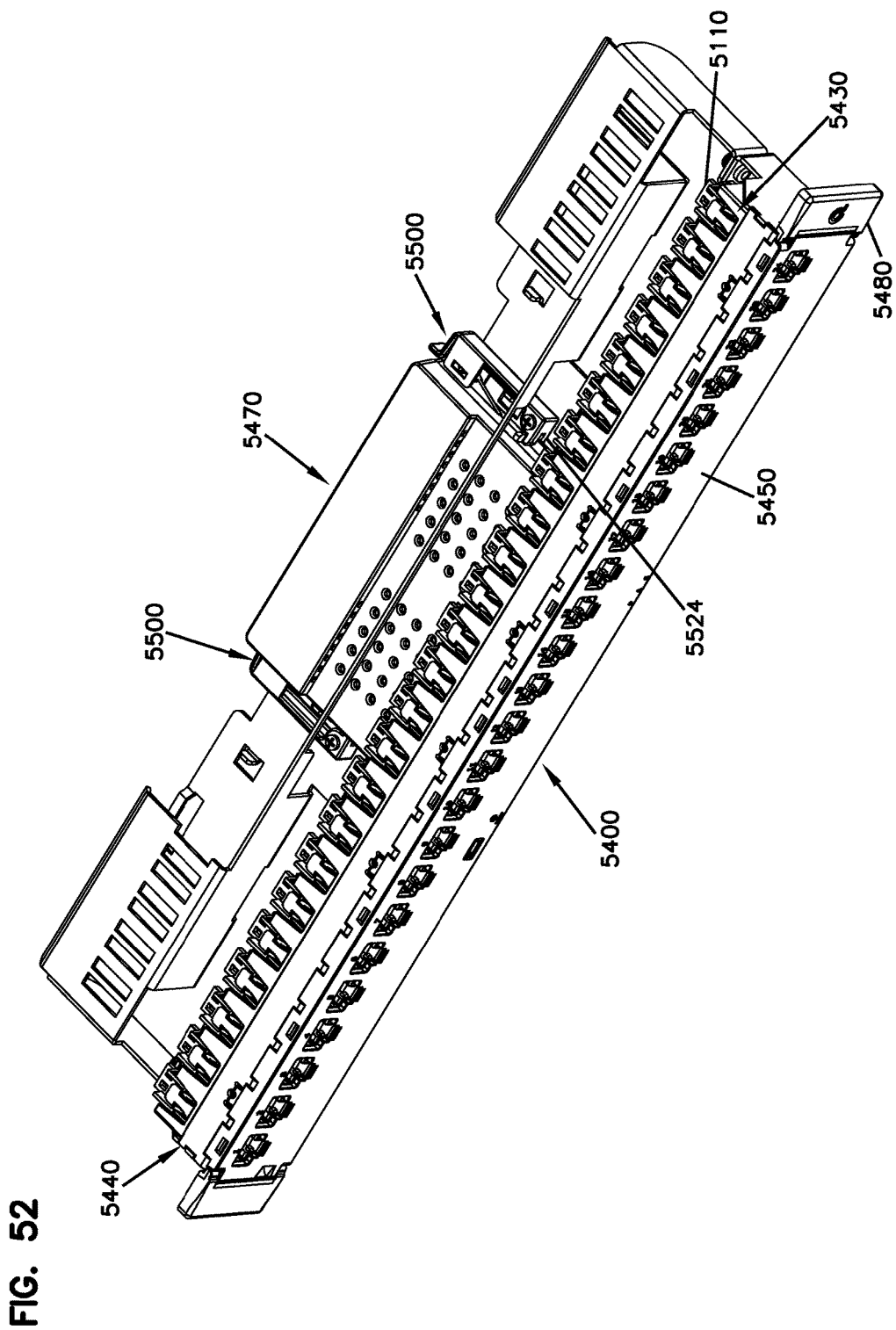
FIGS. 52-60 show a second example patch panel holding one or more jack modules and media reading interfaces in multiple rows in accordance with aspects of the present disclosure.

FIG. 51 shows a cross-sectional view of an example plug 5002 inserted within an assembled patch panel 5200. The plug 5002 extends through the fascia opening 5252, the frame opening 5242, and into the socket 5112 of the jack module 5110 mounted to the chassis 5230. The storage member contacts 5034 of the plug 5002 depress the second contacts 5146 of the media reading interface 5145 to lift the second contacts 5146 off the shorting pin 5155. The second printed circuit board 5165 is electrically connected to the second contacts 5146 is configured to sense when the second contacts 5146 are no longer being shorted together by the pin 5155.

Figure 34C:
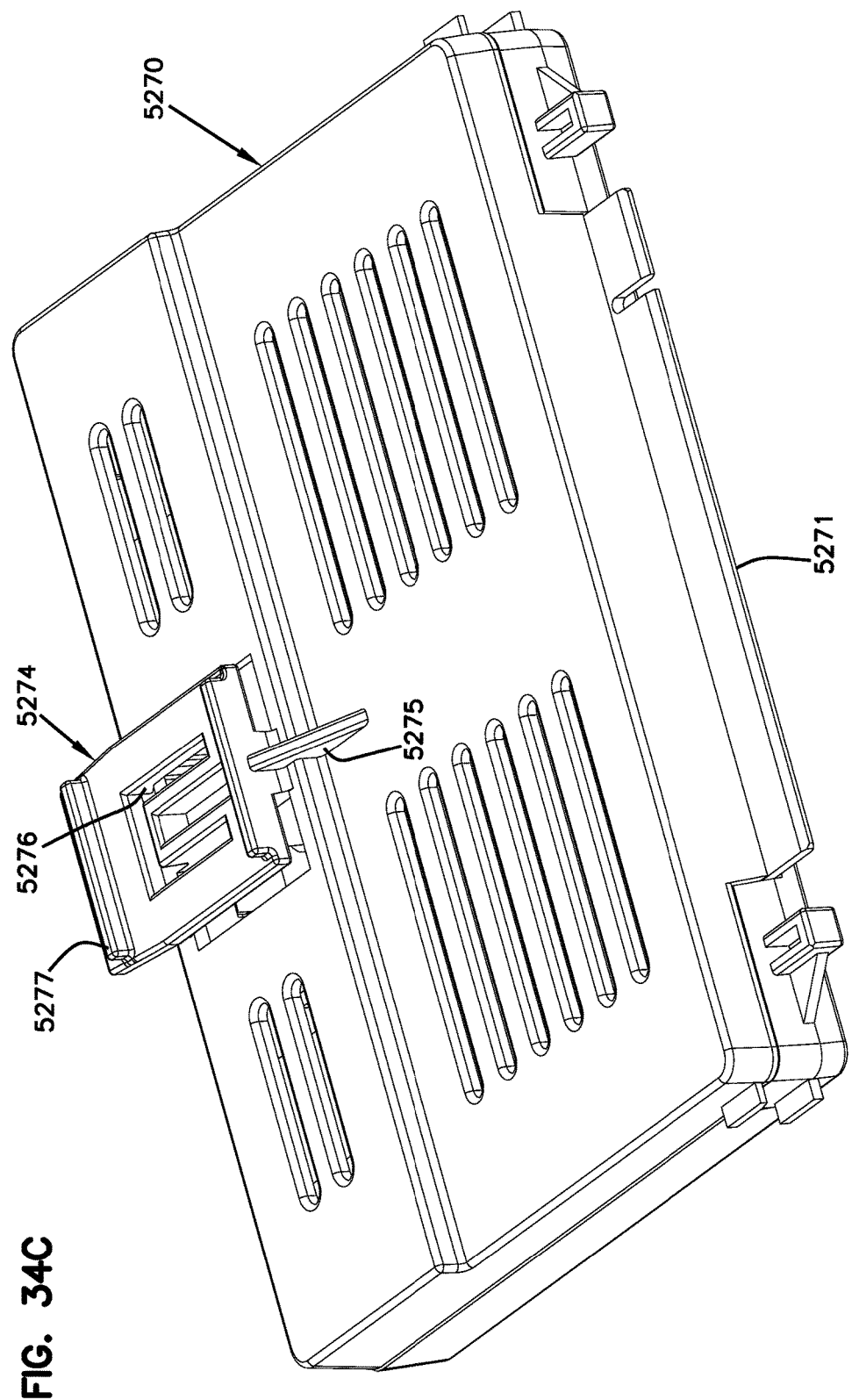

One example processing unit 5270 is shown in FIG. 34C. The processing unit 5270 includes at least a first connector 5271 with which the processing unit 5270 may be connected to the second printed circuit board 5270. In accordance with some aspects, certain types of processing units include guide and/or retaining members that facilitate connecting the processing units to the printed circuit board 5165. For example, the processing unit 5270 includes a retaining member 5274 with which the processing unit 5270 may be secured to the patch panel 5200. In certain implementations, the retaining member 5274 includes a guiding member 5275, at least one latching member 5276, and a depression surface 5277. In the example shown, the retaining member 5274 includes two latching members 5276.

The example processing unit 5270 also may include a port (e.g., see port 5273 of FIG. 35) configured to receive an electrical cable (e.g., a power cable, a data cable connected to a data network, etc.). In one implementation, the port includes an RJ jack (e.g., an RJ-45 jack). In other implementations, however, the processing unit 5270 may utilize other types of ports. In certain implementations, the processing unit 5270 also includes a second port (e.g., a USB port) at which another type of cable may be connected to the processing unit 5270 (e.g., see port 5273 of FIG. 35).

Figure 50:
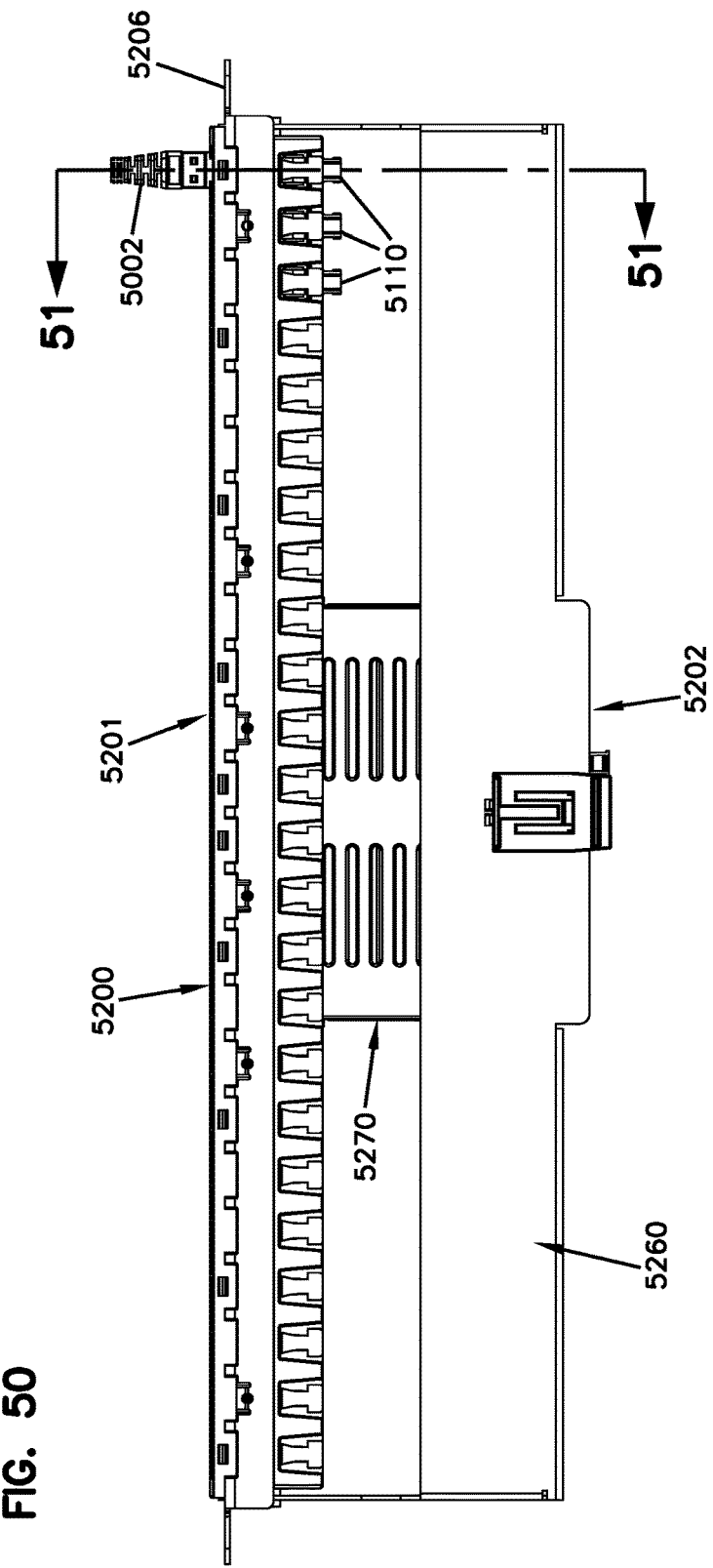

FIGS. 34 and 50 show one example support member 5260 suitable for use with the patch panel 5200. The support member 5260 includes a body 5261 having arms 5262 that are configured to attach to the patch panel 5200. For example, in some implementations, the arms 5262 may attach to the second housing part 5220 of the patch panel 5200 (e.g., to the chassis 5230). In other implementations, the arms 5262 may attach to grounding modules 5209 attached to the patch panel 5200 (e.g., see FIG. 52). In one implementation, the arms 5262 are unitary with the body 5261 of the support member 5260.

As shown in FIG. 34C, the body 5261 of the support plate 5260 includes a retention section 5264 at which the processing unit 5270 may be secured to the support plate 5260. For example, in some implementations, the support plate 5260 defines a slot 5265 at the retention section 5274 that is configured to receive the guide member 5275 of the retaining processing unit 5270. The body 5261 of the support plate 5260 also may define openings or slots 5266 that are configured to receive the latching members 5276 of the retaining member 5274 of the processing unit 5270. In some implementations, the processing unit 5270 is latched to the support plate 5260 by sliding the processing unit 5270 forwardly relative to the support plate 5260.

In accordance with some implementations, the support plate 5260 defines a manager. In some such implementations, the body 5261 defines one or more slots 5263 at which cables (e.g., cables terminating at the jack modules 5110) can be secured with cable ties or other retention members. In other implementations, the body 5261 may include one or more raised tabs at which the cable ties or other retention members may be fastened. For example, one example implementation of a suitable cable manager body is shown in FIG. 55E and will be described in more detail herein.

FIGS. 52-60 show another example patch panel 5400 including another example fascia 5450 mounted to another example frame 5440. The frame 5440 secures to another example chassis 5430 to enclose media reading interfaces 5145 mounted to the second printed circuit board 5165. End caps 5480 pivotally mount to the chassis 5450 to cover the mounting sections of the frame 5440.

Figure 55:
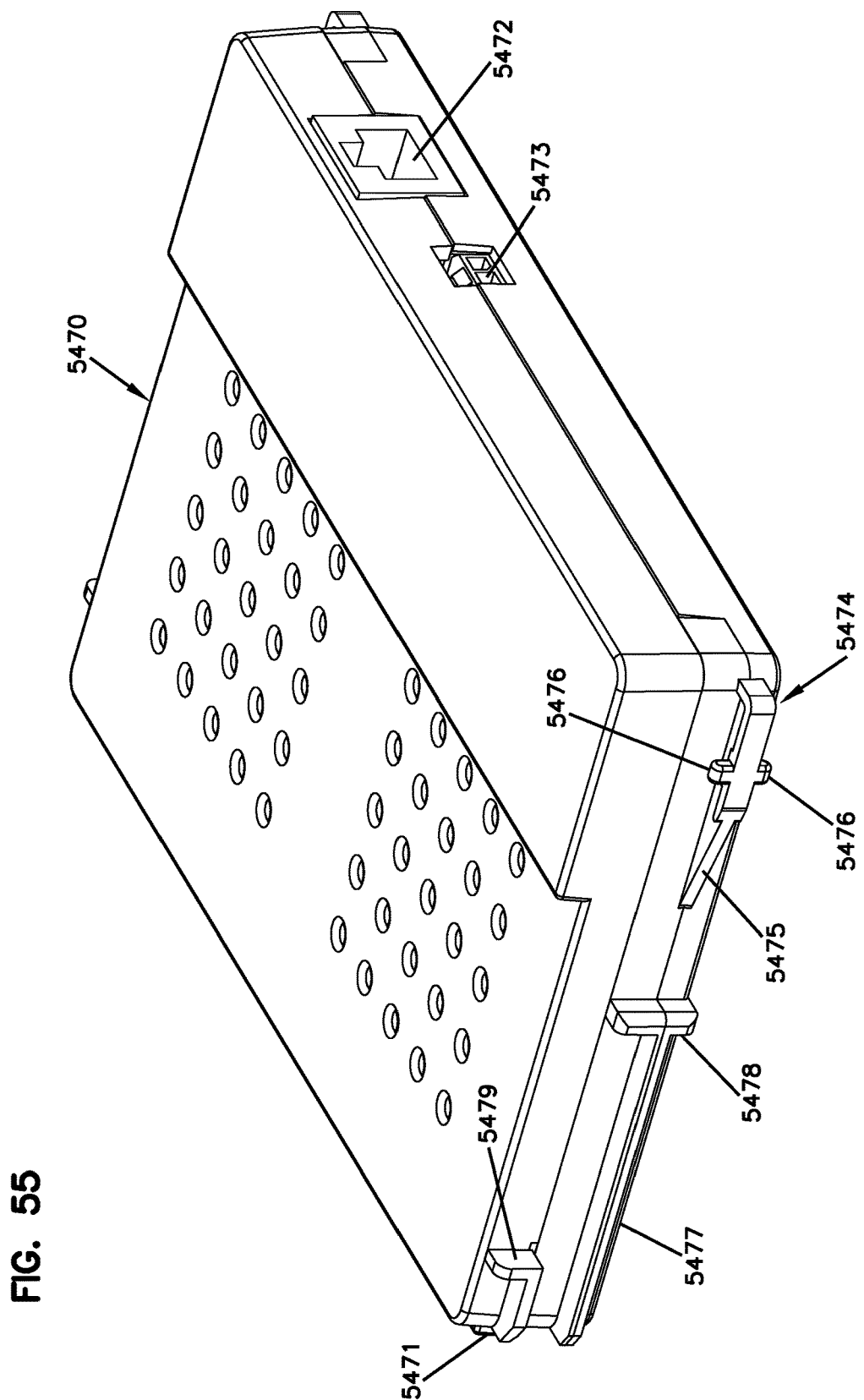

A second example processing unit 5470 including a processor (e.g., processor 206, 217 of FIG. 2) suitable for attachment to the patch panel 5400 is shown in FIG. 55. The second example processing unit 5470 includes a first connector 5471 that connects the processing unit 5470 to the second printed circuit board 5165. The second processing unit 5470 also include a port 5472 configured to receive an electrical cable (e.g., a power cable, a data cable connected to a data network, etc.). In one implementation, the port 5472 includes an RJ jack (e.g., an RJ-45 jack). In other implementations, however, the processing unit 5470 may utilize other types of ports. In certain implementations, the processing unit 5470 also includes a second port (e.g., a USB port) 547' at which another type of cable may be connected to the processing unit 5470.

As shown in FIG. 55, the processing unit 5470 also may include retaining members 5474 extending outwardly from sides of the processing unit 5470. In some implementations, the retaining members 5474 are located towards the rear end of the processing unit 5470. In other implementations, the retaining members 5474 may be located at an intermediate position along the sides of the processing unit 5470. Each retaining member 5474 defines a camming surface 5475 and at least one retention tab 5476. In the example shown, each guide member 5474 includes an upwardly extending retention tab 5476 and a downwardly extending retention tab 5476.

The processing unit 5470 also may include guide members 5477 on one or both sides of the processing unit 5470. In some implementations, the guide members 5477 include one or more rails that extend at least partially between the front and rear of the processing unit 5470. In certain implementations, the guide members 5477 also include a stop 5478 at an end of the rail. In the example shown, the stop 5478 is located at an intermediate position between the front and rear of the processing unit 5470. The stop 5478 extends generally orthogonally from the end of the rail 5477. In one implementation, the guide members 5477 also may include a forward stop 5479.

Figure 53:
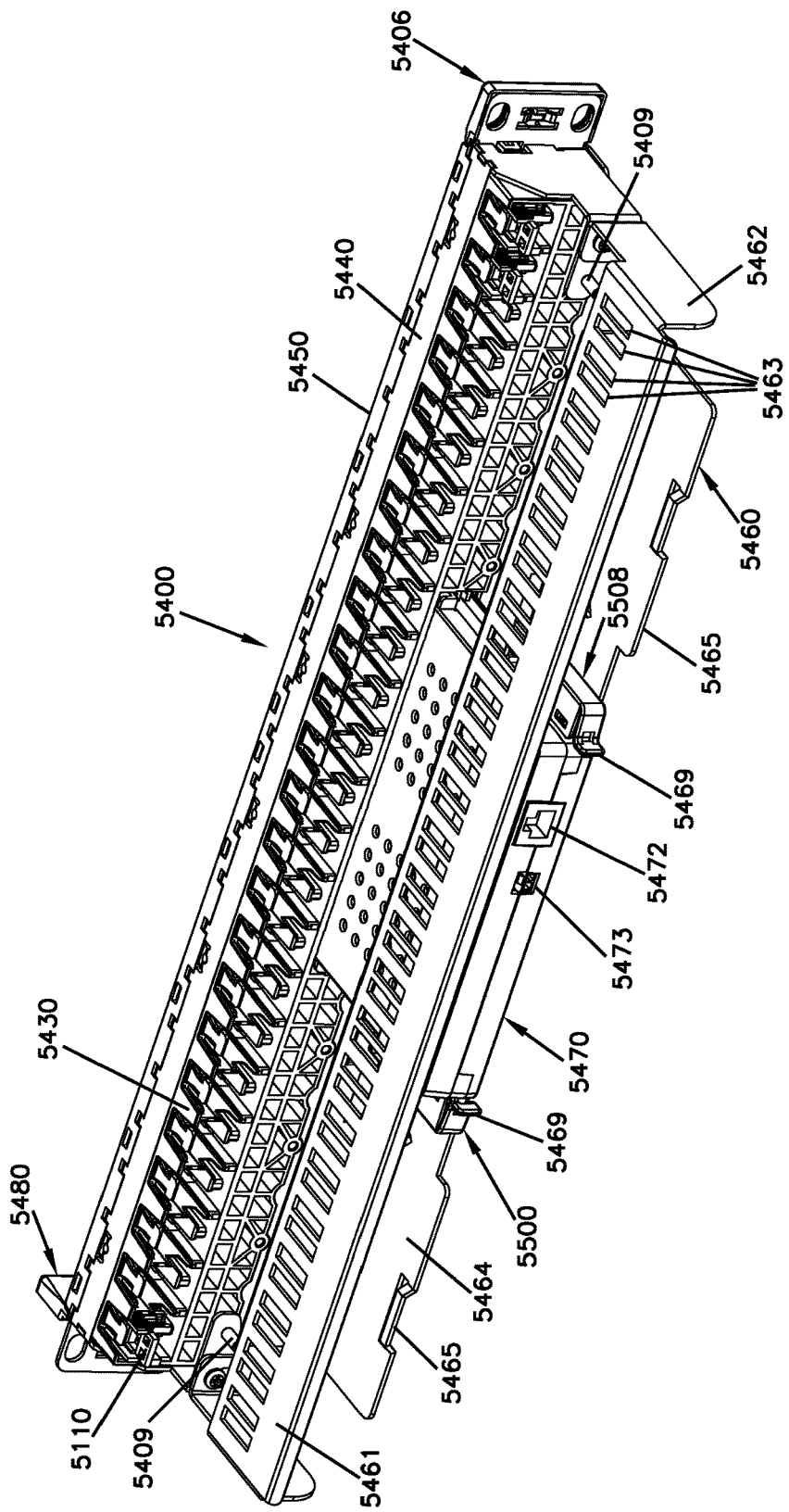
Figure 54:
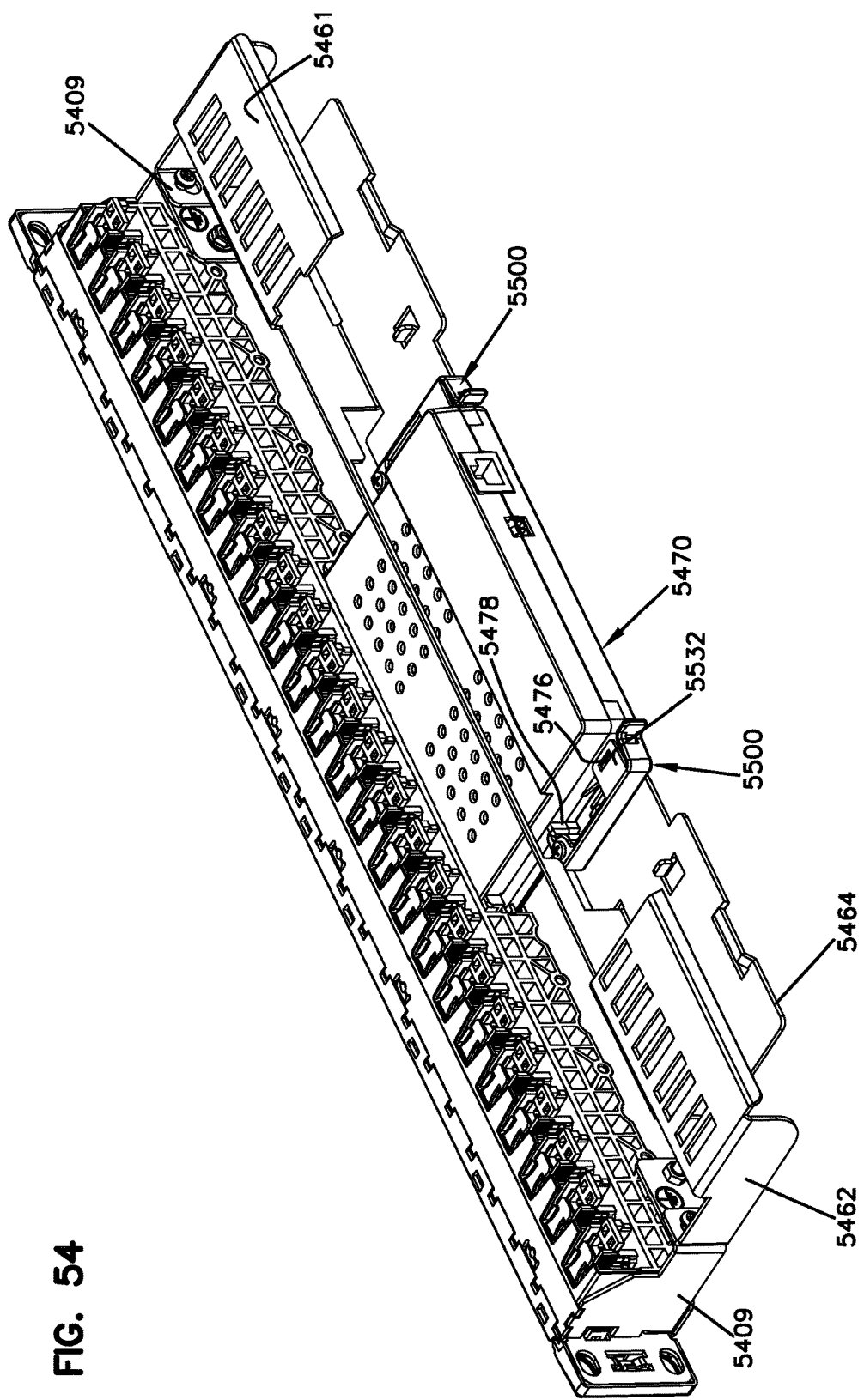

A second example cable manager 5460 suitable for use with the patch panel 5400 (see FIG. 53). The cable manager 5460 includes a body 5461 attached to the patch panel 5400. The body 5461 of the manager 5460 defines one or more slots 5463 at which cables (e.g., cables terminating at the jack modules 5110) can be secured with cable ties or other retention members. In some implementations, the body 5461 of the manager 5460 may include raised tabs in place of or in addition to the slots 5463.

In some implementations, the body 5461 extending between two arms 5462 that are configured to attach to the patch panel 5400. For example, in some implementations, the arms 5462 may attach to a second housing part of the patch panel 5400 (e.g., to the chassis 5430). In other implementations, the arms 5462 may attach to grounding modules 5409 attached to the patch panel 5400 (e.g., see FIG. 52). In one implementation, the arms 5462 are unitary with the body 5461 of the cable manager 5460.

Certain types of cable managers 5460 also may be configured to organize and/or secure cables routed to the processing unit 5470 when the processing unit 5470 is connected to the patch panel 5400. In some implementations, the example cable manager 5460 includes a support plate 5464 that is spaced from the body 5461 of the manager 5460. In the example shown, the support plate 5464 is generally parallel to the manager body 5461. In certain implementations, the support plate 5464 includes one or more slots or raised tabs 5465 at which one or more cables may be secured to the support plate 5464 using cable ties or other fasteners. For example, cables mounted to the processing unit 5470 may be secured to the support plate 5464 using the raised tabs 5465.

Certain types of cable managers 5460 also may be configured to support and/or retain the processing unit 5470 when the processing unit 5470 is connected to the patch panel 5400. In some implementations, the cable manager 5460 includes one or more retaining arms 5500 that releasably secure to the processing unit 5470 to the patch panel 5400. For example, the cable manager 5460 may include two spaced retaining arms 5500 that retain the retaining members 5474 at opposite sides of the processing unit 5470. In certain implementations, each retaining arm 5500 is configured to flex or pivot relative to the patch panel 5400.

Figure 56:
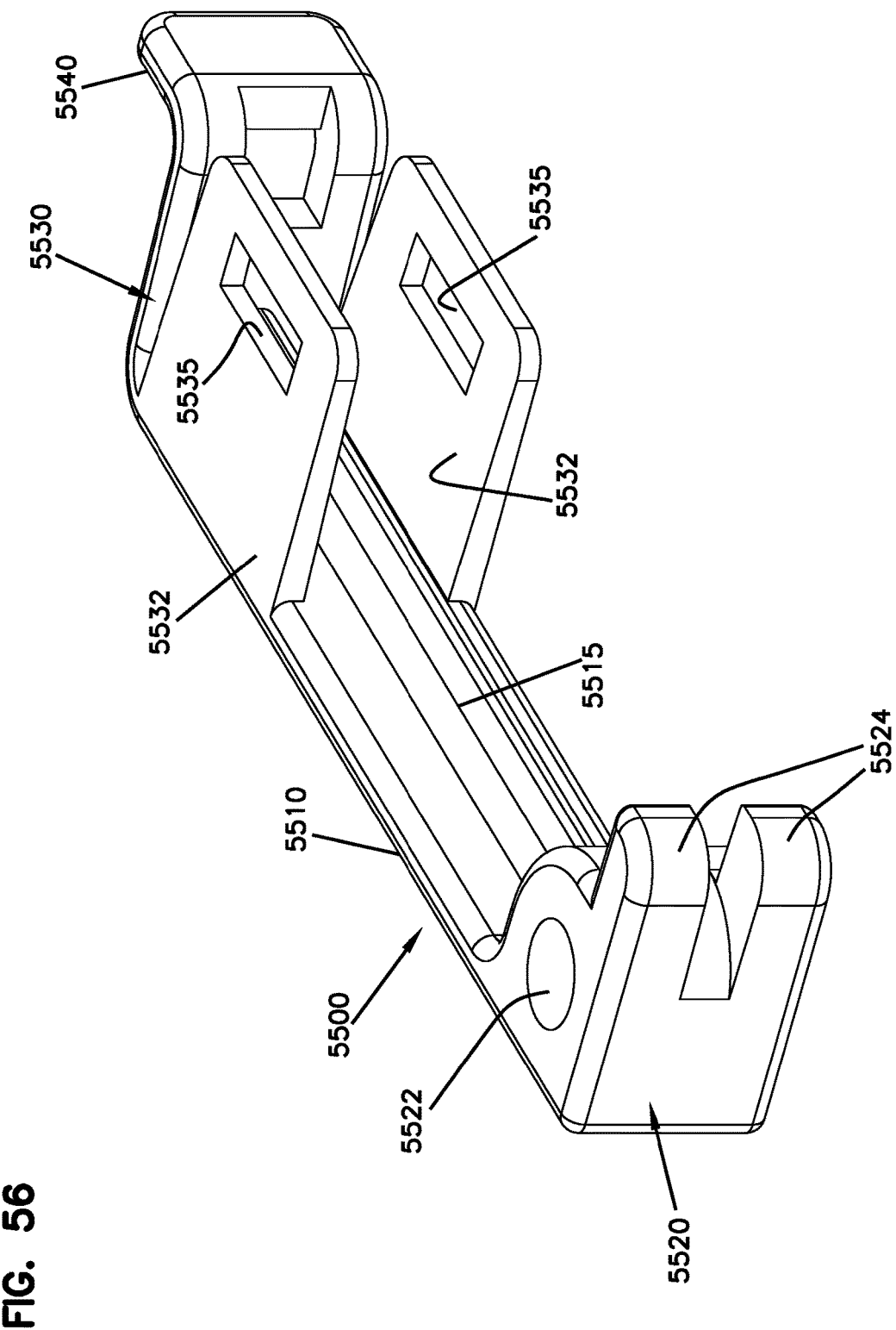
Figure 57:
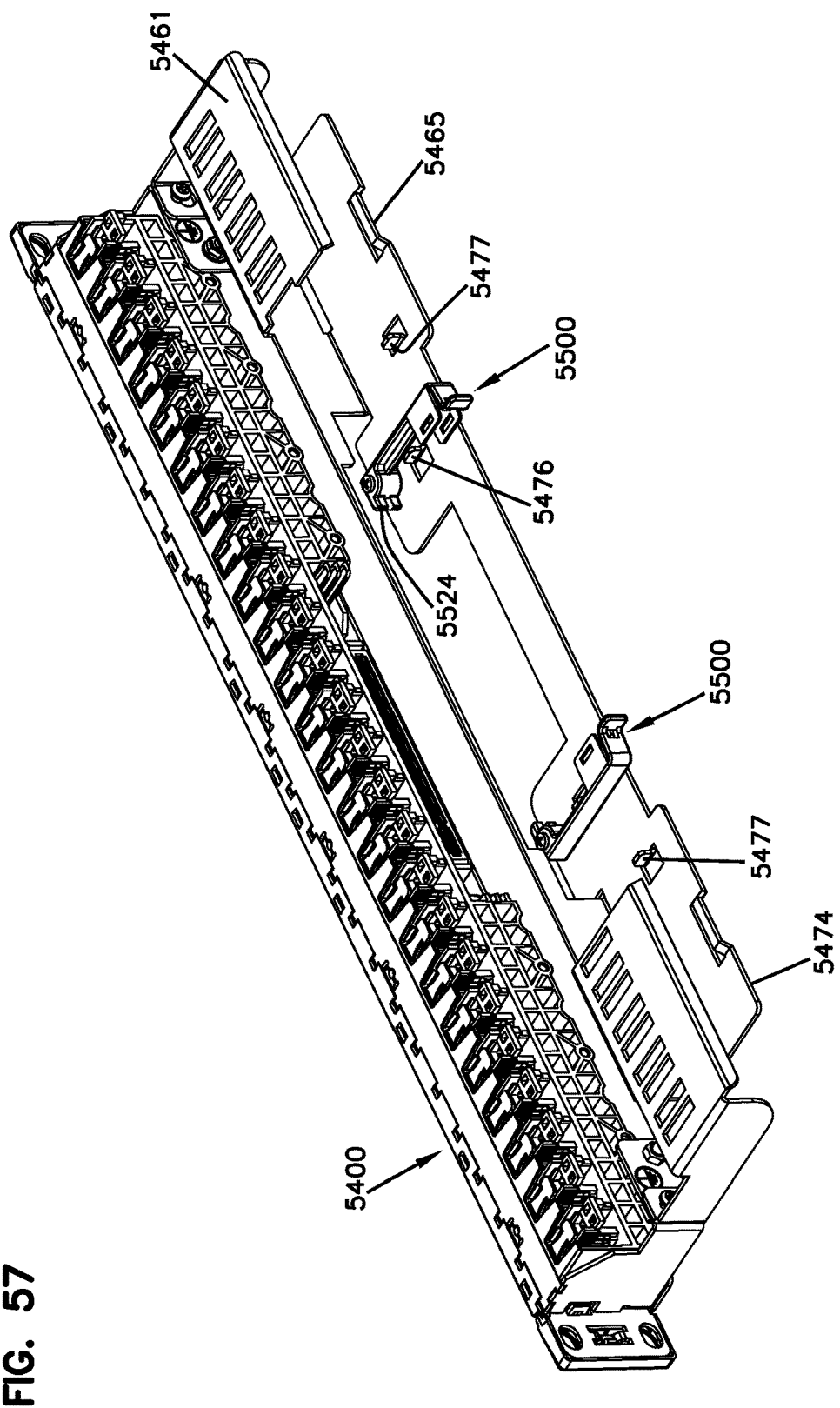
Figure 58:
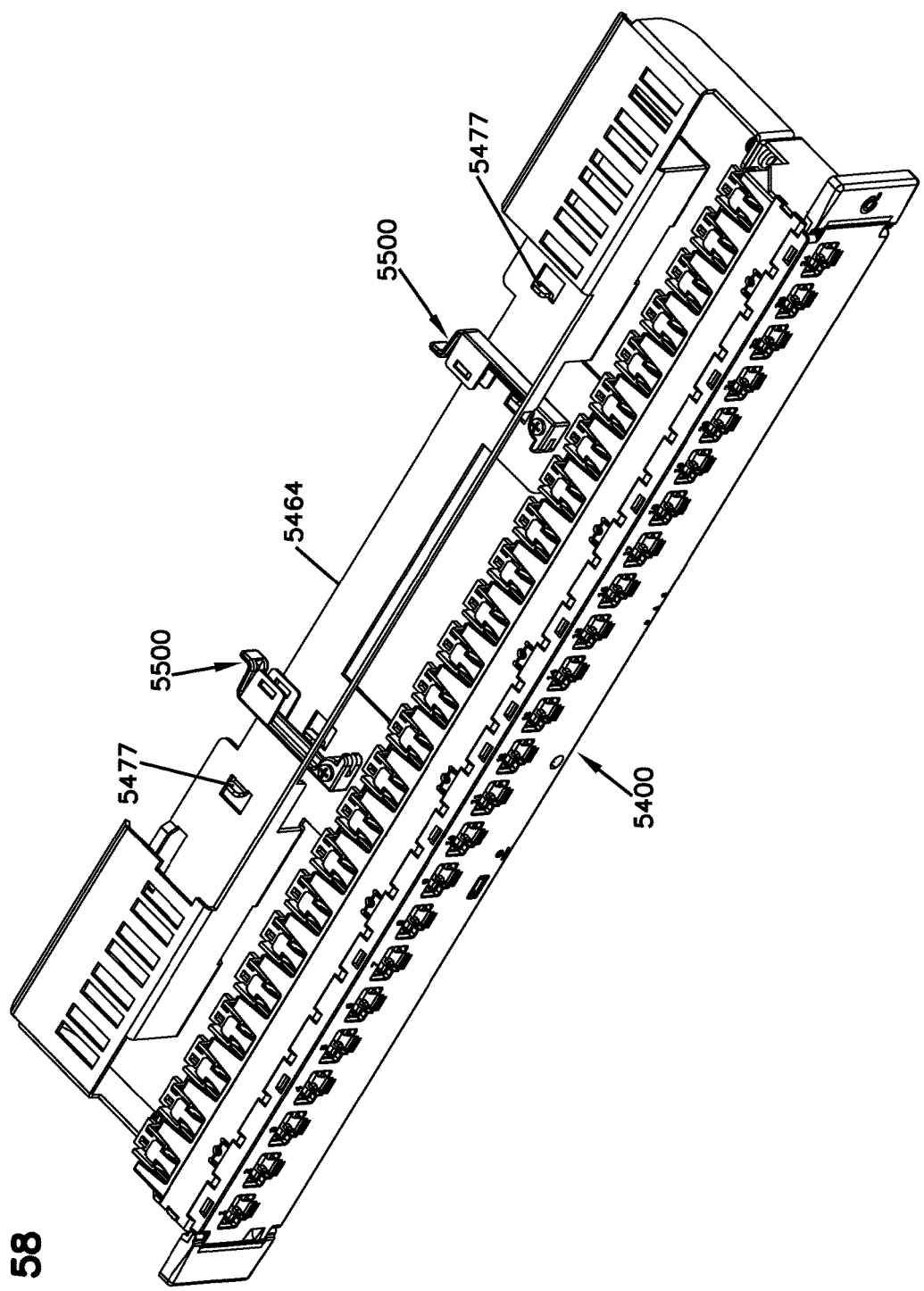

As shown in FIG. 56, each retaining arm 5500 includes an elongated member 5510 extending between a mounting section 5520 and a handle 5540. In certain implementations, the elongated member 5510 defines a guiding surface 5515 that facilitates sliding the processing unit 5470 toward the printed circuit board 5165. The mounting section 5520 of the arm 5500 defines a pivot opening 5522 through which a fastener can extend to pivotally mount the arm 5500 to the support plate 5464. In certain implementations, the arm 5500 includes one or more tabs 5524 that extend outwardly from the mounting section 5520. In the example shown, the arm 5500 includes two spaced tabs 5524.

A retaining section 5530 is provided on the arm 5500 at a location spaced from the mounting section 5520. In the example shown, the retaining section is provided adjacent the handle 5540. The retaining section 5530 includes at least a first flange 5542 extending outwardly from the elongated member 5510. In the example shown, first and second flanges 5532 extend outwardly from opposite sides of the elongated member 5510. In one implementation, the first and second flanges 5532 extend generally parallel to each other. Each flange 5532 defines an opening or slot 5535 that is sized and configured to receive a retention tab 5476 of the processing unit 5470 (see FIGS. 52-54).

Figure 59:
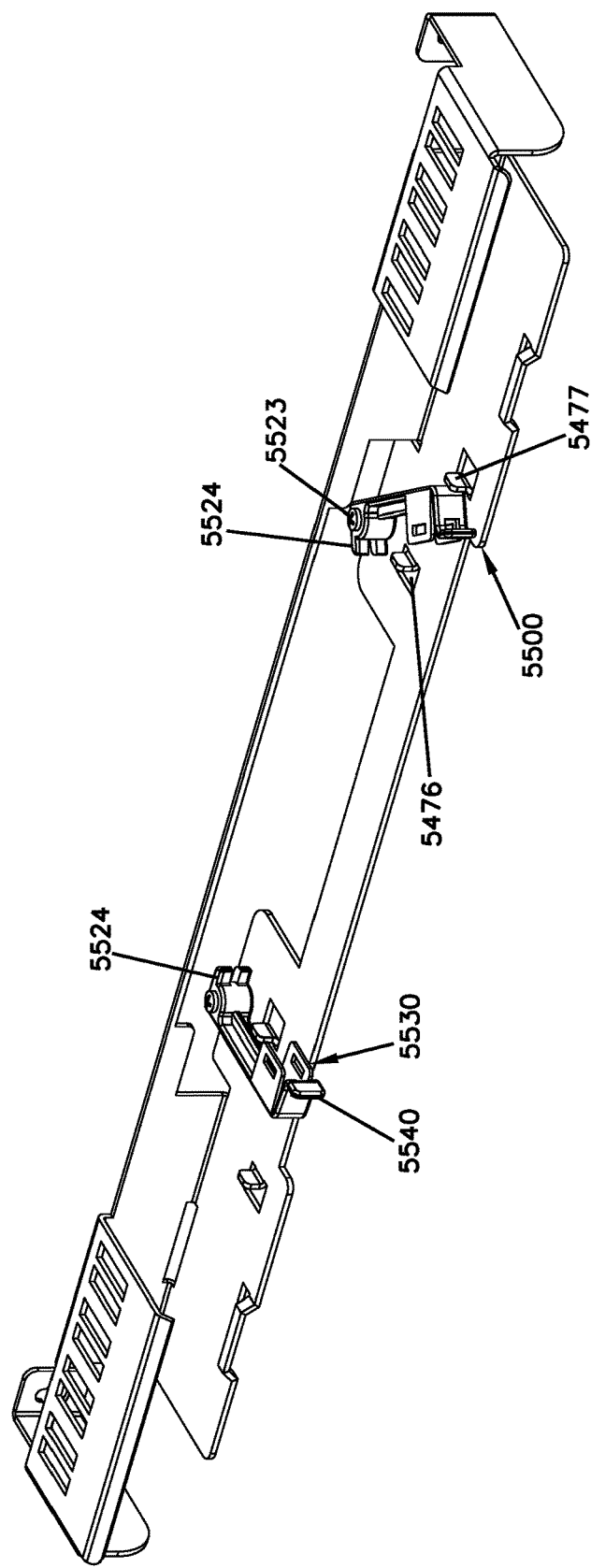
Figure 60:
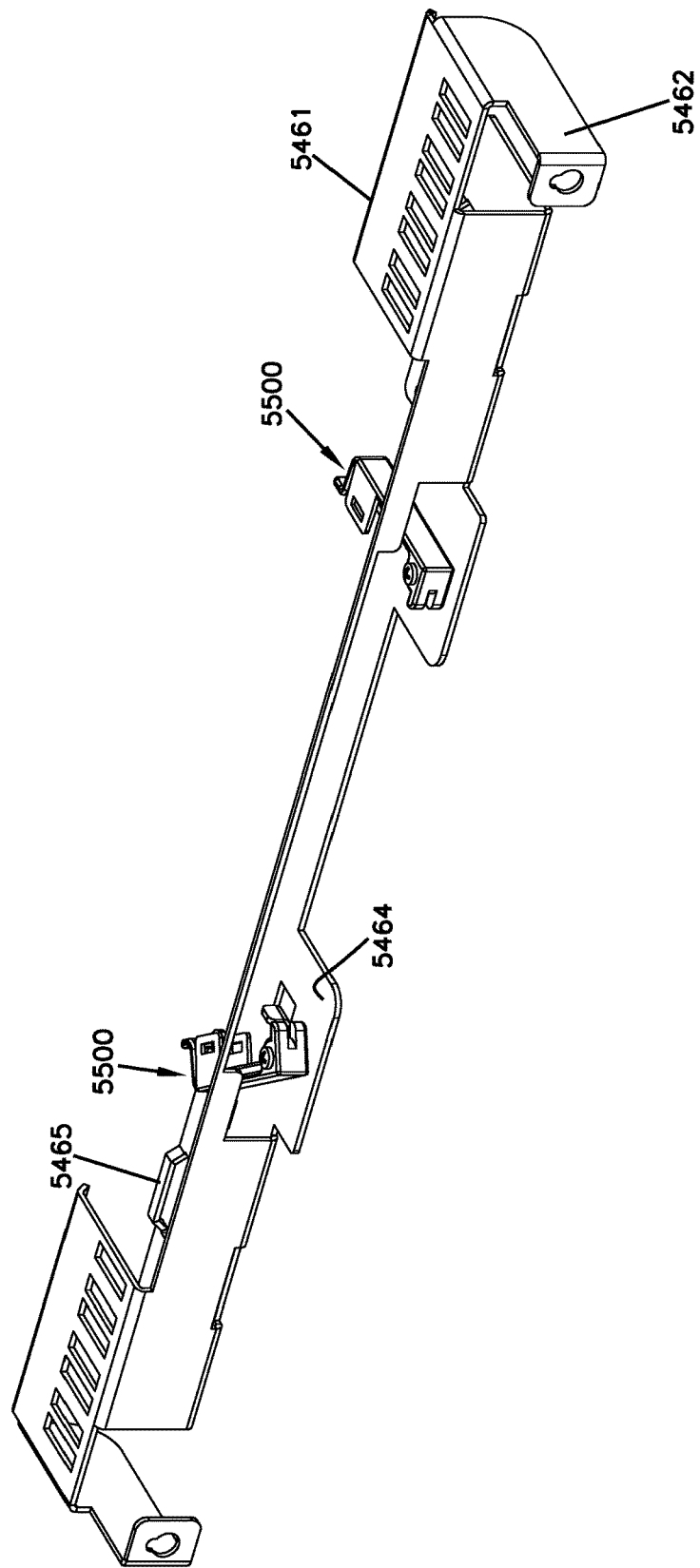

As shown in FIGS. 59-60, each of the arms 5500 is configured to pivot relative to the support plate 5474. In some implementations, the support plate 5474 includes inner stops 5476 and outer stops 5477 that define inhibit pivoting of the arms 5500 beyond a particular range of movement. For example, the inner and outer stops 5476, 5477 may inhibit movement of the arms 5500 beyond where the handle 5540 of each arm 5500 would be accessible to a user. In the example shown in FIGS. 59-60, a first arm 5500 is shown in a first position adjacent the inner stop 5476 and a second arm 5500 is shown in a second position adjacent the outer stop 5477.

To mount the processing unit 5470 to the second printed circuit board 5165 of the second patch panel 5400, a user moves the arms 5500 toward the second position. The user then slides the processing unit 5470 toward the second printed circuit board 5165. When the processing unit 5470 is slid sufficiently forward, the stop 5478 on the processing unit 5470 contacts the tabs 5524 of the arms 5500. Continuing to slide the processing unit 5470 forward applies a force to the tabs 5524, which causes the arms 5500 to pivot toward the first position. Pivoting the arms 5500 to the first position causes the retaining sections 5530 of the arms to contact the retaining members 5574 on the processing unit. For example, the slots 5535 of the retaining flanges 5532 of the arms 5500 may receive the tabs 5476 of the retaining members 5474 of the processing unit 5470.

To release the second processing unit 5470 from the patch panel 5400, a user pulls the retaining arms 5500 (e.g., via the grip portions 5540) away from the processing unit 5470. Pivoting the arms 5500 toward the second position causes the tabs 5524 of the arms 5500 to apply a levering force to the stops 5478 of the processing unit 5470. In some implementations, the levering force applied to the stops 5478 may be sufficient to disconnect the processing unit 5470 from the second printed circuit board 5165 (e.g., even when a sufficient gripping surface of the processing unit 5470 is not available to the user). Indeed, in some implementations, the levering force applied to the stops 5478 is sufficient to slide the processing unit 5470 rearwardly of the patch panel 5400.

FIGS. 61-71 show a third example patch panels 5300 at which multiple jack modules 5110 can be assembled. The third example patch panel 5300 includes two rows of front cable ports 5305 at which the sockets 5112 of the jack modules 5110 are accessible. In some implementations, the jack modules 5110 of the second row are oriented upside-down relative to the jack modules 5110 of the first row (e.g., see FIGS. 61-62).

Figure 64:
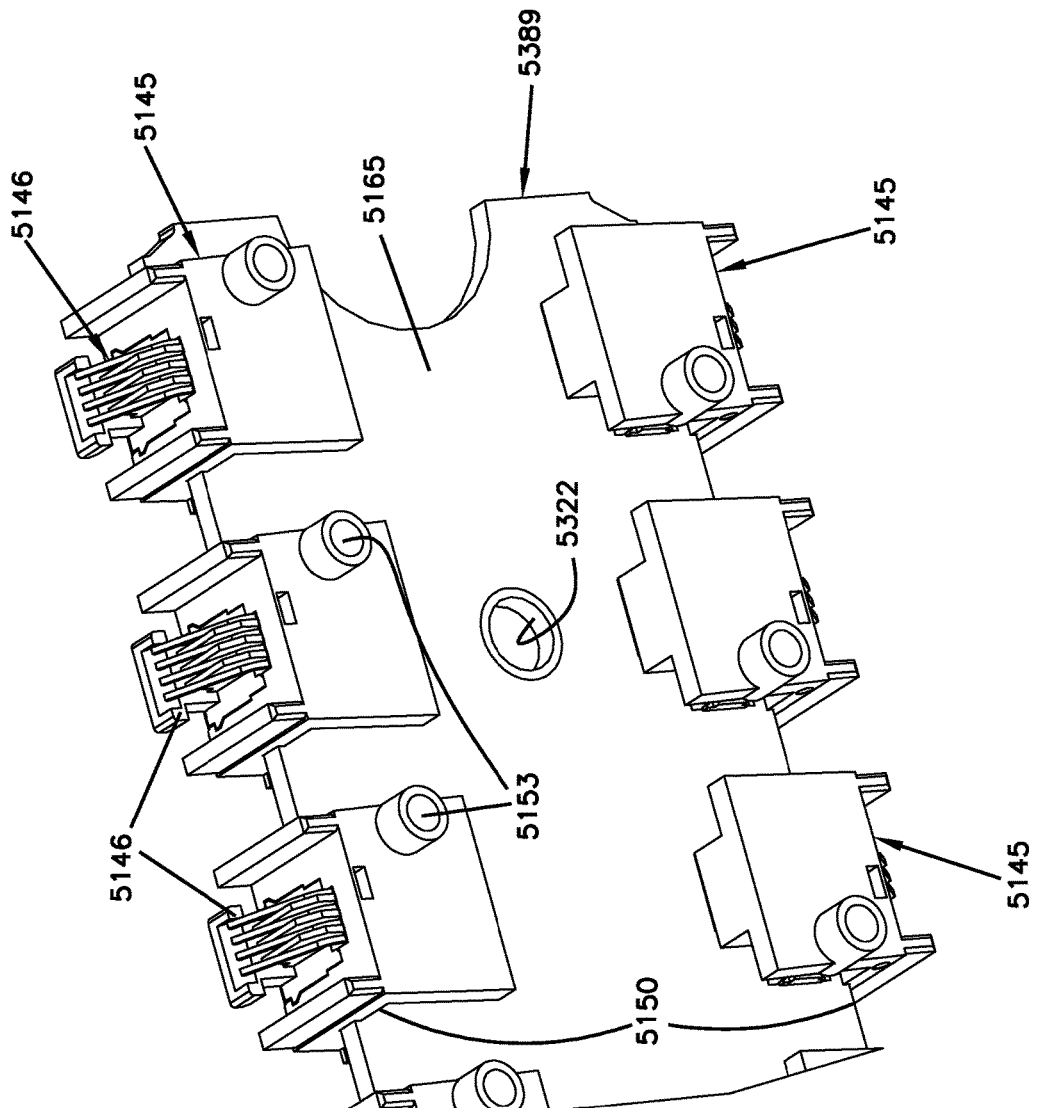

In certain implementations, the media reading interfaces 5145 associated with the jack modules 5110 of the second row are oriented upside-down relative to the media reading interfaces 5145 associated with the jack modules 5110 of the first row. For example, a first row of media reading interfaces 5145 may be mounted to a first edge of the second printed circuit board 5165 and a second row of media reading interfaces 5145 may be mounted to a second edge of the second printed circuit board 5165 (FIG. 64).

Figure 61:
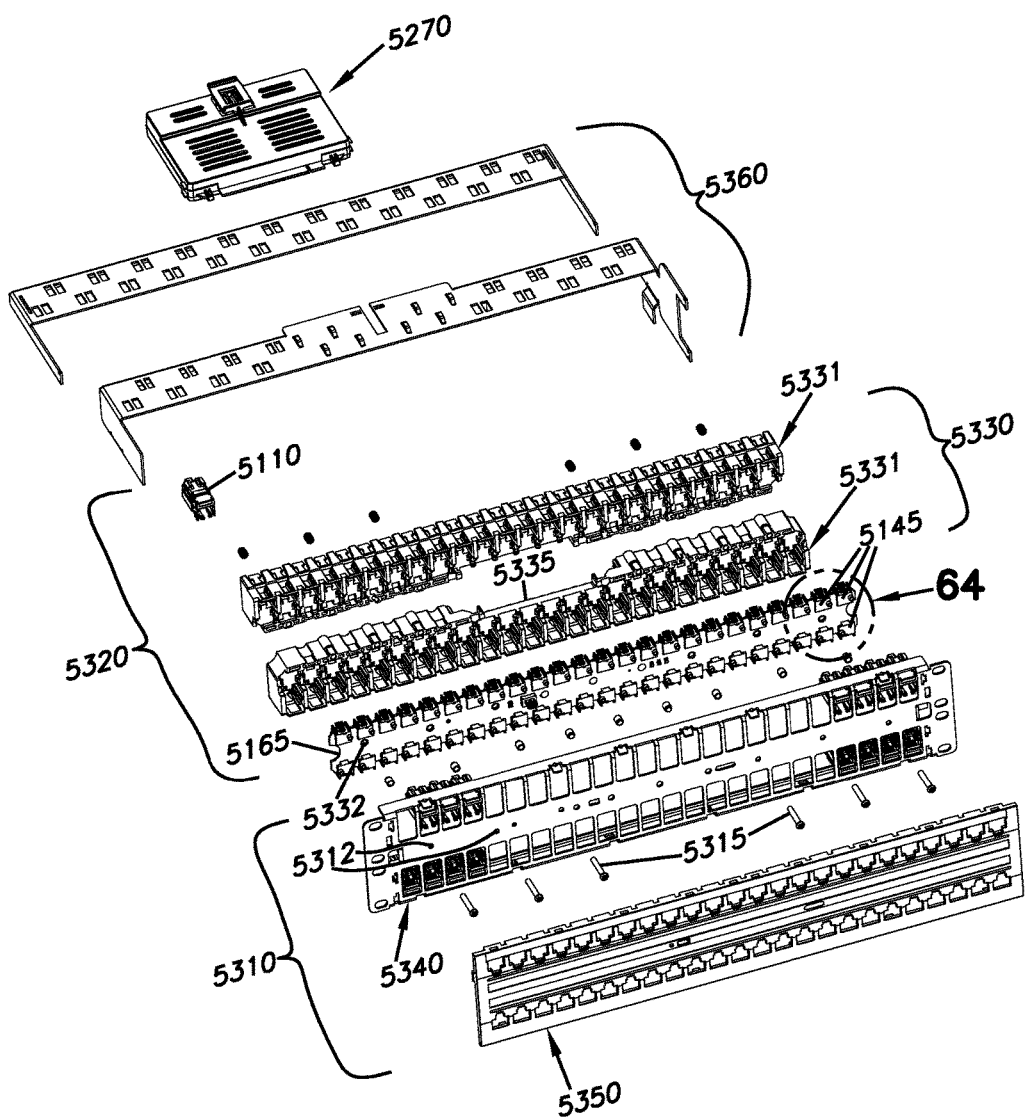
FIGS. 61-71 show a third example patch panel holding one or more jack modules and media reading interfaces in multiple rows in accordance with aspects of the present disclosure.

In some implementations, the patch panel 5300 shown in FIG. 61 is sized at 2 RU. In one example implementation, the patch panel 5300 shown in FIG. 61 defines forty-eight cable ports 5305 with twenty-four ports in each row. In certain implementations, the patch panel 5300 shown in FIG. 61 is sized to be smaller than 2 RU. In certain implementations, the patch panels 5200, 5400 are sized at 1 RU and define twenty-four front ports 5205, 5405 each. In other implementations, however, each patch panel 5200, 5300, 5400 may define greater or fewer front ports.

The third patch panel 5300 includes mounting members 5306. The mounting member 5306 defines one or more openings 5307 through which a fastener may extend to secure the third patch panel 5300 to rails or posts of a frame, a rack, a cabinet, or other telecommunications equipment structures. End caps can be installed over the mounting members 5306. In one implementation, the end caps may be larger versions of the end caps 5280 shown in FIGS. 37-39. In other implementations, the end caps may be configured to snap-fit, friction-fit, or otherwise secure over the mounting members 5306 to cover the openings 5307.

In some implementations, the third patch panel 5300 includes a first housing part 5310 and a second housing part 5320 (see FIG. 61). The first housing part 5310 defines the front ports 5305. In some implementations, the first housing part 5310 includes a frame 5340. In certain implementations, the first housing part 5310 also includes a fascia 5350 that is removeably coupled to the frame 5340. In certain implementations, the third patch panel 5300 also includes a grounding connection. The grounding connection may connect to the shields 5134 of the jack modules 5110 and/or to the second printed circuit board 5165.

The second housing part 5320 includes at least one or more jack modules 5110 mounted to a chassis arrangement 5330. In certain implementations, the second housing part 5320 also includes one or more media reading interfaces 5145. In one implementation, the third patch panel 5300 has the same number of jack modules 5110 and media reading interfaces 5145. In other implementations, the third patch panel 5300 has more jack modules 5110 than media reading interfaces 5145. For example, in one implementation, the third patch panel 5300 may have twice as many jack modules 5110 than media reading interfaces 5145. In other implementations, the third patch panel 5300 may include more media reading interfaces 5145 than jack modules 5110. For example, in certain implementations, each jack module 5110 may define two plug sockets. In such implementations, each plug socket may have its own media reading interface 5145.

In some implementations, the media reading interfaces 5145 are mounted to a printed circuit board 5165. Multiple media reading interfaces 5145 mount over at least a first edge of the second printed circuit board 5165. In the example shown in FIGS. 61 and 64, multiple media reading interfaces 5145 mount over different (e.g., opposite) edges of the second printed circuit board 5165. Each media reading interface 5145 also is connected to at least one jack module 5110. The second printed circuit board 5165 in installed at the third patch panel 5300. For example, in FIG. 61, the second printed circuit board 5165 is configured to be held between the first housing part 5310 and the second housing part 5320.

Figure 65:
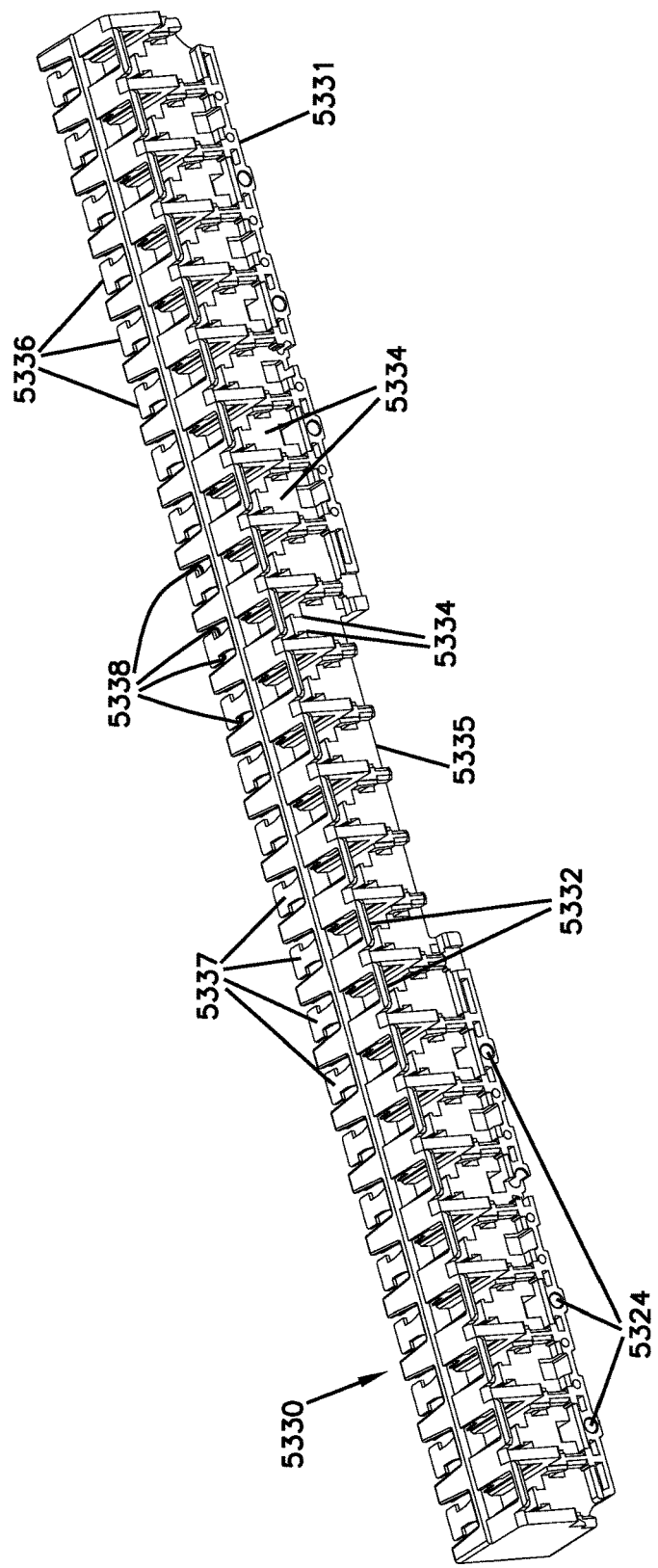
Figure 66:
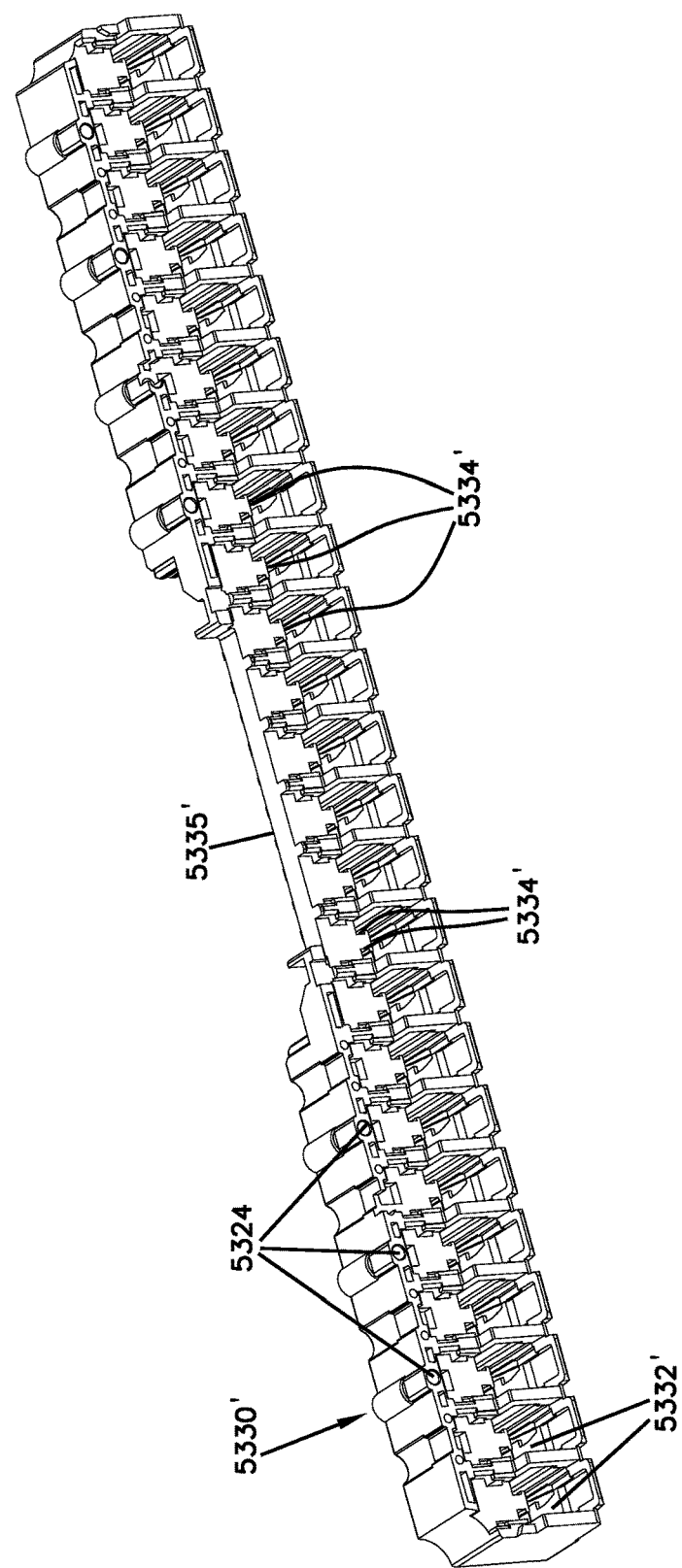
Figure 67:
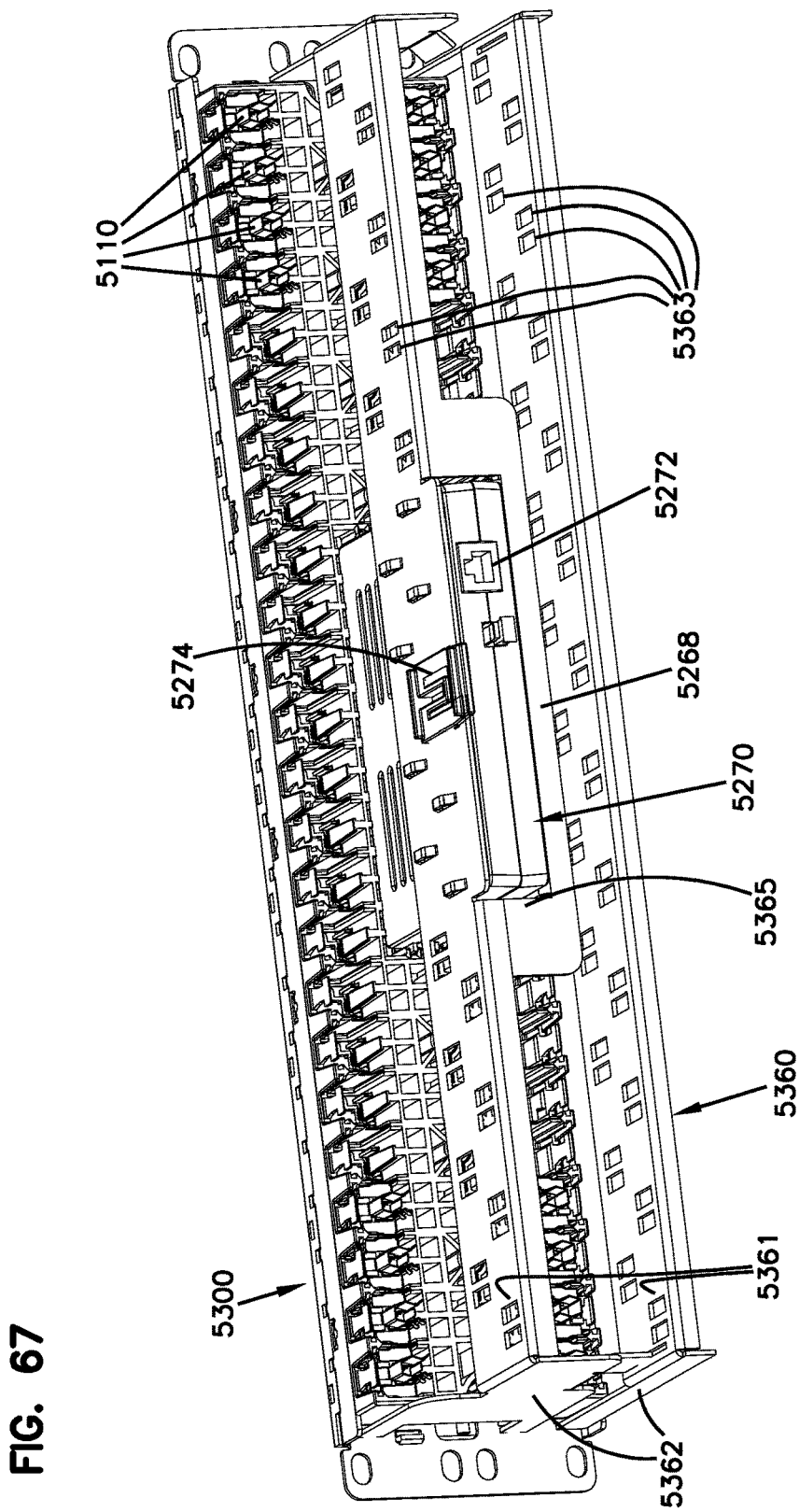
Figure 68:
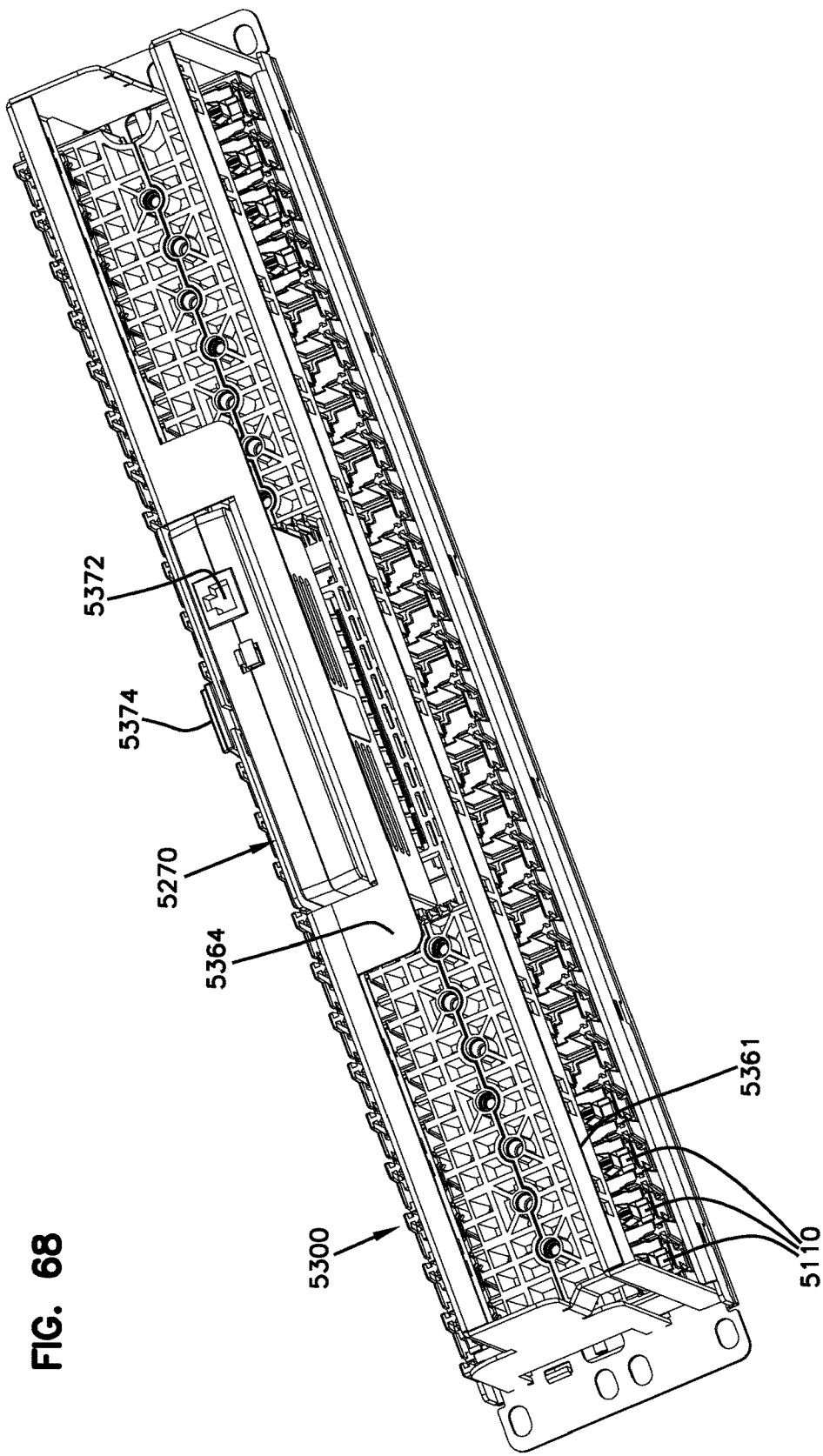
Figure 69:
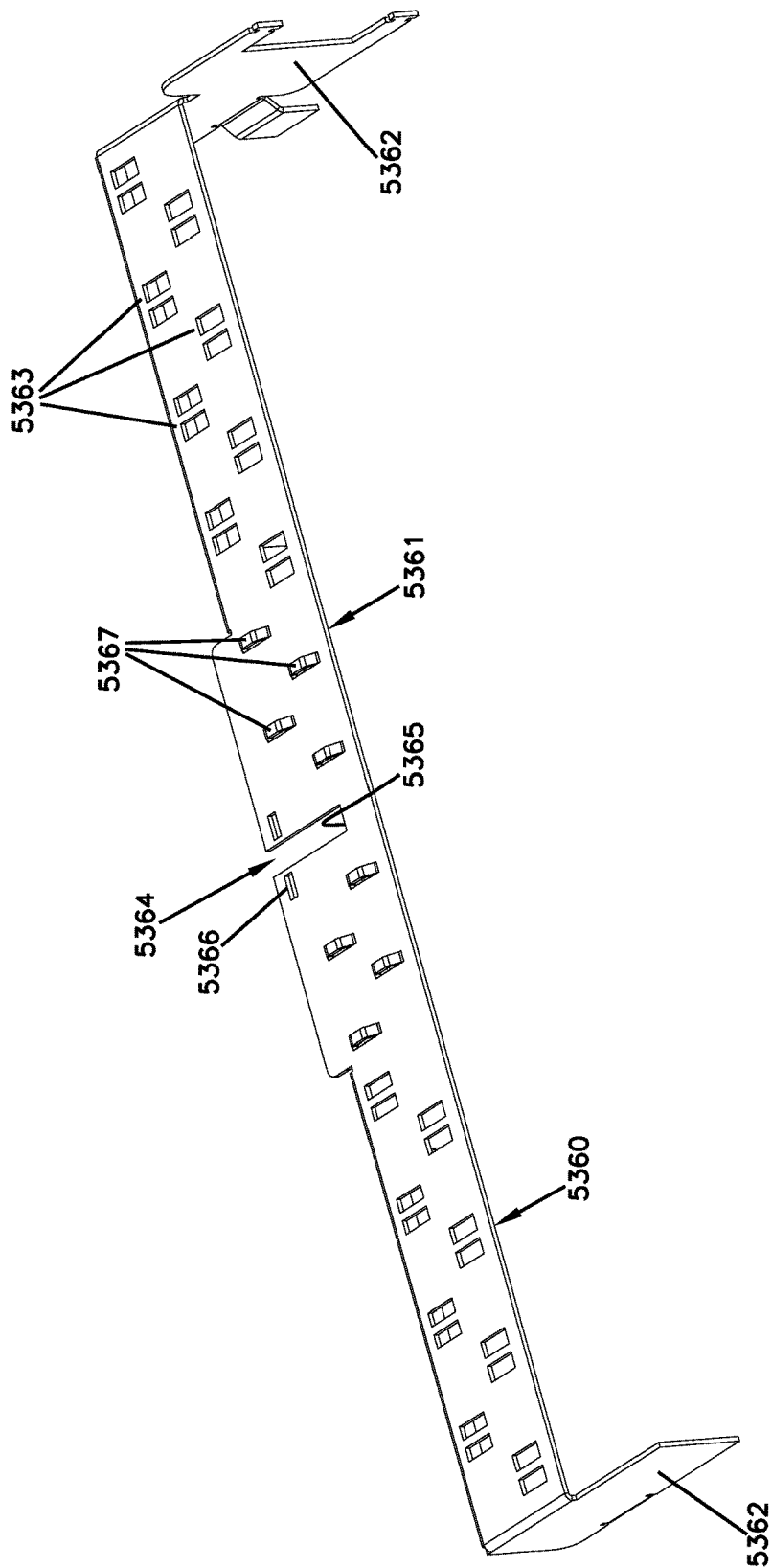

In some implementations, the first housing part 5310 is fastened to the second housing part 5320. In the example shown, the frame 5340 defines one or more first openings 5312 (FIG. 63), the second printed circuit board 5165 defines one or more second openings 5322 (FIG. 64), and the chassis arrangement 5230 defines one or more third openings 5324 (FIGS. 65-66). One or more fasteners (e.g., screws, bolts, etc.) 5315 are configured to extend through the first, second, and third openings 5312, 5322, 5324 to secure the second printed circuit board 5165 between the frame 5340 and the chassis arrangement 5330. In certain implementations, the fastener 5315 is configured to extend through a spacer 5318 positioned between the frame 5340 and the second printed circuit board 5165.

In the example shown, a threaded fastener 5315 is configured to extend through the openings 5312, 5322, 5324. In some implementations, the threaded fastener 5315 is configured to screw directly into the chassis arrangement 5330 (e.g., into the passages 5324 defined in the chassis arrangement 5330). In other implementations, however, the threaded fastener 5315 is configured to screw into a threaded insert 5325. In some such implementations, the threaded insert 5325 may abut against a portion of the chassis arrangement 5330 from a rear of the chassis arrangement 5330. For example, the threaded insert 5325 may mount at least partially within the passage 5324 defined in the arrangement 5330 and abut against a forward or intermediate surface of the arrangement 5330.

Figure 63:
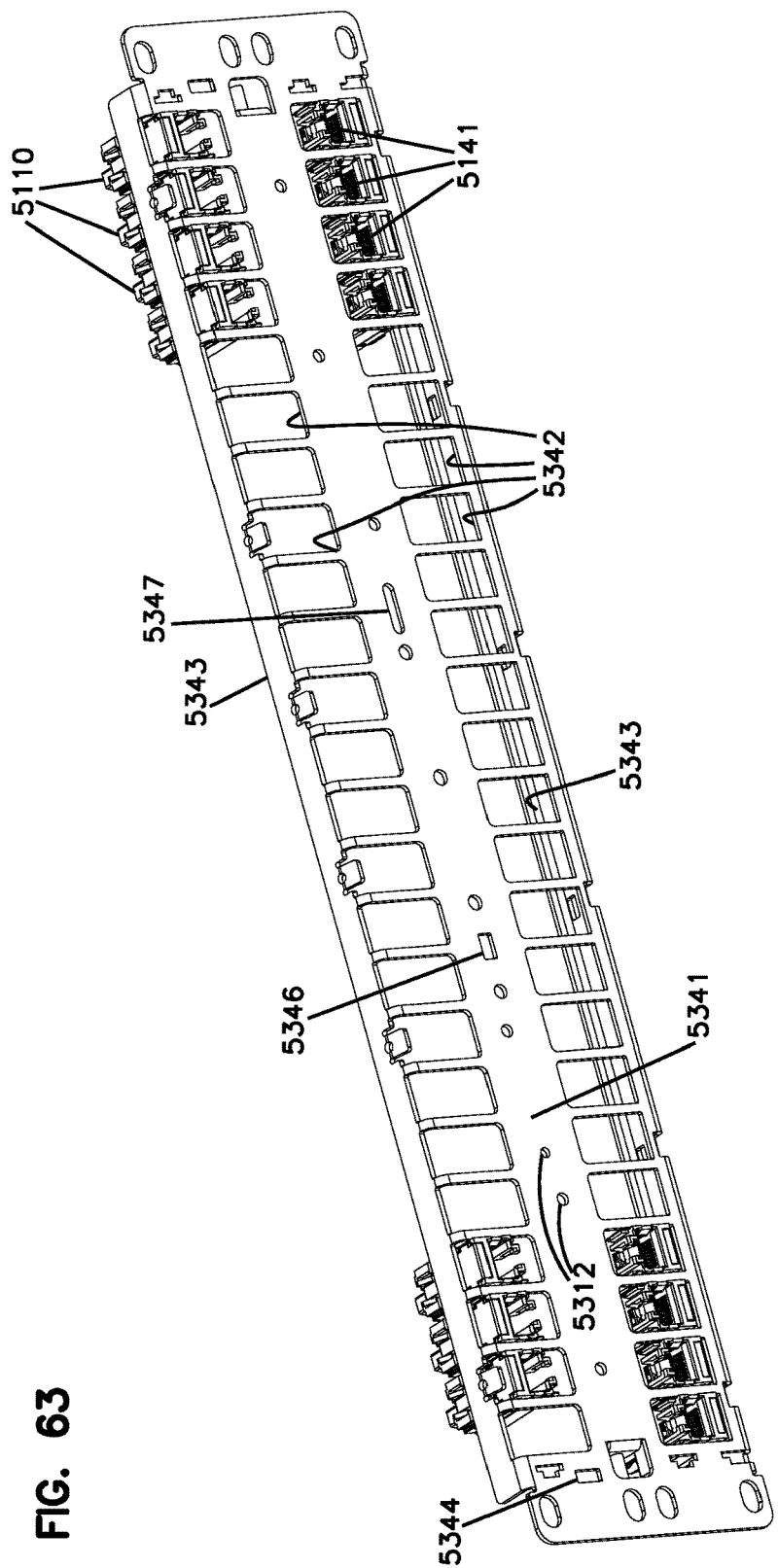

One example implementation of a frame 5340 is shown in FIG. 63. The frame 5340 includes a frame body 5341 defining at least one opening 5342 through which a plug 5002 can access a socket 5112 of a jack module 5110. In certain implementations, the openings 5342 are sufficiently large to enable the front of both the jack module 5110 and the media reading interface 5145 to be viewing from a front of the frame 5340 when the first and second housing parts 5310, 5320 are mounted together. For example, the viewing channel 5153 of the media reading interface 5145 may be viewing through the frame opening 5342.

In certain implementations, the frame body 5341 defines upper and lower bent flanges 5343 that wrap around portions of the second housing part 5320 to aid in retaining the first and second housing parts 5310, 5320. In certain implementations, the lower flange 5343 may aid in retaining the second printed circuit board 5165 within the patch panel 5300. For example, the lower bent flange 5343 of the frame body 5341 may extend over a bottom of the second circuit board 5165 to hold the second circuit board 5165 within the channel 5150 defined in the second media reading interface (e.g., see FIG. 71)

As noted above, the frame body 5341 also defines openings 5312 through which fasteners (e.g., screws, bolts, rivets, etc.) 5315 may be inserted to secure the first housing part 5310 to the second housing part 5320. In some implementations, the frame body 5341 also defines openings to accommodate components mounted to the second housing part 5320. For example, the frame body 5341 may define openings 5346, 5347 to accommodate a cable port 5166 and light indicators 5167, respectively, as will be described in more detail herein.

In some implementations, the frame body 5341 defines the mounting members 5206. For example, side flanges of the frame 5341 define the openings 5307 through which fasteners may be extended. In other implementations, separate mounting members 5306 may connect to the frame body 5341. In other implementations, the mounting members 5306 may be defined by the fascia 5350. In still other implementations, the mounting members 5306 may connect to the second housing part 5320 (e.g., to the chassis 5330).

The frame body 5341 also is configured to receive the fascia 5350. In some implementations, the frame body 5341 defines openings 5344 configured to receive retaining members 5358 of the fascia 5350. In other implementations, the frame body 5341 may define retaining members that fit into openings defined in the fascia 5350. In certain implementations, the frame body 5341 also includes tabs 5345 that extend forwardly from some of the openings 5342 to be received in slots defined in the fascia 5350 to aid in aligning and installing the fascia 5350 on the frame 5340.

Figure 62:
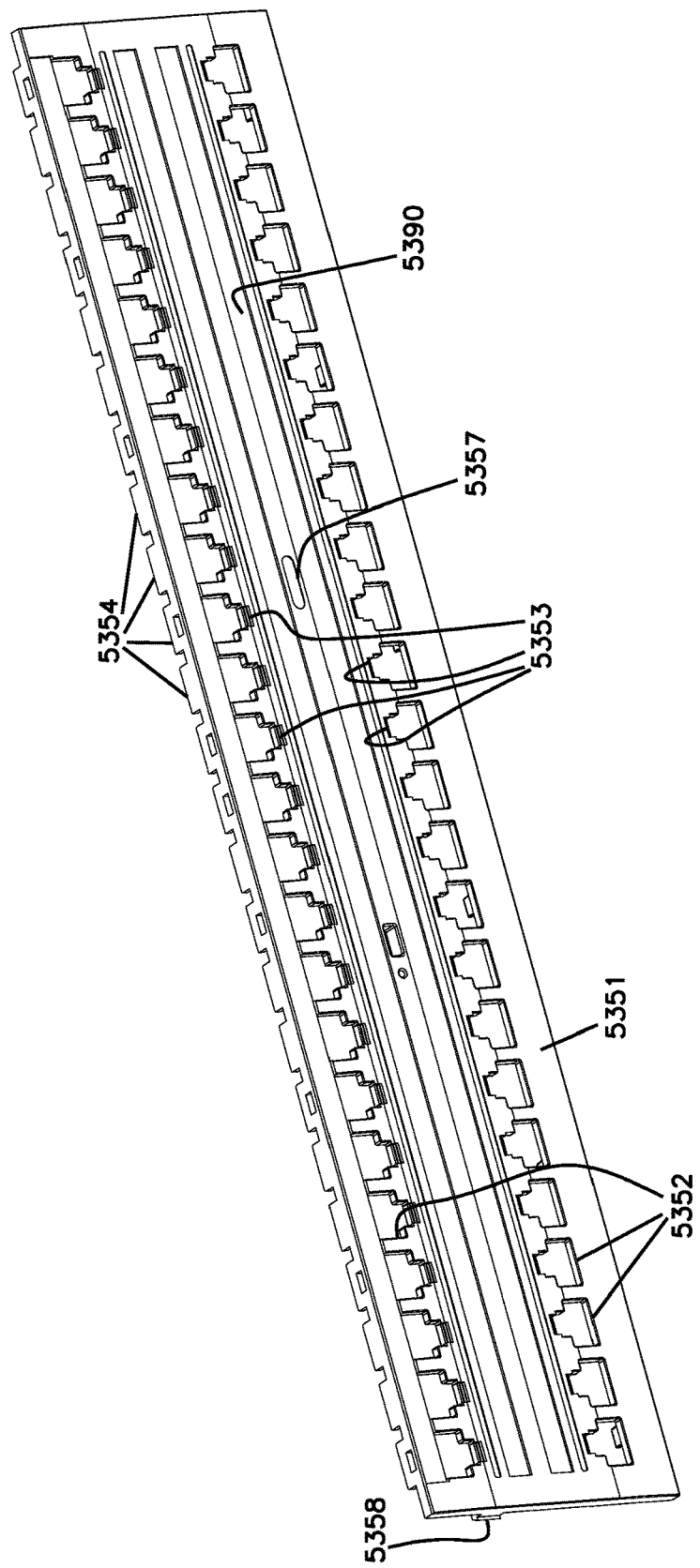

One example implementation of a fascia 5350 is shown in FIG. 62. The fascia 5350 includes a fascia body 5351 defining a plurality of openings 5352 that align with the openings 5342 of the frame body 5341 to provide access to the jack module socket 5112 from the front 5301 of the patch panel 5300. In some implementations, the openings 5352 of the fascia body 5351 are smaller than the openings 5342 of the frame body 5341. In certain implementations, the openings 5352 of the fascia body 5351 define keyways 5353 for the plugs 5002. They keyways 5353 of the fascia body 5351 are oriented to align with the cutouts 5113 of the jack modules 5110 when the first and second housing parts 5310, 5320 are mounted together.

In some implementations, the fascia body 5351 includes tabs 5354 that extend rearward from the fascia body 5351. In the example shown, the tabs 5354 generally align with the openings 5352. In other implementations, however, the fascia body 5351 may include greater or fewer tabs 5354. The tabs 5354 extend over the upper and lower bend flanges 5343 of the frame body 5341 when the fascia 5350 is mounted to the frame 5340. In one implementation, the tabs 5354 friction-fit over the flanges 5343 of the frame to aid in retaining the fascia 5350 to the frame 5340. In certain implementations, some of the tabs 5354 define openings, cutouts 5355, or inner protrusions that may aid in retaining the fascia 5350 to the frame 5340.

As noted above, the fascia body 5351 also includes retaining members 5358 to secure the fascia body 5351 to the frame body 5341. In some implementations, the fascia body 5351 includes at least one retaining member 5358 at each side of the fascia body 5351. In other implementations, the fascia body 5351 includes multiple retaining members 5358 at each side of the fascia body 5351. In some implementations, the retaining members 5358 may secure (e.g., latch, press-fit, snap-fit, etc.) to the frame body 5341 via latching openings 5344. In other implementations, the retaining members 5358 may extend through the openings 5344 and secure to the chassis 5330 of the second housing part 5320.

In some implementations, the fascia body 5351 also defines openings to accommodate components mounted to the second housing part 5320. For example, the fascia body 5351 may define openings 5356, 5357, 5359 to accommodate a cable port 5166 and light indicators 5167 of the second printed circuit board 5165. One example implementation of a printed circuit board 5165 including a cable port 5166 and light indicators 5167 will be described in more detail herein.

One example chassis arrangement 5330 is shown in FIGS. 65-66. The chassis arrangement 5330 includes a first chassis body 5331 and a second chassis body 5331' that are configured to attach to the frame 5340. In the example shown, each chassis body 5331, 5331' defines a recess 5335, 5335' that cooperate to define a passage through which a processing unit (e.g., processing unit 5270 of FIG. 34C, processing unit 5270' of FIG. 55, etc.) may extend to connect to the second printed circuit board 5165.

In some implementations, some of the openings 5322 through which the fasteners pass to attach the chassis arrangement 5330 to the frame 5340 are defined in the first chassis body 5331 and others of the openings 5322 are defined in the second chassis body 5331'. For example, the first chassis body 5331 shown in FIG. 65 defines three passages 5322 on either side of the recess 5335 and the second chassis body 5331' shown in FIG. 66 defines three passages 5322 on either side of the recess 5335'. The passages 5322' defined by the second body 5331' are laterally offset from the passages 5322 defined by the first body 5331. In certain implementation, the first and second bodies 5331, 5331' define complementary protrusions and recesses that fit together when the chassis bodies 5331, 5331' are mounted to the frame 5340. In one implementation, the passages 5322 are defined in the protrusions (e.g., see FIGS. 65-66).

Each chassis body 5331, 5331' defines openings 5332, 5332' through which the jack modules 5110 can be mounted to the chassis bodies 5331, 5331'. In the example shown, each chassis body 5331, 5331' defines a row of openings 5332, 5332'. In certain implementations, each chassis body 5331, 5331' includes a mounting member 5333, 5333' located within each opening 5332, 5332'. In the example shown in FIGS. 65 and 66, each mounting member 5333, 5333' includes a generally T-shaped body defining channels 5334, 5334' on either side. Each mounting member 5333, 5333' is configured to aid in retaining one of the jack modules 5110 in the opening 5232.

In certain implementations, the jack modules 5110 are installed on the chassis bodies 5331, 5331' from the rear side of the chassis arrangement 5330 (e.g., FIG. 61). The jack module 5110 slides into the opening 5332, 5332' with the guide members 5127 of the jack module 5110 (see FIGS. 17 and 19) positioned on either side of the mounting member 5333, 5333'. In one implementation, the latching members 5116 of the jack module 5110 slide within the channels 5334, 5334' defined by the mounting member 5333, 5333'.

In some implementations, each media reading interface 5145 is mounted to a corresponding jack module 5110 after the jack module 5110 is mounted to the chassis arrangement 5330. In other implementations, each media reading interface 5145 is installed on the second printed circuit board 5165 to form a board arrangement 5389 (FIG. 64). The board arrangement 5389 can be mounted to the chassis arrangement 5330 before or after the jack modules 5110 are mounted to the chassis arrangement 5330.

In some implementations, each chassis body 5331, 5331' includes one or more latching members 5336 that aid in retaining the jack modules 5110 to the chassis body 5331, 5331'. The example latching members 5336 shown in FIG. 65 include flexible tabs 5337 defining at least one shoulder 5338. In certain implementations, each latching member 5336 defines a shoulder 5338 on each side of the flexible tab 5337. In the example shown, each flexible tab 5337 generally defines a mushroom shape. In other implementations, each flexible tab 5337 generally defines a T-shape.

When the jack modules 5110 are installed on the chassis arrangement 5330, the front ends of the jack modules 5110 are inserted through the openings 5332, 5332' of the chassis bodies 5331, 5331' from a rear of the chassis bodies 5331, 5331'. As the jack module 5110 is being inserted, one of the latching members 5336 of the chassis body 5331, 5331' cams over the ramped surfaces 5124 of the latching members 5123 of the jack modules 5110 (see FIG. 67). When the jack module 5110 has been sufficiently inserted in the chassis body 5331, 5331', the latching member 5336 of the chassis body 5331, 5331' snaps over the latching members 5123 of the jack module 5110 so that the shoulders 5338 of the chassis latching member 5336 abut against shoulders 5125 of the jack latching member 5123 (see FIG. 67).

In accordance with some aspects, the second printed circuit board 5165 is configured to receive a processing unit (e.g., processing unit 5270 of FIG. 34C, processing unit 5470 of FIG. 55).

In accordance with some aspects, the cable manager 5360 is configured similarly to the cable manager 5260 of the patch panel 5200 (see FIGS. 67-70). The cable manager 5360 includes at least one rail 5361 that defines slots 5363 at which cable may be secured to the rail 5361 using cable ties or other fasteners. The cable manager 5360 also includes arms 5362 that secure the rail 5361 to the patch panel 5300. In some implementations, the cable manager 5360 includes multiple rails 5361, 5361' each defining slots 5363, 5363' and including arms 5362, 5362' to secure the rails 5361, 5361' to the patch panel 5300.

Figure 70:
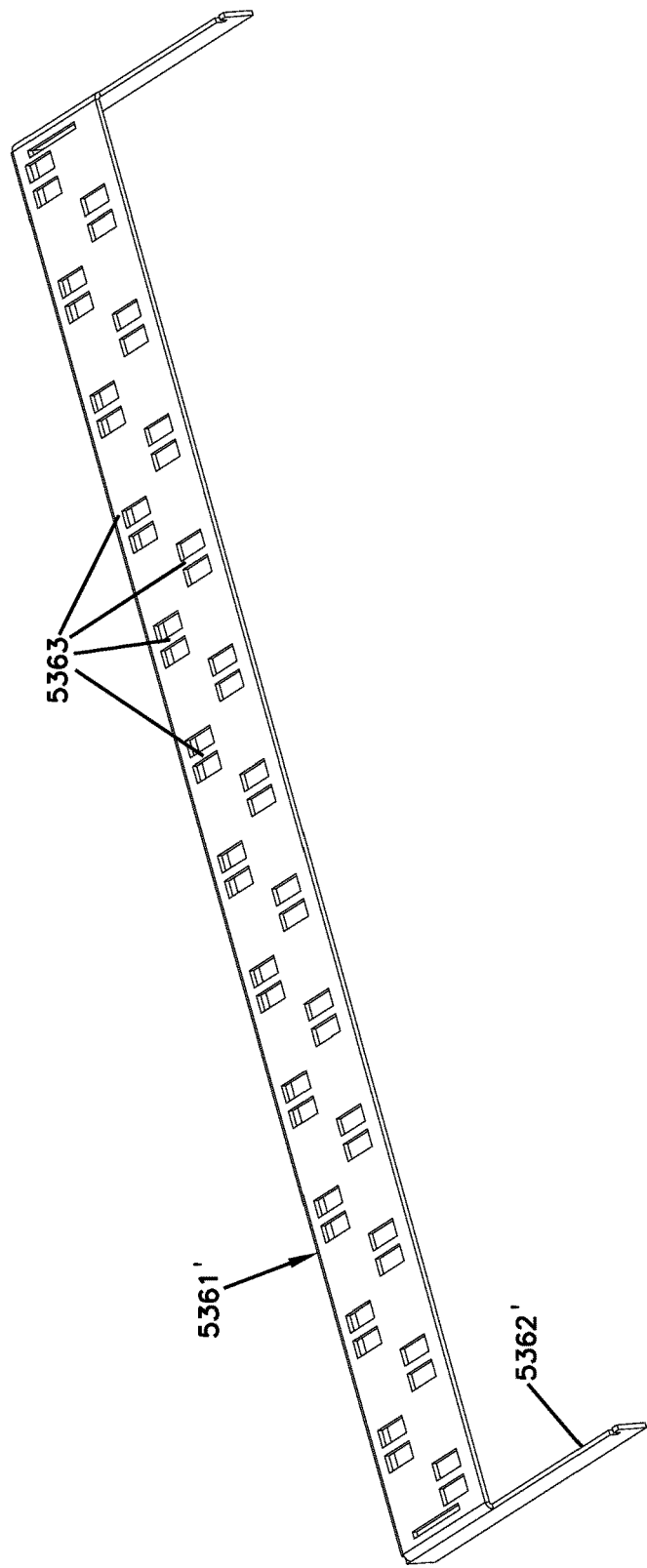
Figure 71:
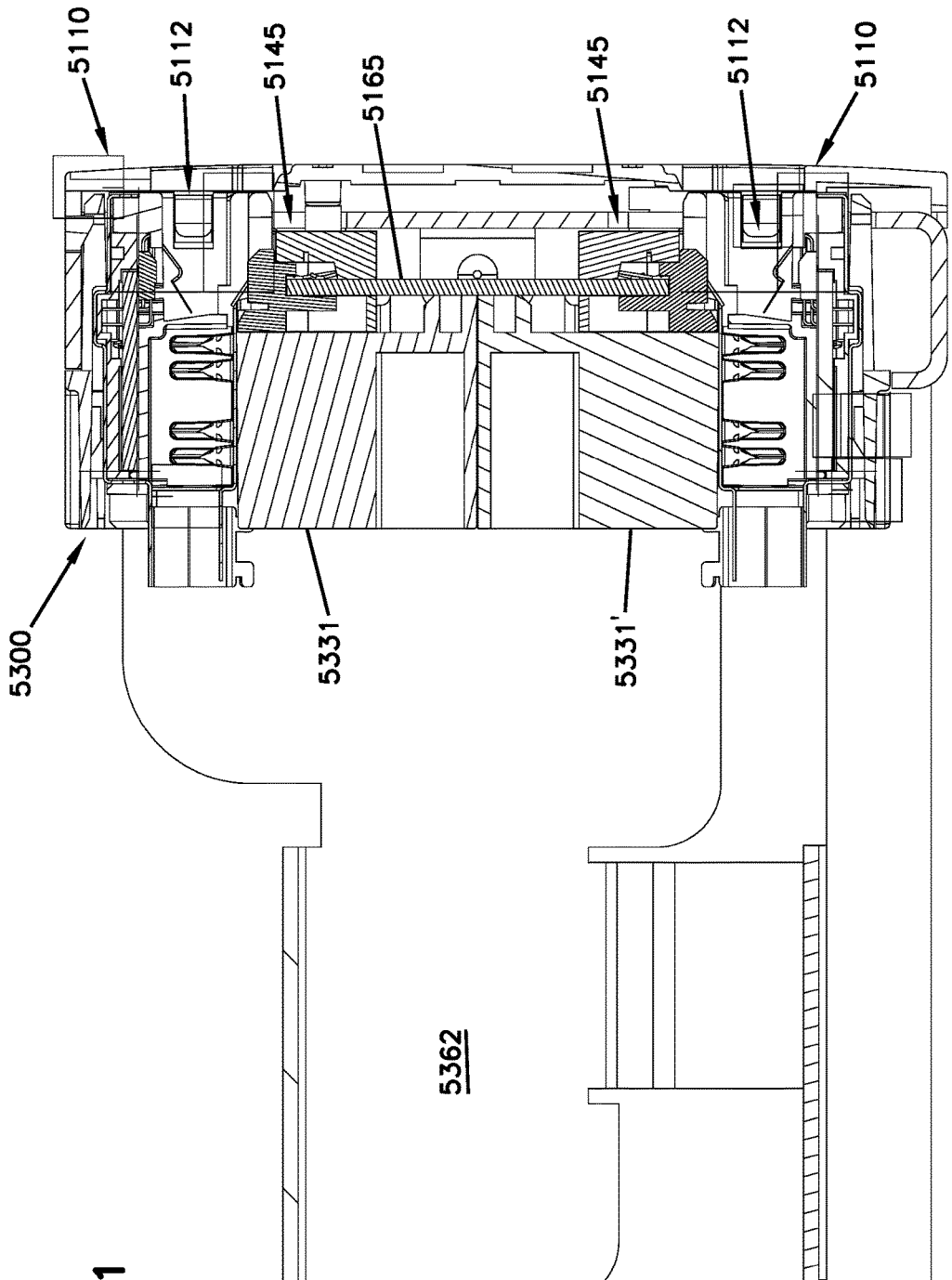
Figure 72:
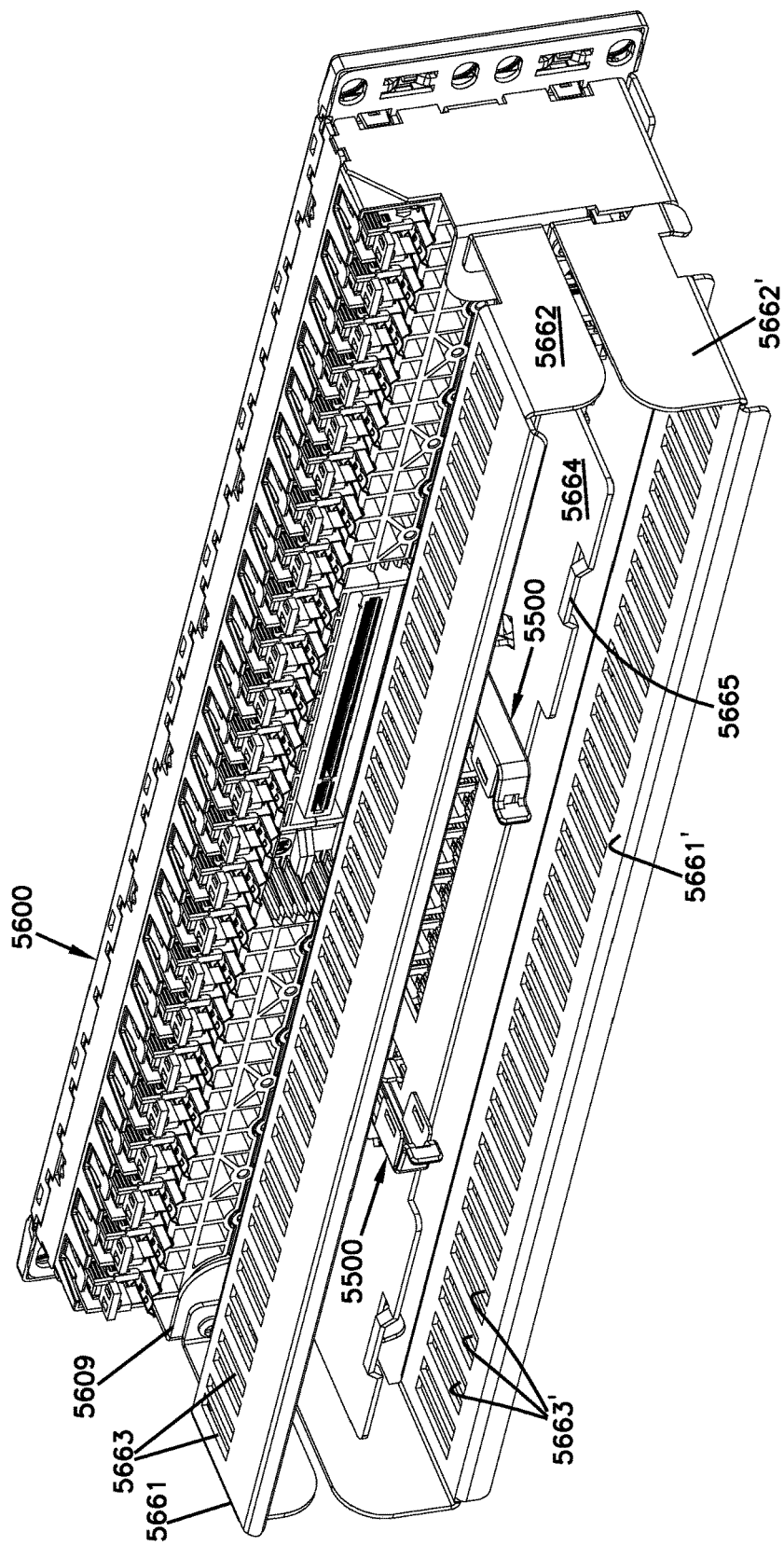
FIGS. 72-78 show a fourth example patch panel holding one or more jack modules and media reading interfaces in multiple rows in accordance with aspects of the present disclosure.

One example cable manager 5360 includes a first rail 5361 (FIG. 69) and a second rail 5361' (FIG. 70). The first rail 5361 also defines a retention section 5364 that is configured to receive the processing unit 5270. The retention surface 5364 defines a recess 5365 through which the guide member 5275 of the processing unit 5270 can extend to connect to the second printed circuit board 5165 of the patch panel 5300. The retention section 5364 also includes openings 5366 at which retaining members 5276 of the processing unit 5270 latch to secure the processing unit 5270 to the patch panel 5300. In the example shown, the retention section 5364 also includes raised tabs 5367 at which cables routed to the processing unit 5270 may be managed FIGS. 72-78 show a fourth example patch panel 5600. The fourth example patch panel 5600 includes a fascia 5650 (FIGS. 73-75), a frame 5640 (FIGS. 76-78), and a chassis 5630 (see FIG. 72). A second printed circuit board 5165 is mounted between the frame 5640 and the chassis 5630. For example, the fourth patch panel 5600 can be assembled as described above with respect to any of patch panels 5200, 5300, and 5400. A grounding arrangement 5609 (FIG. 78) connects to the frame 5640.

A cable manager 5660 is configured to mount to the fourth patch panel 5600 (e.g., to a grounding plate arrangement 5609 of the patch panel 5600). In certain implementations, the cable manager 5660 includes multiple rails 5661 at which cables can be secured (e.g., using cable ties). In the example shown, the cable manger 5560 includes a rail 5661, 5661' for each row of jack modules 5110. In some implementations, the cable manager 5660 utilizes the retaining arms 5500 described above with respect to FIGS. 52-60.

Figure 73:
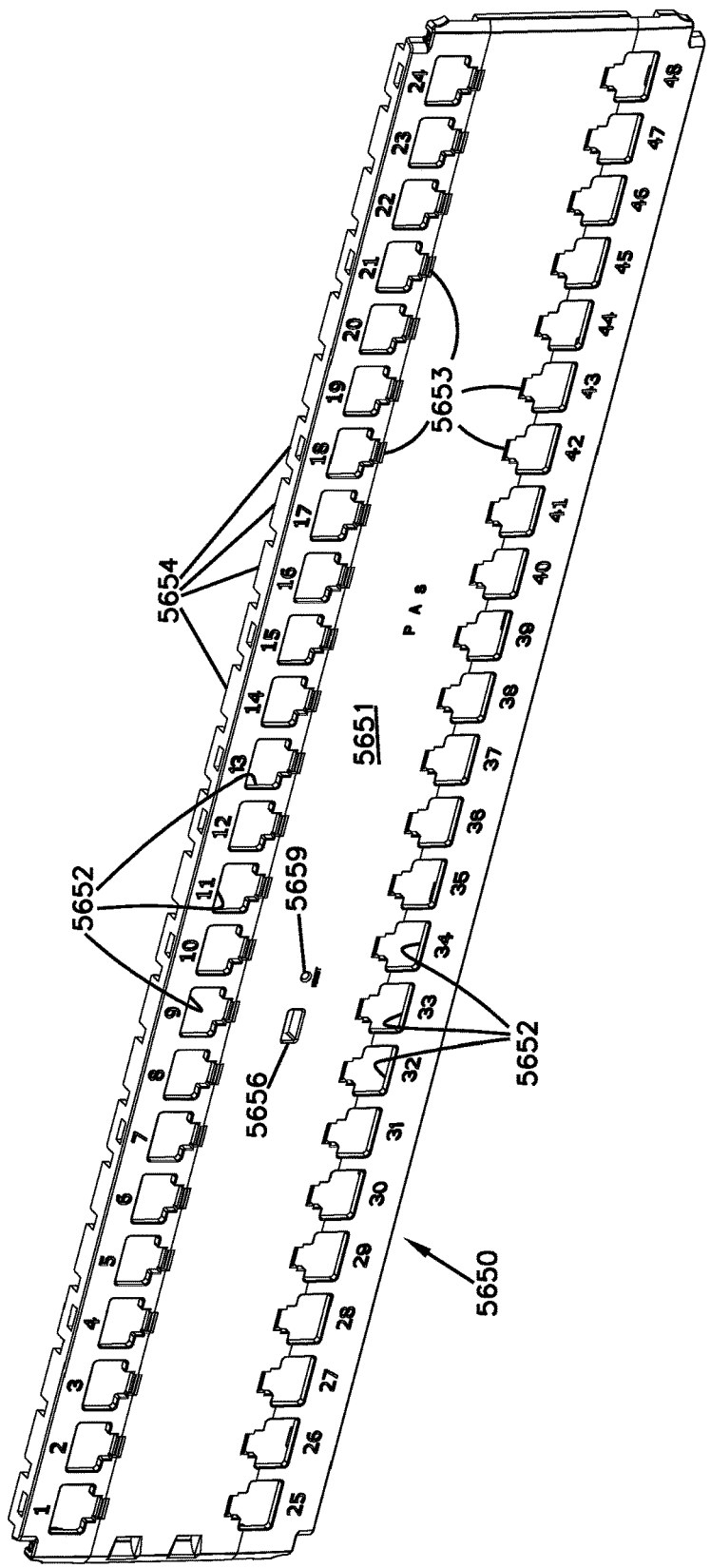
Figure 74:
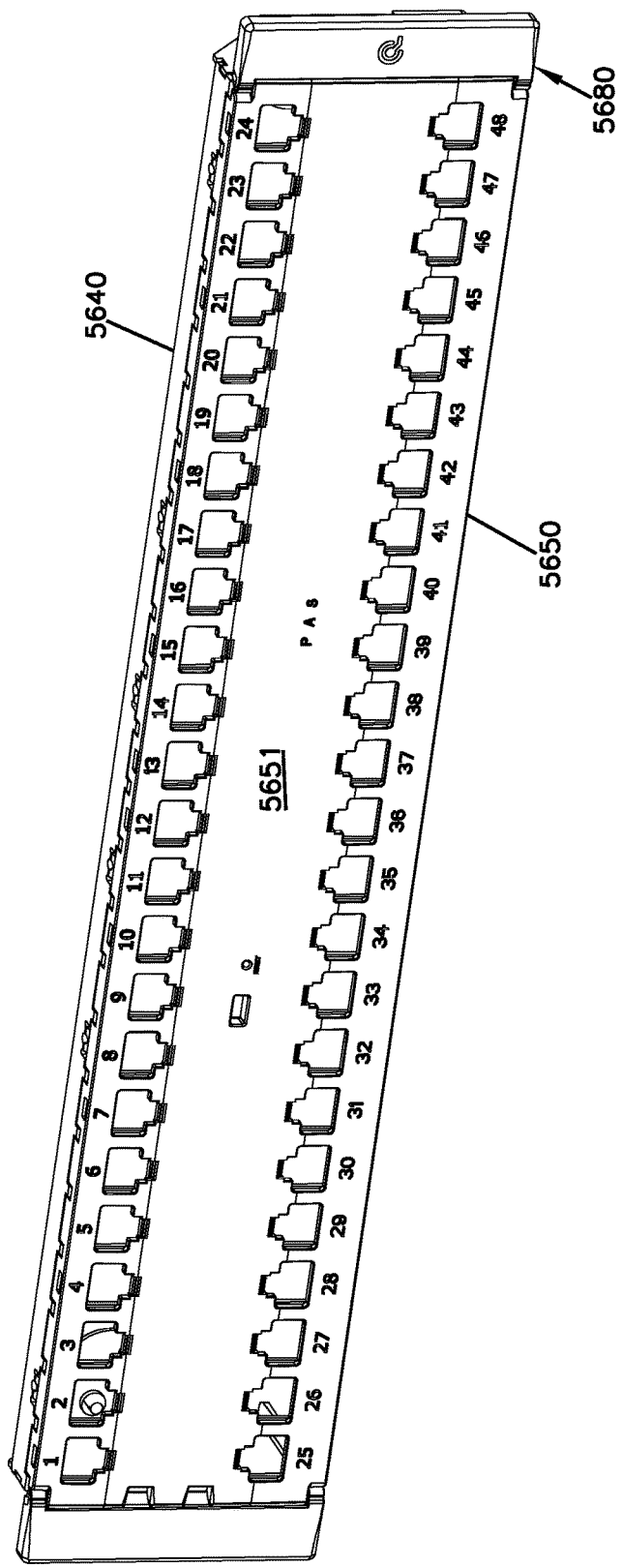
Figure 75:
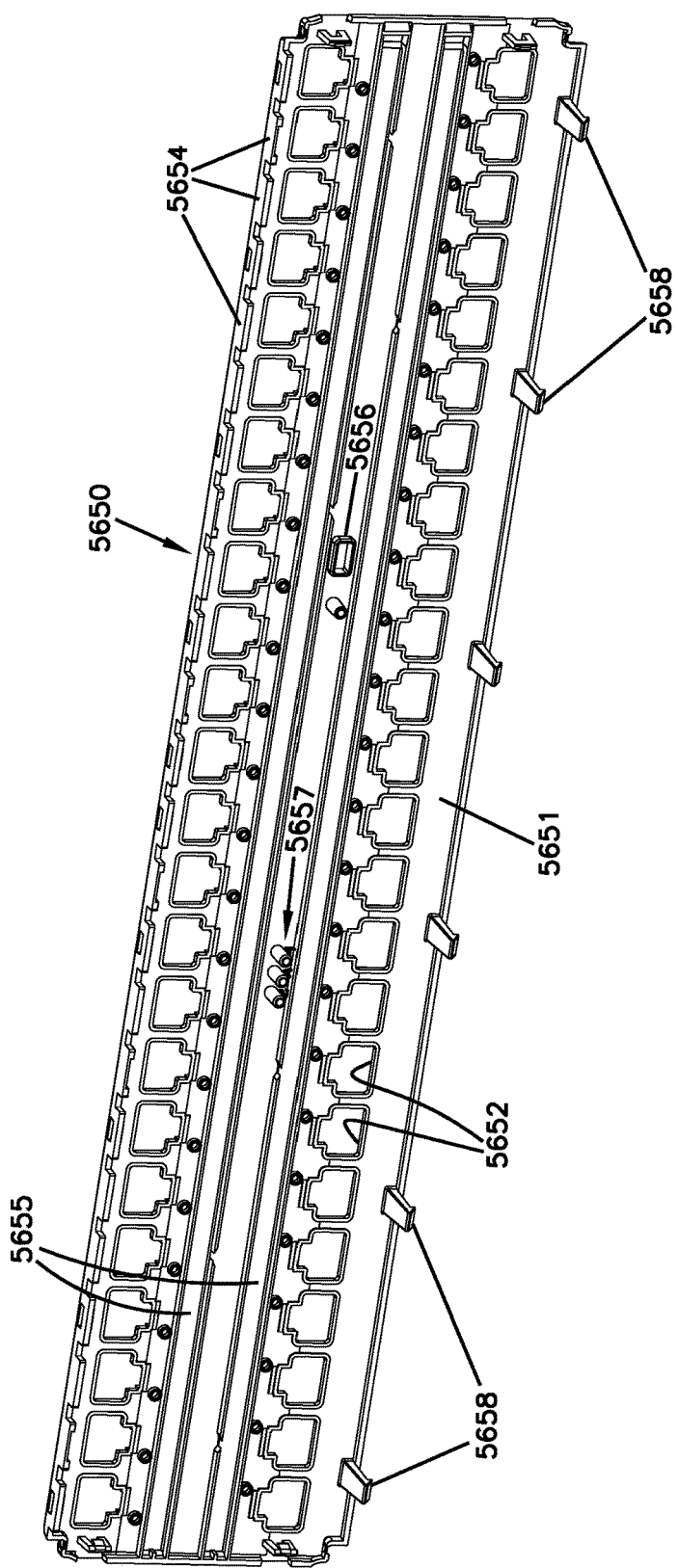

One example implementation of a fascia 5250 is shown in FIG. 73-75. The fascia 5650 includes a fascia body 5651 defining a plurality of openings 5652 through which a plug 5002 can access a socket 5112 of a jack module 5110 from the front of the patch panel 5600. In some implementations, the openings 5652 of the fascia body 5651 are smaller than the openings 5642 of the frame body 5641. In certain implementations, the openings 5652 of the fascia body 5651 define keyways 5653 for the plugs 5002. They keyways 5653 of the fascia body 5651 are oriented to align with the cutouts 5113 of the jack modules 5110 when the patch panel 5600 is assembled.

In some implementations, the fascia body 5651 includes tabs 5654 that extend rearward from the fascia body 5651. In the example shown, the tabs 5654 generally align with the openings 5652. In other implementations, however, the fascia body 5651 may include greater or fewer tabs 5654. The tabs 5654 extend over the upper and lower bend flanges 5643 of the frame body 5641 when the fascia 5650 is mounted to the frame 5640. In one implementation, the tabs 5654 friction-fit over the flanges 5643 of the frame to aid in retaining the fascia 5650 to the frame 5640. In certain implementations, some of the tabs 5654 define openings, cutouts, or inner protrusions that may aid in retaining the fascia 5650 to the frame 5640 (see FIG. 74).

As noted above, the fascia body 5651 also includes retaining members 5658 to secure the fascia body 5651 to the frame body 5641. In some implementations, the fascia body 5651 includes multiple retaining members 5658 spaced along a one side of the fascia body 5651. In the example shown, the fascia body 5651 includes multiple hooks 5658 spaced along a bottom of the fascia body 5651. The retaining members 5658 extend through the frame body 5641 and latch in the openings 5644. In certain implementations, the top of the fascia body 5651 may be configured to snap, pivot, or otherwise secure to the top of the frame 5640. Of course, this attachment mechanism can be used between any of the frames and fascias disclosed herein.

In some implementations, the fascia body 5651 also defines openings to accommodate components mounted to the chassis 5630 or second printed circuit board 5165. For example, the fascia body 5651 may define openings 5656, 5657, 5659 to accommodate a cable port 5166 and light indicators 5167 of the second printed circuit board 5165. One example implementation of a printed circuit board 5165 includes a cable port 5166, a first light indicator, and three additional light indicators 5167.

Labels may be installed on the fascia body 5651. In some implementations, labels are installed on a front of the fascia body 5651. For example, labels may be glued, latched, or otherwise secured to a front of the fascia body 5651. In other implementations, however, labels may be installed behind a clear or opaque fascia body 5651. In certain implementations, one or more label holders 5290 (FIGS. 40-41) may be mounted to back of the fascia body 5651. For example, the label holder may be mounted within one or more tracks 5655 (FIG. 75).

Figure 76:
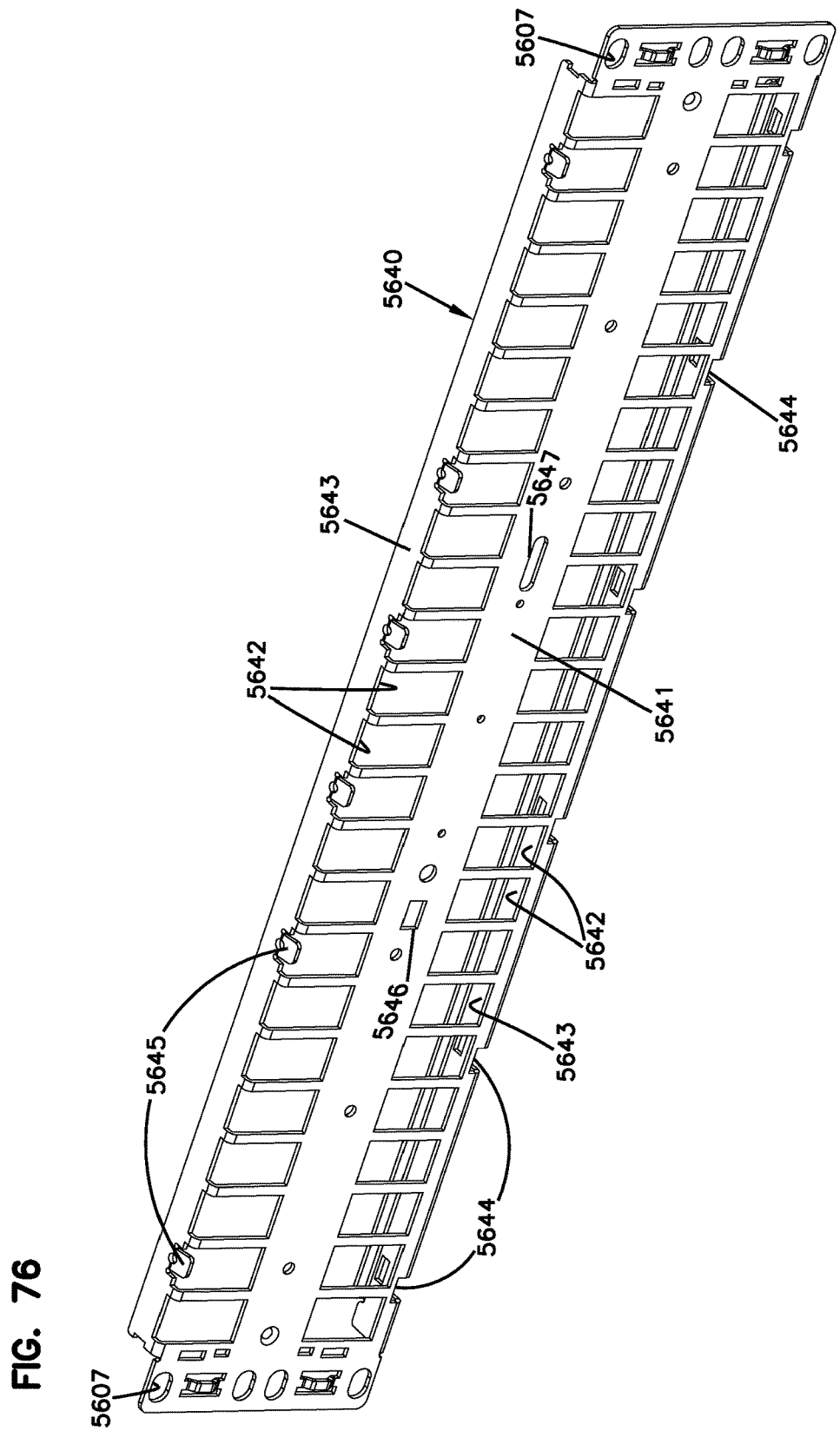
Figure 77:
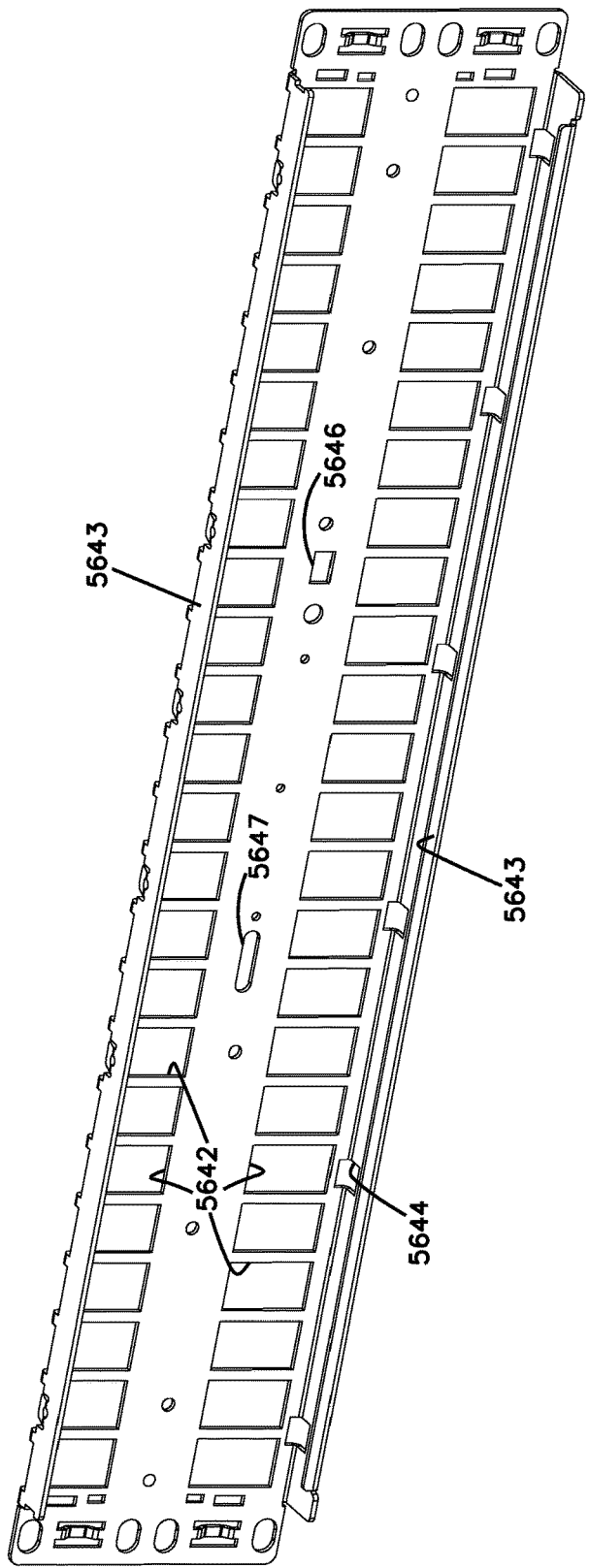

One example implementation of a frame 5640 is shown in FIGS. 76-78. The frame 5640 includes a frame body 5641 defining at least one opening 5642 that align with the openings 5642 of the frame body 5241 to provide access to a socket 5112 of a jack module 5110. In certain implementations, the openings 5642 are sufficiently large to enable the front of both the jack module 5110 and the media reading interface 5145 to be viewing from a front of the frame 5640 when the frame 5640 and chassis 5630 are mounted together. For example, the viewing channel 5153 of the media reading interface 5145 may be viewing through the frame opening 5642.

In certain implementations, the frame body 5641 defines upper and lower bent flanges 5643 that wrap around portions of the chassis 5630 to aid in retaining the second printed circuit board 5165 within the patch panel 5600. For example, the lower bent flange 5643 of the frame body 5641 may extend over a bottom of the second circuit board 5165 to hold the second circuit board 5165 within the channel 5150 defined in the second media reading interface (e.g., see FIG. 51).

As noted above, the frame body 5641 also defines openings 5612 through which fasteners (e.g., screws, bolts, rivets, etc.) may be inserted to secure the frame 5640 to the chassis 5630. In some implementations, the frame body 5641 also defines openings to accommodate components mounted to the chassis 5630 and second printed circuit board 5165. For example, the frame body 5641 may define openings 5646, 5647 to accommodate a cable port 5166 and light indicators 5167, respectively, as described herein.

In some implementations, the frame body 5641 defines the mounting members 5606. For example, side flanges of the frame 5641 define the openings 5607 through which fasteners may be extended. In other implementations, separate mounting members 5606 may connect to the frame body 5641. In other implementations, the mounting members 5606 may be defined by the fascia 5650. In still other implementations, the mounting members 5606 may connect to the chassis 5630.

The frame body 5641 also is configured to connect to the fascia 5650. In some implementations, the frame body 5641 defines openings 5644 configured to receive retaining members 5658 of the fascia 5650 (FIG. 78). In other implementations, the frame body 5641 may define retaining members that fit into openings defined in the fascia 5650. In certain implementations, the frame body 5641 also includes tabs 5645 that extend forwardly from some of the openings 5642 to be received in slots defined in the fascia 5650 to aid in aligning and installing the fascia 5650 on the frame 5640.

As shown in FIGS. 74 and 78, end caps 5680 may be mounted over the side flanges of the frame 5641 to cover the mounting members 5606. In the example shown, each end cap 5680 includes a body that is sized and shaped to cover the front of one side flange of the frame 5641. Each end cap 5680 also includes mounting members by which the end cap body is attached to the patch panel 5600. In some implementations, the mounting members attach to the fascia body 5651 (FIG. 74).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A patch panel comprising:
   a patch panel body;
   a plurality of jack modules mounted to the patch panel body, each jack module defining a socket configured to receive a respective plug connector, each jack module including a plurality of first contacts accessible within the socket, each jack module also defining a cutout region;
   a circuit board external to the jack modules; and
   a plurality of media reading interface arrangements mounted to the patch panel body, each media reading interface arrangement including a media reading interface mounted to the circuit board, the media reading interfaces including second contacts, each media reading interface being positioned at a respective one of the jack modules so that free ends of the second contacts extend into the respective one of the jack modules through the cutout region, the free ends of the second contacts being electrically isolated from the first contacts of the respective one of the jack modules when the plug connector is fully received at the socket.

2. The patch panel of claim 1, wherein the second contacts of the media reading interface are electrically connected to the circuit board.

3. The patch panel of claim 2, wherein the circuit board extends parallel to an open face of the socket of each jack module.

4. The patch panel of claim 1, wherein the patch panel body includes a chassis to which the jack modules are mounted and a frame coupled to the chassis.

5. The patch panel of claim 4, wherein the frame defines a row of apertures that align with the sockets of the jack modules.

6. The patch panel of claim 5, further comprising a fascia mounted to the frame at an opposite side of the frame from the chassis, the fascia defining openings aligned with the openings defined by the frame.

7. The patch panel of claim 1, wherein each media reading interface is configured to aid in determining whether the plug connector has been received in a socket of one of the jack modules.

8. The patch panel of claim 7, wherein each media reading interface includes a sensing member that interacts with at least some of the second contacts.

9. The patch panel of claim 8, wherein each media reading interface includes a shorting pin that extends across at least two contact members of the second contacts, the shorting pin causing an electrical short between two or more contact members of the second contacts when shorting surfaces of the contact members touch the shorting pin.

10. The patch panel of claim 9, wherein each media reading interface includes a housing in which the second contacts are disposed, the housing being a separate piece from the respective one of the jack modules, the housing defining a channel configured to receive the circuit board.

11. The patch panel of claim 1, wherein the patch panel body includes a frame; wherein the circuit boards is coupled to the frame; wherein the plurality of jack modules are mounted to the frame; and wherein the plurality of media reading interfaces are mounted to the frame.

12. The patch panel of claim 11, further comprising a processing unit including at least a connector with which the processing unit connects to the circuit board.

13. The patch panel of claim 12, further comprising a cable manager configured to attach to the frame, the cable manager being configured to aid in retaining the processing unit to the circuit board.

14. The patch panel of claim 13, wherein the cable manager includes two spaced-apart retaining arms that engage retaining members at opposite sides of the processing unit, each retaining arm being configured to flex or pivot relative to the frame.

15. The patch panel of claim 14, wherein each retaining arm includes an elongated member extending between a mounting section and a handle, each elongated member defines a guiding surface that facilitates sliding the processing unit toward the circuit board.

16. The patch panel of claim 11, wherein each jack module couples directly to the respective media reading interface.

17. The patch panel of claim 11, further comprising a fascia mounted to the frame, the fascia defining cable ports that align with the sockets of the jack modules.

18. The patch panel of claim 11, further comprising a plurality of light indicators, each light indicator corresponding with one of the jack modules.

19. The patch panel of claim 11, wherein the jack modules and the media reading interfaces are disposed in a first row and in a second row.

20. The patch panel of claim 19, wherein the jack modules in the first row are disposed in a first orientation and the jack modules in the second row are disposed in a second orientation that is opposite the first orientation.

21. A patch panel comprising:
a jack module defining a socket configured to receive a plug connector, the jack module including a plurality of first contacts accessible from within the socket, the jack module also defining a cutout region; and
a media reading interface arrangement including a media reading interface mounted to a circuit board, the media reading interface including second contacts, the media reading interface being positioned at the jack module so that free ends of the second contacts extend into the jack module through the cutout region, wherein each media reading interface is configured to aid in determining whether the plug connector has been received in a socket of one of the jack modules, wherein the media reading interface includes a shorting pin that extends across at least two contact members of the second contacts, the shorting pin causing an electrical short between two or more contact members of the second contacts when shorting surfaces of the contact members touch the shorting pin.

22. A patch panel comprising:
a frame;
a plurality of jack modules mounted to the frame, the plurality of jack modules including a jack module defining a socket configured to receive a plug connector, the jack module including a plurality of first contacts accessible from within the socket, the jack module also defining a cutout region;
a media reading interface arrangement including a plurality of media reading interfaces mounted to the frame, each of the media reading interfaces being disposed at a respective one of the jack modules, the plurality of media reading interfaces including a media reading interface mounted to a circuit board, the circuit board being coupled to the frame, the media reading interface including second contacts, the media reading interface being positioned at the jack module so that free ends of the second contacts extend into the jack module through the cutout region;
a processing unit including at least a connector with which the processing unit connects to the circuit board; and
a cable manager configured to attach to the frame, the cable manager being configured to aid in retaining the processing unit to the circuit board.

* * * * *